United States Patent
Sensui

(10) Patent No.: US 7,333,273 B2
(45) Date of Patent: Feb. 19, 2008

(54) ZOOM LENS SYSTEM, IMAGING APPARATUS AND METHOD FOR VARYING FOCAL LENGTH

(75) Inventor: Takayuki Sensui, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/686,106

(22) Filed: Mar. 14, 2007

(65) Prior Publication Data
US 2007/0223105 A1    Sep. 27, 2007

(30) Foreign Application Priority Data

| Mar. 24, 2006 | (JP) | ............................. 2006/018932 |
| Mar. 24, 2006 | (JP) | ............................. 2006/018933 |
| Feb. 8, 2007 | (JP) | ............................. 2007/029615 |

(51) Int. Cl.
G02B 15/14     (2006.01)
(52) U.S. Cl. .................................................. 359/686
(58) Field of Classification Search ................ 359/683, 359/686
See application file for complete search history.

(56) References Cited

U.S. PATENT DOCUMENTS

| 4,591,235 A | 5/1986 | Tokumaru et al. |
| 4,653,873 A * | 3/1987 | Kawamura .................. 359/686 |
| 4,759,617 A | 7/1988 | Tokumaru et al. |
| 4,846,562 A | 7/1989 | Tokumaru et al. |
| 5,132,848 A * | 7/1992 | Nishio et al. ................ 359/686 |
| 5,264,965 A | 11/1993 | Hirakawa |
| 5,576,890 A | 11/1996 | Tanaka et al. |
| 5,585,970 A | 12/1996 | Shibayama |
| 5,805,351 A * | 9/1998 | Hayashi ....................... 359/686 |
| 6,710,931 B1 | 3/2004 | Misaka |
| 6,809,880 B2 * | 10/2004 | Murata ........................ 359/686 |
| 2005/0013015 A1 | 1/2005 | Sensui |
| 2006/0056047 A1 | 3/2006 | Oshita |

FOREIGN PATENT DOCUMENTS

JP        5-19170 A        1/1993

* cited by examiner

Primary Examiner—Scott J. Sugarman
(74) Attorney, Agent, or Firm—Miles & Stockbridge PC

(57) ABSTRACT

Providing a zoom lens system capable of obtaining higher optical performance, an imaging apparatus, and a method for varying a focal length of the zoom lens system. The system includes, in order from an object: a first lens group having negative refractive power; a second lens group having positive refractive power; a third lens group having negative refractive power; and a fourth lens group having positive refractive power. Upon zooming from a wide-angle end state to a telephoto end state, each lens group moves along an optical axis such that a distance between the first and second lens groups decreases, a distance between the second and third lens groups increases, and the distance between the third and fourth lens groups decreases; and the first lens group includes a negative lens, at least one lens in the negative lens includes an aspherical surface, and the negative lens satisfies given conditionals.

34 Claims, 19 Drawing Sheets

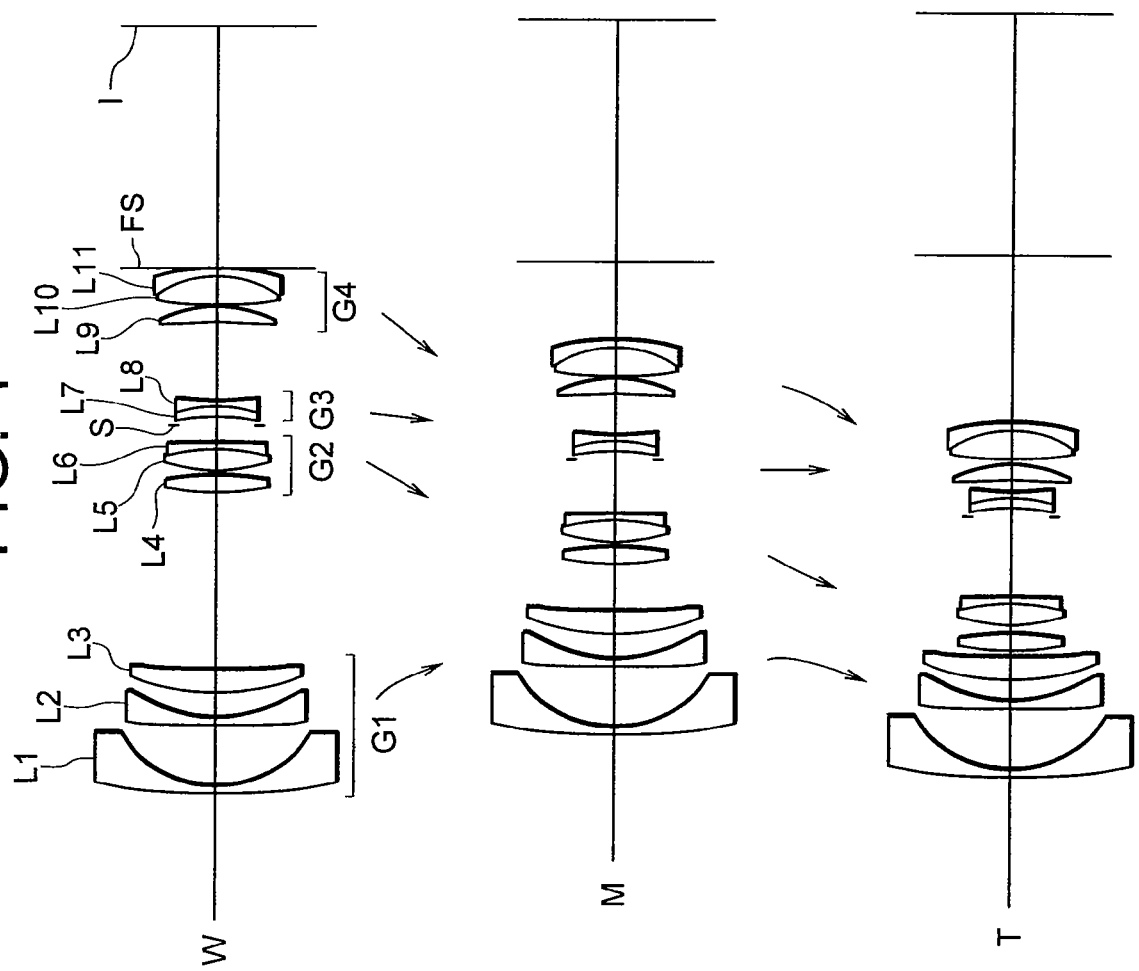

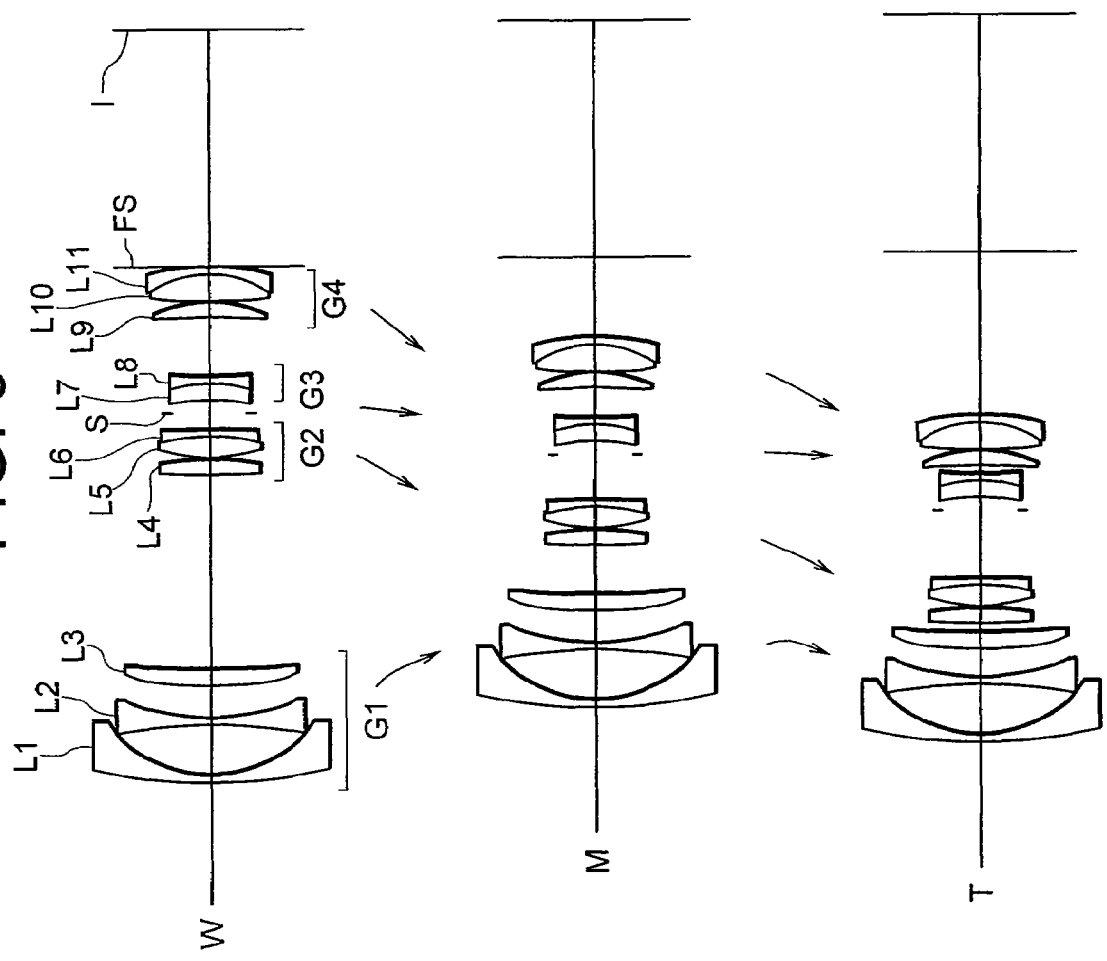

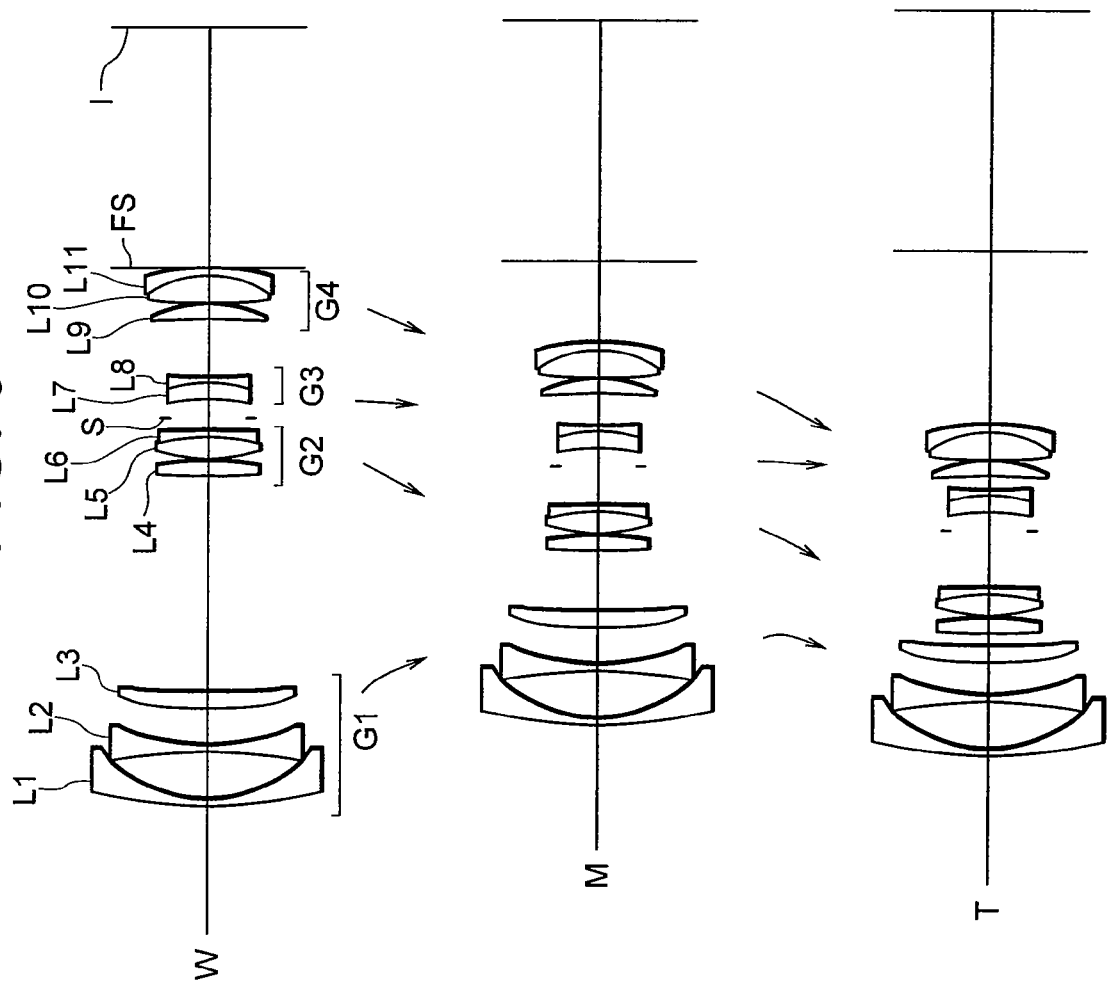

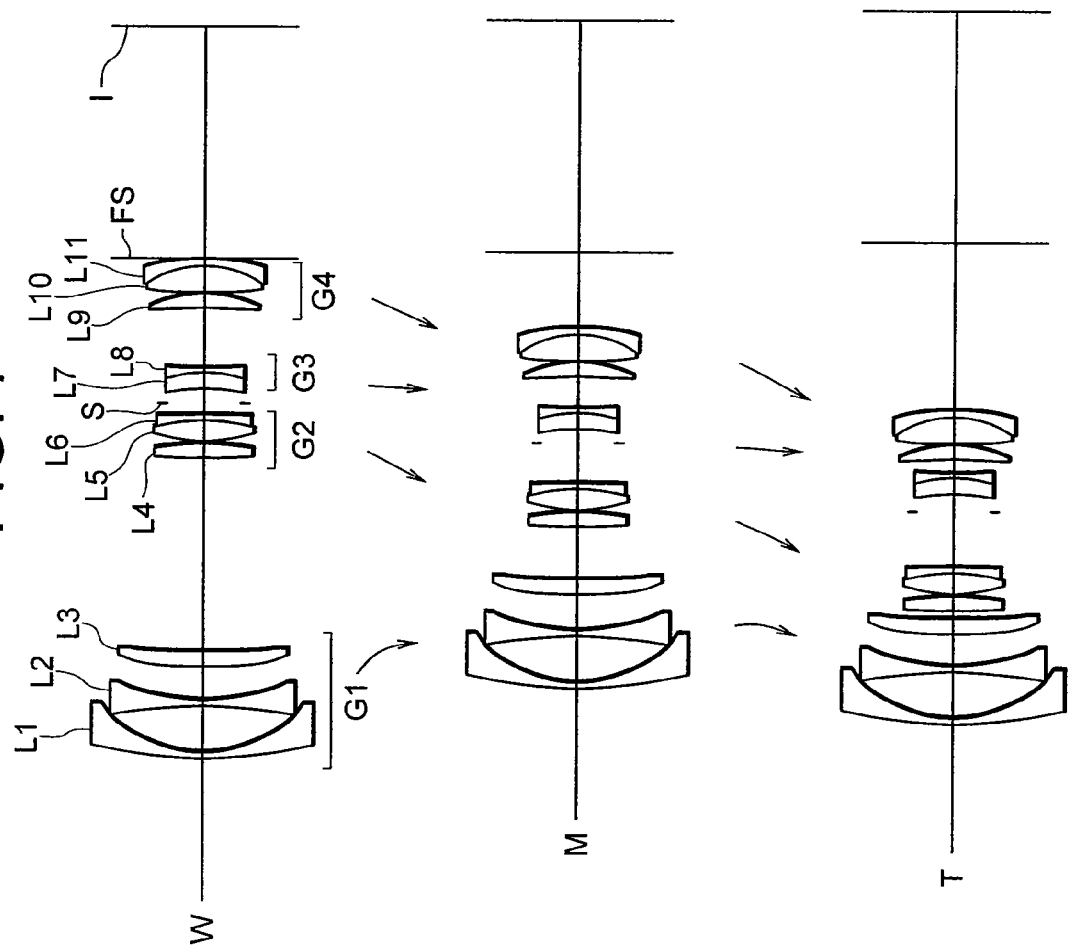

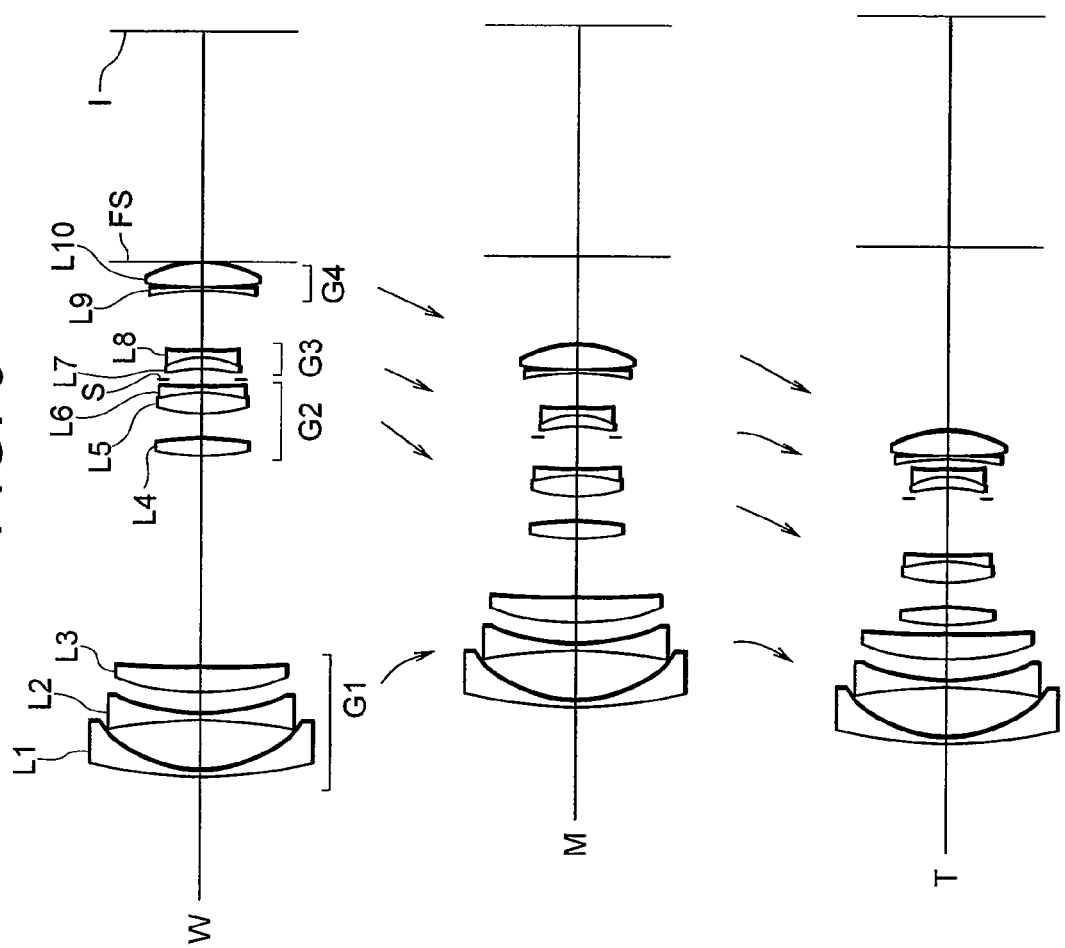

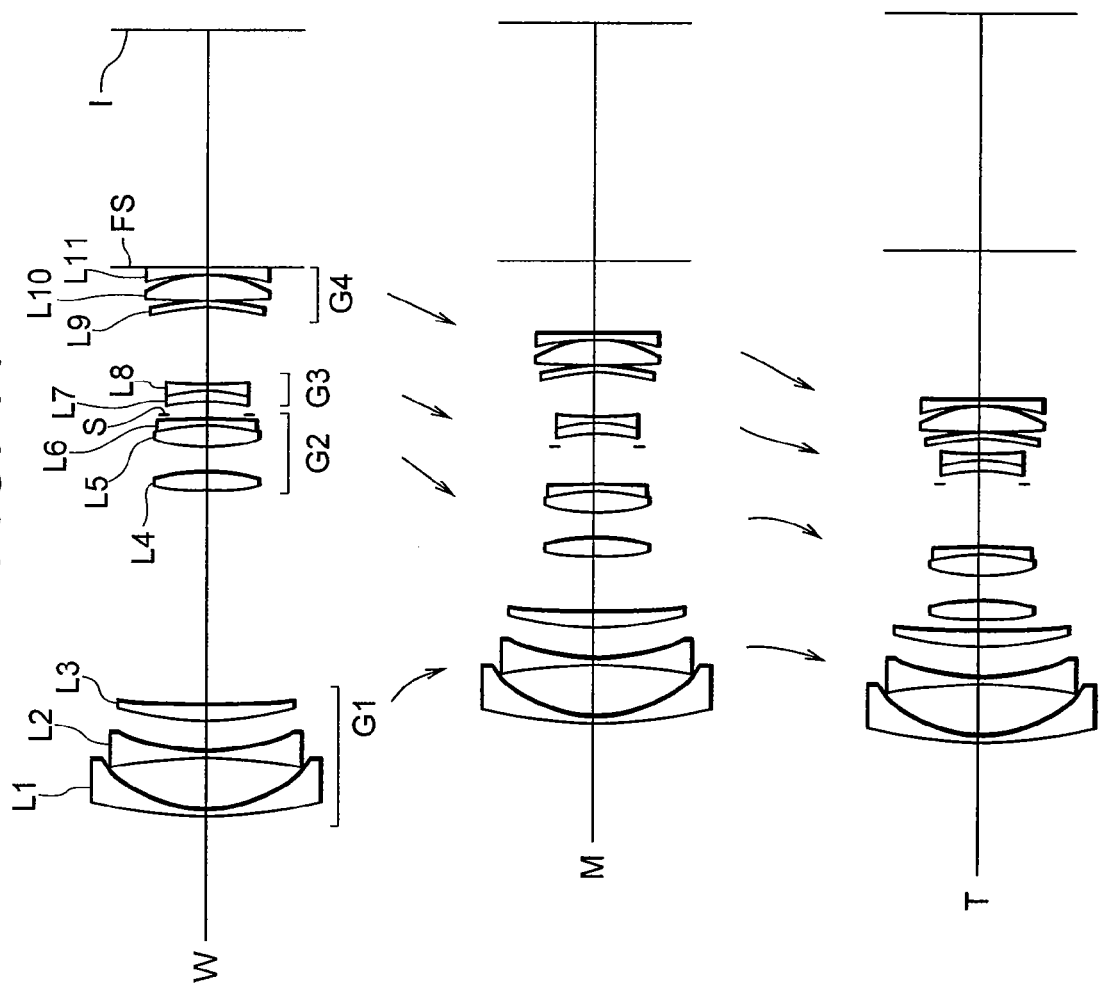

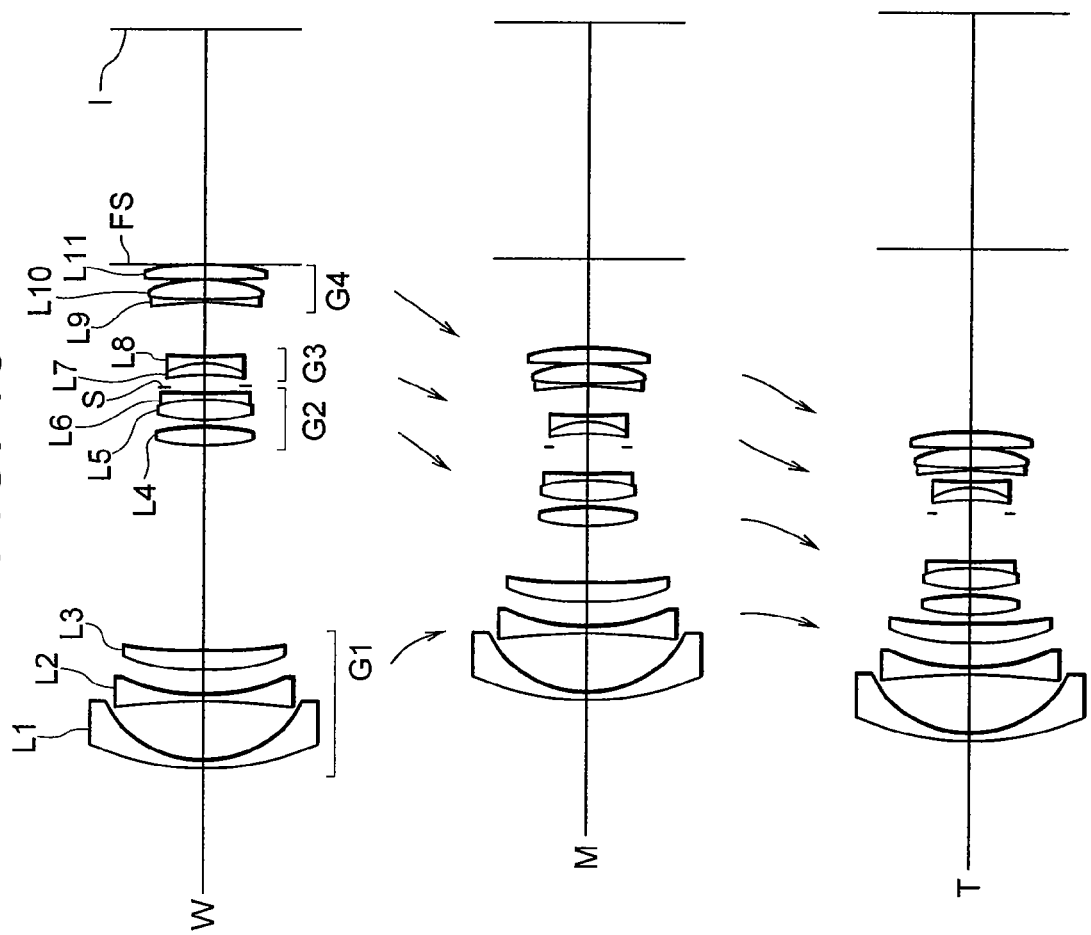

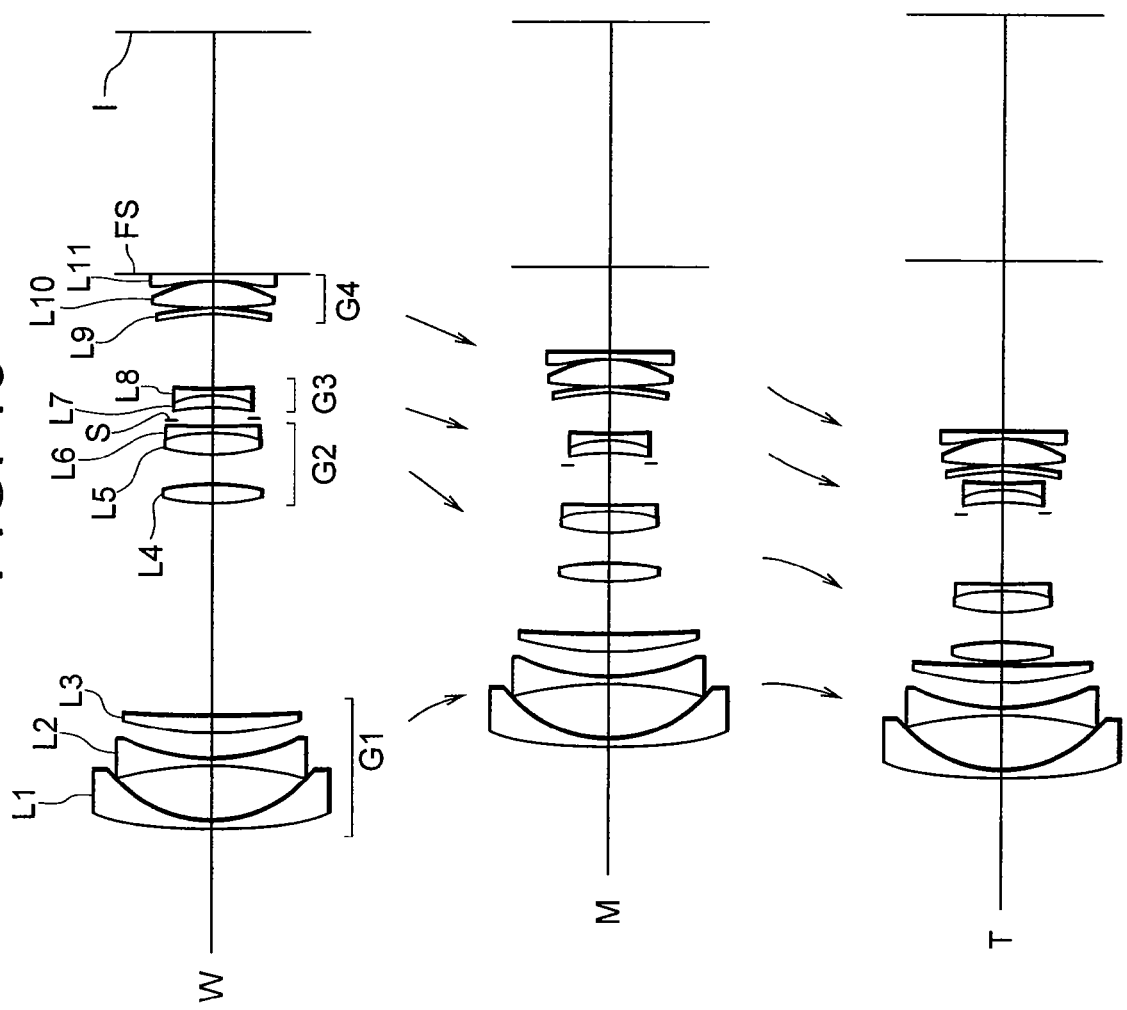

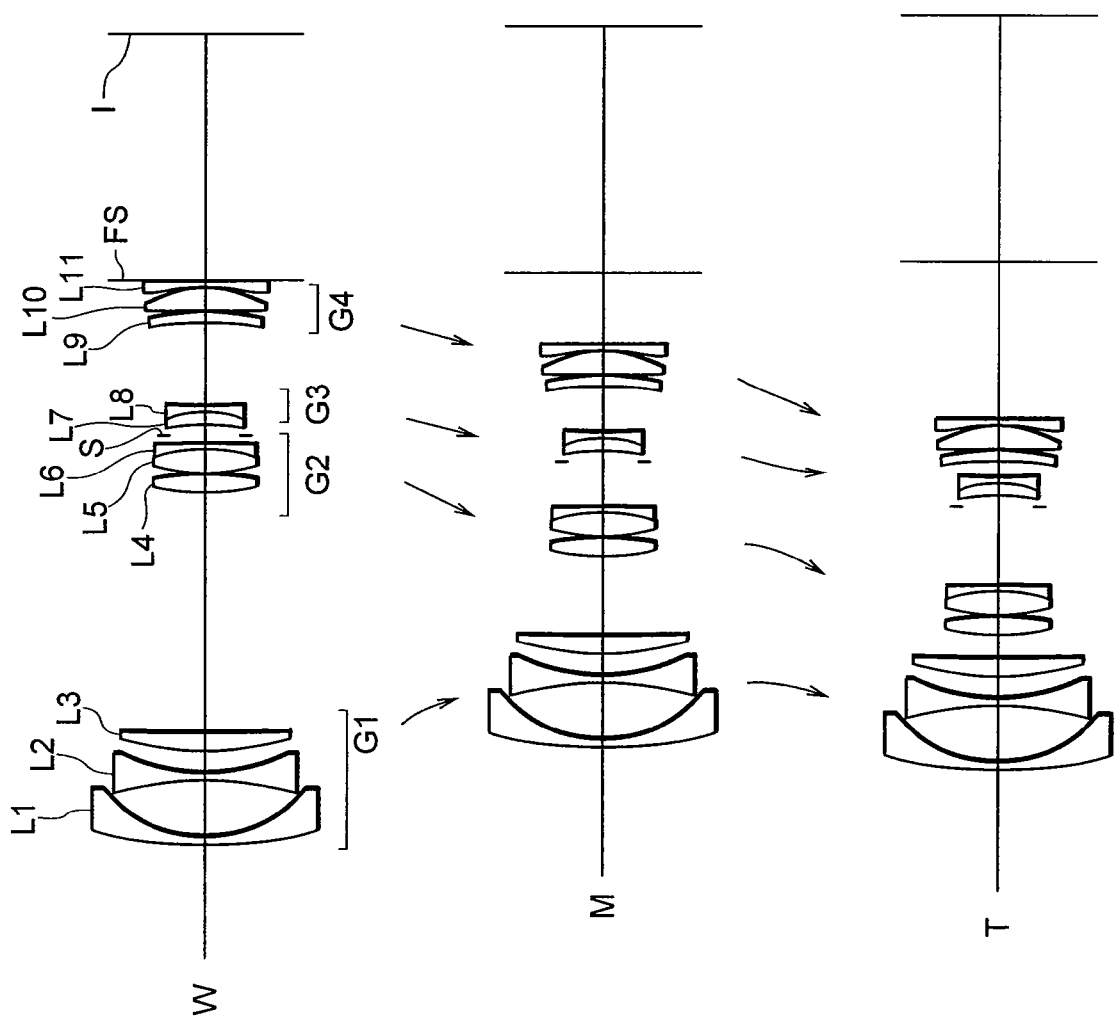

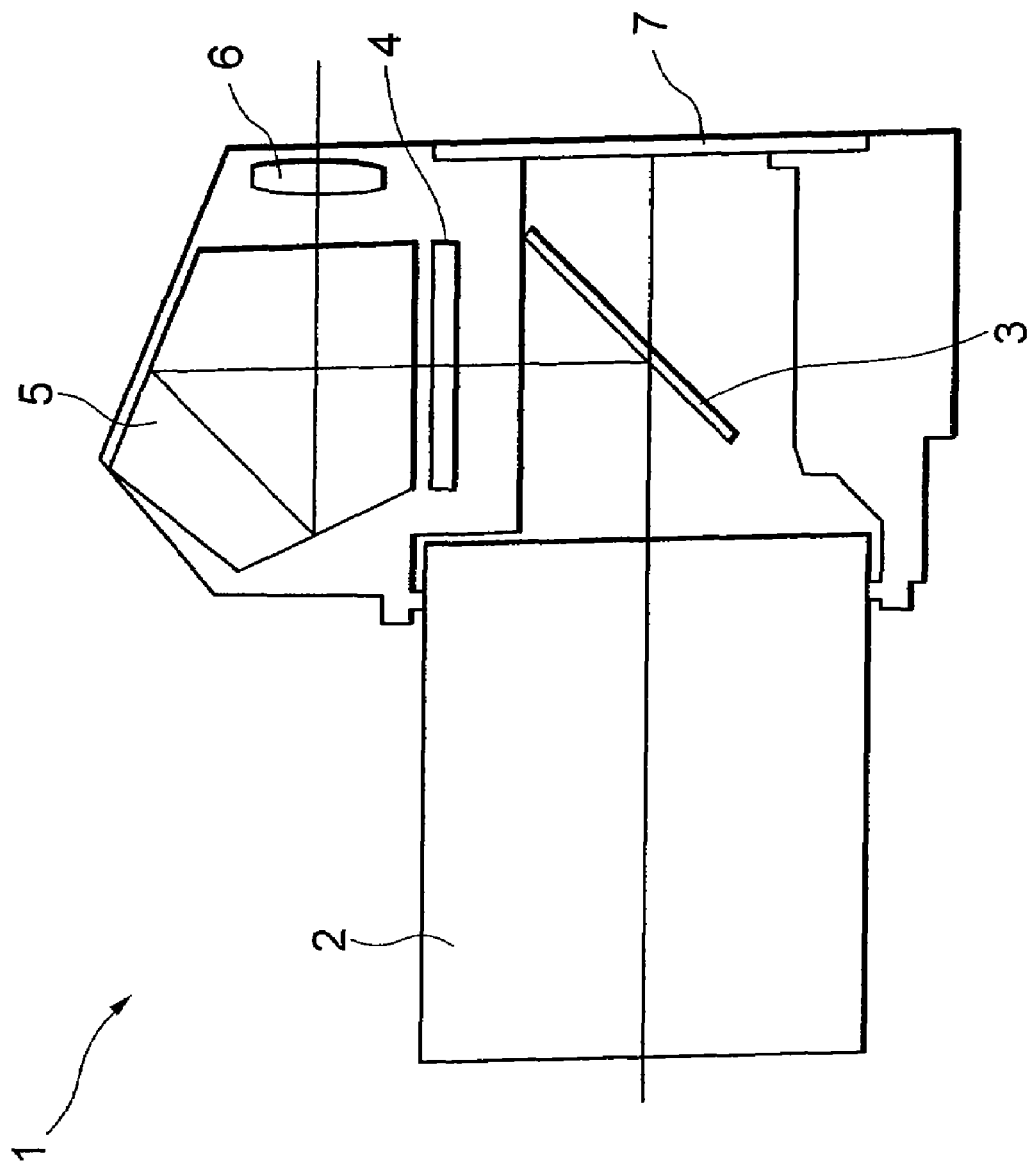

ZOOM LENS SYSTEM, IMAGING APPARATUS AND METHOD FOR VARYING FOCAL LENGTH

The disclosure of the following priority applications are herein incorporated by reference:
Japanese Patent Application No. 2006-081932;
Japanese Patent Application No. 2006-081933; and
Japanese Patent Application No. 2007-029615.

BACKGROUND OF THE INVENTION

1. Field of the Invention

The present invention relates to a zoom lens system, an imaging apparatus, and a method for varying a focal length of the zoom lens system.

2. Related Background Art

A negative-leading type zoom lens system in which a negative lens group is disposed to the most object side of the zoom lens system has been widely used as a wide-angle zoom lens system because of advantages such as a short minimum shooting distance and ease to make the focal length short in the wide-angle end state. Since power distribution of the negative-leading type zoom lens system becomes a retrofocus type having, in order from an object, negative-positive in a wide-angle end state, and a telephoto type having positive-negative in a telephoto end state, it becomes possible to make the focal length longer in the telephoto end state.

There has been proposed a negative-leading type zoom lens system that includes, in order from the object, a first lens group having negative refractive power, a second lens group having positive refractive power, a third lens group having negative refractive power, and a fourth lens group having positive refractive power, and carries out zooming by varying distances between adjacent lens groups (for example, Japanese Patent Application Laid-Open No. 5-019170).

Although the zoom lens system disclosed in Japanese Patent Application Laid-Open No. 5-019170 has a wide angle of view and a given zoom ratio and is small and compact with a low manufacturing cost, it is difficult to obtain good optical performance over entire focal length range, so that higher optical performance has been expected.

SUMMARY OF THE INVENTION

The present invention is made in view of the aforementioned problems and has an object to provide a zoom lens system capable of providing higher optical performance, an imaging apparatus, and a method for varying a focal length of the zoom lens system.

According to a first aspect of the present invention, there is provided a zoom lens system comprising, in order from an object: a first lens group having negative refractive power; a second lens group having positive refractive power; a third lens group having negative refractive power; and a fourth lens group having positive refractive power; wherein upon zooming from a wide-angle end state to a telephoto end state, each lens group moves along an optical axis such that a distance between the first lens group and the second lens group decreases, a distance between the second lens group and the third lens group increases, and the distance between the third lens group and the fourth lens group decreases; and the first lens group includes a negative lens, at least one lens in the negative lens includes an aspherical surface, and the negative lens satisfies the following conditional expressions (1) and (2):

$$30 \leq vd1 \leq 71 \quad (1)$$

when $30 \leq vd1 < 36$, $$-0.013 \times vd1 + 2.083 \leq nd1 \leq 1.7,$$

when $36 \leq vd1 < 41$, $$-0.013 \times vd1 + 2.083 \leq nd1 \leq -0.004 \times vd1 + 1.844,$$

when $41 \leq vd1 < 51$, $$-0.004 \times vd1 + 1.714 \leq nd1 \leq -0.004 \times vd1 + 1.844,$$

when $51 \leq vd1 < 61$, $$-0.0015 \times vd1 + 1.5865 \leq nd1 \leq -0.004 \times vd1 + 1.844,$$

when $61 \leq vd1 \leq 71$, $$-0.0015 \times vd1 + 1.5865 \leq nd1 \leq -0.009 \times vd1 + 2.149 \quad (2)$$

where nd1 denotes refractive index of a material of the negative lens in the first lens group at d-line, which has a wavelength λ=587.6 nm, and vd1 denotes Abbe number of a material of the negative lens in the first lens group at d-line, which has a wavelength λ=587.6 nm.

In the first aspect of the present invention, it is preferable that the second lens group includes a positive lens, and the positive lens in the second lens group satisfies the following conditional expressions (3) and (4):

$$30 \leq vd2 \leq 71 \quad (3)$$

when $30 \leq vd2 < 36$, $$-0.013 \times vd2 + 2.083 \leq nd2 \leq 1.7,$$

when $36 \leq vd2 < 41$, $$-0.013 \times vd2 + 2.083 \leq nd2 \leq -0.004 \times vd2 + 1.844,$$

when $41 \leq vd2 < 51$, $$-0.004 \times vd2 + 1.714 \leq nd2 \leq -0.004 \times vd2 + 1.844,$$

when $51 \leq vd2 < 61$, $$-0.0015 \times vd2 + 1.5865 \leq nd2 \leq -0.004 \times vd2 + 1.844,$$

when $61 \leq vd2 \leq 71$, $$-0.0015 \times vd2 + 1.5865 \leq nd2 \leq -0.009 \times vd2 + 2.149 \quad (4)$$

where nd2 denotes refractive index of a material of the positive lens in the second lens group at d-line, which has a wavelength λ=587.6 nm, and vd2 denotes Abbe number of a material of the positive lens in the second lens group at d-line, which has a wavelength λ=587.6 nm.

In the first aspect of the present invention, it is preferable that the fourth lens group includes a positive lens, and the positive lens in the fourth lens group satisfies the following conditional expressions (5) and (6):

$$30 \leq vd4 \leq 71 \quad (5)$$

when $30 \leq vd4 < 36$, $$-0.013 \times vd4 + 2.083 \leq nd4 \leq 1.7,$$

when $36 \leq vd4 < 41$, $$-0.013 \times vd4 + 2.083 \leq nd4 \leq -0.004 \times vd4 + 1.844,$$

when $41 \leq vd4 < 51$, $$-0.004 \times vd4 + 1.714 \leq nd4 \leq -0.004 \times vd4 + 1.844,$$

when $51 \leq vd4 < 61$, $$-0.0015 \times vd4 + 1.5865 \leq nd4 \leq -0.004 \times vd4 + 1.844,$$

when $61 \leq vd4 \leq 71$, $$-0.0015 \times vd4 + 1.5865 \leq nd4 \leq -0.009 \times vd4 + 2.149 \quad (6)$$

where nd4 denotes refractive index of a material of the positive lens in the fourth lens group at d-line, which has a wavelength $\lambda$=587.6 nm, and vd4 denotes Abbe number of a material of the positive lens in the fourth lens group at d-line, which has a wavelength $\lambda$=587.6 nm.

In the first aspect of the present invention, it is preferable that the first lens group includes, in order from the object, a negative meniscus lens having convex surface facing the object, a negative lens having a concave surface facing an image, and a positive lens having a convex surface facing the object.

In the first aspect of the present invention, it is preferable that the following conditional expression (7) is satisfied:

$$0.7 \leq (-f1)/fw \leq 1.7 \qquad (7)$$

where f1 denotes a focal length of the first lens group, and fw denotes a focal length of the zoom lens system in the wide-angle end state.

In the first aspect of the present invention, it is preferable that at least one of an image side surface of the negative meniscus lens or the image side surface of the negative lens in the first lens group is an aspherical surface, and the following conditional expression (8) is preferably satisfied:

$$0.32 \leq Rasp/(-f1) \leq 1.0 \qquad (8)$$

where Rasp denotes a paraxial radius of curvature of the aspherical surface, and f1 denotes a focal length of the first lens group.

In the first aspect of the present invention, it is preferable that the second lens group consists of two positive lenses and a negative lens.

In the first aspect of the present invention, it is preferable that the third lens group consists of a positive lens and a negative lens.

In the first aspect of the present invention, it is preferable that an aperture stop is disposed in the vicinity of the third lens group, and moved together with the third lens group in a body.

In the first aspect of the present invention, it is preferable that the fourth lens group consists of two positive lenses and a negative lens.

In the first aspect of the present invention, it is preferable that the second lens group is moved together with the fourth lens group in a body upon zooming from the telephoto end state to the wide-angle end state.

In the first aspect of the present invention, it is preferable that the following conditional expression (9) is satisfied:

$$1.0 \leq f2/fw \leq 2.3 \qquad (9)$$

where fw denotes a focal length of the zoom lens system in the wide-angle end state, and f2 denotes a focal length of the second lens group.

In the first aspect of the present invention, it is preferable that the following conditional expression (10) is satisfied:

$$0.8 \leq (-f3)/fw \leq 3.0 \qquad (10)$$

where fw denotes a focal length of the zoom lens system in the wide-angle end state, and f3 denotes a focal length of the third lens.

In the first aspect of the present invention, it is preferable that the following conditional expression (11) is satisfied:

$$0.8 \leq f4/fw \leq 2.0 \qquad (11)$$

where fw denotes a focal length of the zoom lens system in the wide-angle end state, and f4 denotes a focal length of the fourth lens group.

In the first aspect of the present invention, it is preferable that the fourth lens group includes a plastic aspherical lens.

In the first aspect of the present invention, it is preferable that the following conditional expression (12) is satisfied:

$$1.5 \leq f4/fw \leq 2.9 \qquad (12)$$

where fw denotes a focal length of the zoom lens system in the wide-angle end state, and f4 denotes a focal length of the fourth lens group.

In the first aspect of the present invention, it is preferable that the plastic aspherical lens in the fourth lens group satisfies the following conditional expression (13):

$$|f4/fP| \leq 0.9 \qquad (13)$$

where f4 denotes a focal length of the fourth lens group, and fP denotes a focal length of the plastic aspherical lens in the fourth lens group.

According to a second aspect of the present invention, there is provided an imaging apparatus equipped with a zoom lens according to the first aspect.

According to a third aspect of the present invention, there is provided a zoom lens system comprising, in order from an object: a first lens group having negative refractive power; a second lens group having positive refractive power; a third lens group having negative refractive power; and a fourth lens group having positive refractive power; wherein upon zooming from a wide-angle end state to a telephoto end state, each lens group moves along an optical axis such that a distance between the first lens group and the second lens group decreases, a distance between the second lens group and the third lens group increases, and a distance between the third lens group and the fourth lens group decreases; and the first lens group includes a negative lens, and the negative lens in the first lens group satisfies the following conditional expressions (1) and (2):

$$30 \leq vd1 \leq 71 \qquad (1)$$

when $30 \leq vd1 < 36$, $$-0.013 \times vd1 + 2.083 \leq nd1 \leq 1.7,$$

when $36 \leq vd1 < 41$, $$-0.013 \times vd1 + 2.083 \leq nd1 \leq -0.004 \times vd1 + 1.844,$$

when $41 \leq vd1 < 51$, $$-0.004 \times vd1 + 1.714 \leq nd1 \leq -0.004 \times vd1 + 1.844,$$

when $51 \leq vd1 < 61$, $$-0.0015 \times vd1 + 1.5865 \leq nd1 \leq -0.004 \times vd1 + 1.844,$$

when $61 \leq vd1 \leq 71$, $$-0.0015 \times vd1 + 1.5865 \leq nd1 \leq -0.009 \times vd1 + 2.149 \qquad (2)$$

where nd1 denotes refractive index of a material of the negative lens in the first lens group at d-line, which has a wavelength $\lambda$=587.6 nm, and vd1 denotes Abbe number of a material of the negative lens in the first lens group at d-line, which has a wavelength $\lambda$=587.6 nm; and wherein the second lens group includes a positive lens, and the positive lens in the second lens group satisfies the following conditional expressions (3) and (4):

$$30 \leq vd2 \leq 71 \tag{3}$$

when $30 \leq vd2 < 36$, $$-0.013 \times vd2 + 2.083 \leq nd2 \leq 1.7,$$

when $36 \leq vd2 < 41$, $$-0.013 \times vd2 + 2.083 \leq nd2 \leq -0.004 \times vd2 + 1.844,$$

when $41 \leq vd2 < 51$, $$-0.004 \times vd2 + 1.714 \leq nd2 \leq -0.004 \times vd2 + 1.844,$$

when $51 \leq vd2 < 61$, $$-0.0015 \times vd2 + 1.5865 \leq nd2 \leq -0.004 \times vd2 + 1.844,$$

when $61 \leq vd2 \leq 71$, $$-0.0015 \times vd2 + 1.5865 \leq nd2 \leq -0.009 \times vd2 + 2.149 \tag{4}$$

where nd2 denotes refractive index of a material of the positive lens in the second lens group at d-line, which has a wavelength $\lambda=587.6$ nm, and vd2 denotes Abbe number of a material of the positive lens in the second lens group at d-line, which has a wavelength $\lambda=587.6$ nm.

According to a fourth aspect of the present invention, there is provided a zoom lens system comprising, in order from an object: a first lens group having negative refractive power; a second lens group having positive refractive power; a third lens group having negative refractive power; and a fourth lens group having positive refractive power; wherein upon zooming from a wide-angle end state to a telephoto end state, each lens group moves along an optical axis such that a distance between the first lens group and the second lens group decreases, a distance between the second lens group and the third lens group increases, and a distance between the third lens group and the fourth lens group decreases; and the first lens group includes a negative lens, and the negative lens in the first lens group satisfies the following conditional expressions (1) and (2):

$$30 \leq vd1 \leq 71 \tag{1}$$

when $30 \leq vd1 < 36$, $$-0.013 \times vd1 + 2.083 \leq nd1 \leq 1.7,$$

when $36 \leq vd1 < 41$, $$-0.013 \times vd1 + 2.083 \leq nd1 \leq -0.004 \times vd1 + 1.844,$$

when $41 \leq vd1 < 51$, $$-0.004 \times vd1 + 1.714 \leq nd1 \leq -0.004 \times vd1 + 1.844,$$

when $51 \leq vd1 < 61$, $$-0.0015 \times vd1 + 1.5865 \leq nd1 \leq -0.004 \times vd1 + 1.844,$$

when $61 \leq vd1 \leq 71$, $$-0.0015 \times vd1 + 1.5865 \leq nd1 \leq -0.009 \times vd1 + 2.149 \tag{2}$$

where nd1 denotes refractive index of a material of the negative lens in the first lens group at d-line, which has a wavelength $\lambda=587.6$ nm, and vd1 denotes Abbe number of a material of the negative lens in the first lens group at d-line, which has a wavelength $\lambda=587.6$ nm; and wherein the fourth lens group includes a positive lens, and the positive lens in the fourth lens group satisfies the following conditional expressions (5) and (6):

$$30 \leq vd4 \leq 71 \tag{5}$$

when $30 \leq vd4 < 36$, $$-0.013 \times vd4 + 2.083 \leq nd4 \leq 1.7,$$

when $36 \leq vd4 < 41$, $$-0.013 \times vd4 + 2.083 \leq nd4 \leq -0.004 \times vd4 + 1.844,$$

when $41 \leq vd4 < 51$, $$-0.004 \times vd4 + 1.714 \leq nd4 \leq -0.004 \times vd4 + 1.844,$$

when $51 \leq vd4 < 61$, $$-0.0015 \times vd4 + 1.5865 \leq nd4 \leq -0.004 \times vd4 + 1.844,$$

when $61 \leq vd4 \leq 71$, $$-0.0015 \times vd4 + 1.5865 \leq nd4 \leq -0.009 \times vd4 + 2.149 \tag{6}$$

where nd4 denotes refractive index of a material of the positive lens in the fourth lens group at d-line, which has a wavelength $\lambda=587.6$ nm, and vd4 denotes Abbe number of a material of the positive lens in the fourth lens group at d-line, which has a wavelength $\lambda=587.6$ nm.

According to a fifth aspect of the present invention, there is provided a method for forming an image of an object and varying a focal length of a zoom lens system that comprises, in order from the object, a first lens group having negative refractive power, a second lens group having positive refractive power, a third lens group having negative refractive power, and a fourth lens group having positive refractive power, the method comprising steps of: moving each lens group along an optical axis such that a distance between the first lens group and the second lens group decreases, a distance between the second lens group and the third lens group increases, and a distance between the third lens group and the fourth lens group decreases upon zooming from a wide-angle end state to a telephoto end state; providing the first lens group including a negative lens; providing an aspherical surface on at least one lens in the negative lens in the first lens group; and satisfying the following conditional expressions (1) and (2):

$$30 \leq vd1 \leq 71 \tag{1}$$

when $30 \leq vd1 < 36$, $$-0.013 \times vd1 + 2.083 \leq nd1 \leq 1.7,$$

when $36 \leq vd1 < 41$, $$-0.013 \times vd1 + 2.083 \leq nd1 \leq -0.004 \times vd1 + 1.844,$$

when $41 \leq vd1 < 51$, $$-0.004 \times vd1 + 1.714 \leq nd1 \leq -0.004 \times vd1 + 1.844,$$

when $51 \leq vd1 < 61$, $$-0.0015 \times vd1 + 1.5865 \leq nd1 \leq -0.004 \times vd1 + 1.844,$$

when $61 \leq vd1 \leq 71$, $$-0.0015 \times vd1 + 1.5865 \leq nd1 \leq -0.009 \times vd1 + 2.149 \tag{2}$$

where nd1 denotes refractive index of a material of the negative lens in the first lens group at d-line, which has a wavelength $\lambda=587.6$ nm, and vd1 denotes Abbe number of a material of the negative lens in the first lens group at d-line, which has a wavelength $\lambda=587.6$ nm.

In the fifth aspect of the present invention, it is preferable that the method further comprises steps of: providing the second lens group including a positive lens, and satisfying the following conditional expressions (3) and (4):

$$30 \leq vd2 \leq 71 \tag{3}$$

when $30 \leq vd2 < 36$, $$-0.013 \times vd2 + 2.083 \leq nd2 \leq 1.7,$$

when $36 \leq vd2 < 41$, $$-0.013 \times vd2 + 2.083 \leq nd2 \leq -0.004 \times vd2 + 1.844,$$

when $41 \leq vd2 < 51$, $-0.004 \times vd2 + 1.714 \leq nd2 \leq -0.004 \times vd2 + 1.844$, when $51 \leq vd2 < 61$, $-0.0015 \times vd2 + 1.5865 \leq nd2 \leq -0.004 \times vd2 + 1.844$, when $61 \leq vd2 \leq 71$, $-0.0015 \times vd2 + 1.5865 \leq nd2 \leq -0.009 \times vd2 + 2.149$ (4)

where nd2 denotes refractive index of a material of the positive lens in the second lens group at d-line, which has a wavelength $\lambda = 587.6$ nm, and vd2 denotes Abbe number of a material of the positive lens in the second lens group at d-line, which has a wavelength $\lambda = 587.6$ nm.

In the fifth aspect of the present invention, it is preferable that the method further comprises steps of: providing the fourth lens group including a positive lens; and satisfying the following conditional expressions (5) and (6):

$30 \leq vd4 \leq 71$ (5)

when $30 \leq vd4 < 36$, $-0.013 \times vd4 + 2.083 \leq nd4 \leq 1.7$, when $36 \leq vd4 < 41$, $-0.013 \times vd4 + 2.083 \leq nd4 \leq -0.004 \times vd4 + 1.844$, when $41 \leq vd4 < 51$, $-0.004 \times vd4 + 1.714 \leq nd4 \leq -0.004 \times vd4 + 1.844$, when $51 \leq vd4 < 61$, $-0.0015 \times vd4 + 1.5865 \leq nd4 \leq -0.004 \times vd4 + 1.844$, when $61 \leq vd4 \leq 71$, $-0.0015 \times vd4 + 1.5865 \leq nd4 \leq -0.009 \times vd4 + 2.149$ (6)

where nd4 denotes refractive index of a material of the positive lens in the fourth lens group at d-line, which has a wavelength $\lambda = 587.6$ nm, and vd4 denotes Abbe number of a material of the positive lens in the fourth lens group at d-line, which has a wavelength $\lambda = 587.6$ nm.

According to a sixth aspect of the present invention, there is provided a method for forming an image of an object and varying a focal length of a zoom lens system that comprises, in order from the object, a first lens group having negative refractive power, a second lens group having positive refractive power, a third lens group having negative refractive power, and a fourth lens group having positive refractive power, the method comprising steps of: moving each lens group along an optical axis such that a distance between the first lens group and the second lens group decreases, a distance between the second lens group and the third lens group increases, and a distance between the third lens group and the fourth lens group decreases upon zooming from a wide-angle end state to a telephoto end state; providing the first lens group including a negative lens; satisfying the following conditional expressions (1) and (2):

$30 \leq vd1 \leq 71$ (1)

when $30 \leq vd1 < 36$, $-0.013 \times vd1 + 2.083 \leq nd1 \leq 1.7$, when $36 \leq vd1 < 41$, $-0.013 \times vd1 + 2.083 \leq nd1 \leq -0.004 \times vd1 + 1.844$, when $41 \leq vd1 < 51$, $-0.004 \times vd1 + 1.714 \leq nd1 \leq -0.004 \times vd1 + 1.844$, when $51 \leq vd1 < 61$, $-0.0015 \times vd1 + 1.5865 \leq nd1 \leq -0.004 \times vd1 + 1.844$, when $61 \leq vd1 \leq 71$, $-0.0015 \times vd1 + 1.5865 \leq nd1 \leq -0.009 \times vd1 + 2.149$ (2)

where nd1 denotes refractive index of a material of the negative lens in the first lens group at d-line, which has a wavelength $\lambda = 587.6$ nm, and vd1 denotes Abbe number of a material of the negative lens in the first lens group at d-line, which has a wavelength $\lambda = 587.6$ nm; providing the second lens group including a positive lens; and satisfying the following conditional expressions (3) and (4):

$30 \leq vd2 \leq 71$ (3)

when $30 \leq vd2 < 36$, $-0.013 \times vd2 + 2.083 \leq nd2 \leq 1.7$, when $36 \leq vd2 < 41$, $-0.013 \times vd2 + 2.083 \leq nd2 \leq -0.004 \times vd2 + 1.844$, when $41 \leq vd2 < 51$, $-0.004 \times vd2 + 1.714 \leq nd2 \leq -0.004 \times vd2 + 1.844$, when $51 \leq vd2 < 61$, $-0.0015 \times vd2 + 1.5865 \leq nd2 \leq -0.004 \times vd2 + 1.844$, when $61 \leq vd2 \leq 71$, $-0.0015 \times vd2 + 1.5865 \leq nd2 \leq -0.009 \times vd2 + 2.149$ (4)

where nd2 denotes refractive index of a material of the positive lens in the second lens group at d-line, which has a wavelength $\lambda = 587.6$ nm, and vd2 denotes Abbe number of a material of the positive lens in the second lens group at d-line, which has a wavelength $\lambda = 587.6$ nm.

According to a seventh aspect of the present invention, there is provided a method for forming an image of an object and varying a focal length of a zoom lens system that comprises, in order from the object, a first lens group having negative refractive power, a second lens group having positive refractive power, a third lens group having negative refractive power, and a fourth lens group having positive refractive power, the method comprising steps of: moving each lens group along an optical axis such that a distance between the first lens group and the second lens group decreases, a distance between the second lens group and the third lens group increases, and a distance between the third lens group and the fourth lens group decreases upon zooming from a wide-angle end state to a telephoto end state; providing the first lens group including a negative lens; satisfying the following conditional expressions (1) and (2):

$30 \leq vd1 \leq 71$ (1)

when $30 \leq vd1 < 36$, $-0.013 \times vd1 + 2.083 \leq nd1 \leq 1.7$, when $36 \leq vd1 < 41$, $-0.013 \times vd1 + 2.083 \leq nd1 \leq -0.004 \times vd1 + 1.844$, when $41 \leq vd1 < 51$, $-0.004 \times vd1 + 1.714 \leq nd1 \leq -0.004 \times vd1 + 1.844$, when $51 \leq vd1 < 61$, $-0.0015 \times vd1 + 1.5865 \leq nd1 \leq -0.004 \times vd1 + 1.844$, when $61 \leq vd1 \leq 71$, $-0.0015 \times vd1 + 1.5865 \leq nd1 \leq -0.009 \times vd1 + 2.149$ (2)

where nd1 denotes refractive index of a material of the negative lens in the first lens group at d-line, which has a wavelength λ=587.6 nm, and vd1 denotes Abbe number of a material of the negative lens in the first lens group at d-line, which has a wavelength λ=587.6 nm; providing the fourth lens group including a positive lens; and satisfying the following conditional expressions (5) and (6):

$$30 \leq vd4 \leq 71 \quad (5)$$

when $30 \leq vd4 < 36$, $$-0.013 \times vd4 + 2.083 \leq nd4 \leq 1.7,$$

when $36 \leq vd4 < 41$, $$-0.013 \times vd4 + 2.083 \leq nd4 \leq -0.004 \times vd4 + 1.844,$$

when $41 \leq vd4 < 51$, $$-0.004 \times vd4 + 1.714 \leq nd4 \leq -0.004 \times vd4 + 1.844,$$

when $51 \leq vd4 < 61$, $$-0.0015 \times vd4 + 1.5865 \leq nd4 \leq -0.004 \times vd4 + 1.844,$$

when $61 \leq vd4 \leq 71$, $$-0.0015 \times vd4 + 1.5865 \leq nd4 \leq -0.009 \times vd4 + 2.149 \quad (6)$$

where nd4 denotes refractive index of a material of the positive lens in the fourth lens group at d-line, which has a wavelength λ=587.6 nm, and vd4 denotes Abbe number of a material of the positive lens in the fourth lens group at d-line, which has a wavelength λ=587.6 nm.

Other features and advantages according to the present invention will be readily understood from the detailed description of the most preferred embodiments in conjunction with the accompanying drawings.

BRIEF DESCRIPTION OF THE DRAWINGS

FIG. 1 is a diagram showing a lens configuration of a zoom lens system according to Example 1 of a first embodiment together with a zooming trajectory of each lens group.

FIG. 3 is a diagram showing a lens configuration of a zoom lens system according to Example 2 of the first embodiment together with a zooming trajectory of each lens group.

FIG. 5 is a diagram showing a lens configuration of a zoom lens system according to Example 3 of the first embodiment together with a zooming trajectory of each lens group.

FIG. 7 is a diagram showing a lens configuration of a zoom lens system according to Example 4 of the first embodiment together with a zooming trajectory of each lens group.

FIG. 9 is a diagram showing a lens configuration of a zoom lens system according to Example 5 of a second embodiment together with a zooming trajectory of each lens group.

FIG. 11 is a diagram showing a lens configuration of a zoom lens system according to Example 6 of the second embodiment together with a zooming trajectory of each lens group.

FIG. 13 is a diagram showing a lens configuration of a zoom lens system according to Example 7 of the second embodiment together with a zooming trajectory of each lens group.

FIG. 15 is a diagram showing a lens configuration of a zoom lens system according to Example 8 of the second embodiment together with a zooming trajectory of each lens group.

FIG. 17 is a diagram showing a lens configuration of a zoom lens system according to Example 9 of the second embodiment together with a zooming trajectory of each lens group.

FIG. 19 is a schematic diagram showing an imaging apparatus using a zoom lens system according to Example 1.

DESCRIPTION OF THE MOST PREFERRED EMBODIMENT

Figure 2A:
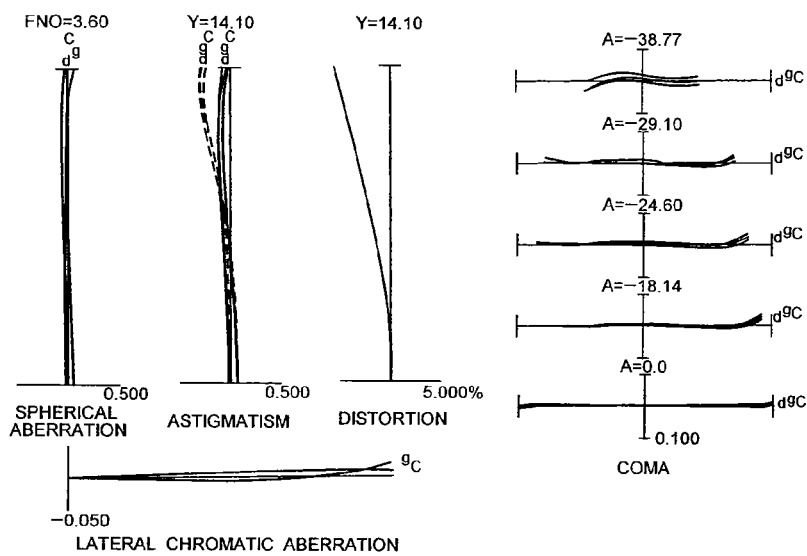
FIGS. 2A, 2B and 2C are graphs showing various aberrations of the zoom lens system according to Example 1 of the first embodiment in a wide-angle end state, in an intermediate focal length state, in a telephoto end state, respectively.

A zoom lens system, an imaging apparatus, and a method for varying a focal length of the zoom lens system are explained below.

Generally, correction of aberrations of each lens group composing the zoom lens system is carrying out in the following manner.

Correction of chromatic aberration is carried out in the following manner that in a positive lens group, a positive lens made of a glass with low refractive index and low dispersion is combined with a negative lens made of a glass with high refractive index and high dispersion, and in a negative lens group, a negative lens made of a glass with low refractive index and low dispersion is combined with a positive lens made of a glass with high refractive index and high dispersion. Accordingly, positive refractive power of the positive lens in the positive lens group has to be large, and refractive power of the negative lens in the negative lens group has to be large.

Moreover, correction of various aberrations such as spherical aberration, and coma has to be carried out in each lens group up to a point. Incidentally, the larger a deviation angle becomes, the lager various aberrations generate. The tendency becomes conspicuous as refractive index becomes small.

Accordingly, in order to correct various aberrations together with chromatic aberration in a zoom lens system, it is effective that a plurality of positive lenses are disposed in a positive lens group, and a plurality of negative lenses are disposed in a negative lens group.

First Embodiment

On the above-described assumption, a zoom lens system according to the first embodiment has a construction using light, low cost glass materials as those of positive lens in a positive lens group and negative lens in a negative lens group in order to realize high optical performance despite of compactness and lightweight as well as a low cost.

A zoom lens system according to the first embodiment includes, in order from an object, a first lens group having negative refractive power, a second lens group having positive refractive power, a third lens group having negative refractive power, and a fourth lens group having positive refractive power. Upon zooming from a wide-angle end state to a telephoto end state, each lens group moves along an optical axis such that a distance between the first lens group and the second lens group decreases, a distance between the second lens group and the third lens group increases, and a distance between the third lens group and the fourth lens group decreases. The first lens group includes a negative lens, at least one lens in the negative lens includes an aspherical surface, and the negative lens satisfies the following conditional expressions (1) and (2):

$$30 \leq vd1 \leq 71 \tag{1}$$

when $30 \leq vd1 < 36$, $$-0.013 \times vd1 + 2.083 \leq nd1 \leq 1.7,$$

when $36 \leq vd1 < 41$, $$-0.013 \times vd1 + 2.083 \leq nd1 \leq -0.004 \times vd1 + 1.844,$$

when $41 \leq vd1 < 51$, $$-0.004 \times vd1 + 1.714 \leq nd1 \leq -0.004 \times vd1 + 1.844,$$

when $51 \leq vd1 < 61$, $$-0.0015 \times vd1 + 1.5865 \leq nd1 \leq -0.004 \times vd1 + 1.844,$$

when $61 \leq vd1 \leq 71$, $$-0.0015 \times vd1 + 1.5865 \leq nd1 \leq -0.009 \times vd1 + 2.149 \tag{2}$$

where nd1 denotes refractive index of a material of the negative lens in the first lens group at d-line, which has a wavelength $\lambda = 587.6$ nm, and vd1 denotes Abbe number of a material of the negative lens in the first lens group at d-line, which has a wavelength $\lambda = 587.6$ nm.

In a negative-leading type four-lens-group zoom lens system with a wide angle of view, in order to secure a wide angle of view in the wide-angle end state, the diameter of the first lens group becomes large, so that the first lens group has large proportions of total weight and cost. On the other hand, the third lens group, which does not much contribute to zooming and is mainly in charge of correction of aberrations and adjustment of the position of the principal point, has a small diameter, so that it has small proportions of total weight and cost. The second lens group and the fourth lens group having positive refractive power have an important function for zooming. In particular, the diameter of the fourth lens group is large in order to secure a wide angle of view in the wide-angle end state.

Conditional expression (1) is for properly defining Abbe number of the negative lens in the first lens group having negative refractive power. When the value vd1 falls below the lower limit of conditional expression (1), it becomes difficult to correct lateral chromatic aberration in the wide-angle end state.

On the other hand, when the value vd1 exceeds the upper limit of conditional expression (1), refractive index tends to lower, so that it becomes difficult to correct spherical aberration and distortion.

Conditional expression (2) is for properly defining refractive index of the negative lens in the first lens group having negative refractive power. When the value nd1 falls below the lower limit of conditional expression (2), it becomes difficult to simultaneously correct lateral chromatic aberration and negative distortion in the wide-angle end state.

On the other hand, when the value nd1 exceeds the upper limit of conditional expression (2), an expensive glass material with a high specific gravity such as dense barium crown glass or lanthanum crown glass has to be used for the glass material of the negative lens in the first lens group. Accordingly, in order to avoid increase in weight and cost, the number of lens elements in the first lens group has to be reduced. As a result, it becomes difficult to simultaneously correct lateral chromatic aberration and negative distortion in the wide-angle end state.

In a zoom lens system according to the first embodiment, the second lens group preferably has a positive lens, and the positive lens in the second lens group preferably satisfy the following conditional expressions (3) and (4):

$$30 \leq vd2 \leq 71 \tag{3}$$

when $30 \leq vd2 < 36$, $$-0.013 \times vd2 + 2.083 \leq nd2 \leq 1.7,$$

when $36 \leq vd2 < 41$, $$-0.013 \times vd2 + 2.083 \leq nd2 \leq -0.004 \times vd2 + 1.844,$$

when $41 \leq vd2 < 51$, $$-0.004 \times vd2 + 1.714 \leq nd2 \leq -0.004 \times vd2 + 1.844,$$

when $51 \leq vd2 < 61$, $$-0.0015 \times vd2 + 1.5865 \leq nd2 \leq -0.004 \times vd2 + 1.844,$$

when $61 \leq vd2 \leq 71$, $$-0.0015 \times vd2 + 1.5865 \leq nd2 \leq -0.009 \times vd2 + 2.149 \tag{4}$$

where nd2 denotes refractive index of a material of the positive lens in the second lens group at d-line, which has a wavelength $\lambda = 587.6$ nm, and vd2 denotes Abbe number of a material of the positive lens in the second lens group at d-line, which has a wavelength $\lambda = 587.6$ nm.

Conditional expression (3) is for properly defining Abbe number of the positive lens in the second lens group having positive refractive power. When the value vd2 falls below the lower limit of conditional expression (3), it becomes difficult to correct lateral chromatic aberration in the wide-angle end state.

On the other hand, when the value vd2 exceeds the upper limit of conditional expression (3), refractive index tends to lower, so that it becomes difficult to correct spherical aberration and distortion.

Conditional expression (4) is for properly defining refractive index of the positive lens in the second lens group having positive refractive power. When the value nd2 falls below the lower limit of conditional expression (4), it becomes difficult to simultaneously correct spherical aberration and longitudinal chromatic aberration in the telephoto end state.

On the other hand, when the value nd2 exceeds the upper limit of conditional expression (4), an expensive glass material with a high specific gravity such as dense barium crown glass or lanthanum crown glass has to be used for the glass material of the positive lens in the second lens group. Accordingly, in order to avoid increase in weight and cost, the number of lens elements in the second lens group has to be reduced. As a result, it becomes difficult to simultaneously correct spherical aberration and longitudinal chromatic aberration in the telephoto end state.

In a zoom lens system according to the first embodiment, the fourth lens group preferably has a positive lens, and the positive lens in the fourth lens group preferably satisfies the following conditional expressions (5) and (6):

$$30 \leq vd4 \leq 71 \tag{5}$$

when $30 \leq vd4 < 36$, $$-0.013 \times vd4 + 2.083 \leq nd4 \leq 1.7,$$

when $36 \leq vd4 < 41$, $$-0.013 \times vd4 + 2.083 \leq nd4 \leq -0.004 \times vd4 + 1.844,$$

when $41 \leq vd4 < 51$, $$-0.004 \times vd4 + 1.714 \leq nd4 \leq -0.004 \times vd4 + 1.844,$$

when $51 \leq vd4 < 61$, $$-0.0015 \times vd4 + 1.5865 \leq nd4 \leq -0.004 \times vd4 + 1.844,$$

when $61 \leq vd4 \leq 71$, $$-0.0015 \times vd4 + 1.5865 \leq nd4 \leq -0.009 \times vd4 + 2.149 \tag{6}$$

where nd4 denotes refractive index of a material of the positive lens in the fourth lens group at d-line, which has a wavelength λ=587.6 nm, and vd4 denotes Abbe number of a material of the positive lens in the fourth lens group at d-line, which has a wavelength λ=587.6 nm.

Conditional expression (5) is for properly defining Abbe number of the positive lens in the fourth lens group having positive refractive power. When the value vd4 falls below the lower limit of conditional expression (5), it becomes difficult to correct lateral chromatic aberration in the wide-angle end state.

On the other hand, when the value vd4 exceeds the upper limit of conditional expression (5), refractive index tends to lower, so that it becomes difficult to correct spherical aberration and distortion.

Conditional expression (6) is for properly defining refractive index of the positive lens in the fourth lens group having positive refractive power. When the value nd4 falls below the lower limit of conditional expression (6), it becomes difficult to simultaneously correct lateral chromatic aberration and curvature of field in the wide-angle end state, coma in an intermediate focal length state, and longitudinal chromatic aberration in the telephoto end state.

On the other hand, when the value nd4 exceeds the upper limit of conditional expression (6), an expensive glass material with a high specific gravity such as dense barium crown glass or lanthanum crown glass has to be used for the glass material of the positive lens in the fourth lens group. Accordingly, in order to avoid increase in weight and cost, the number of lens elements in the fourth lens group has to be reduced. As a result, it becomes difficult to simultaneously correct lateral chromatic aberration and curvature of field in the wide-angle end state, coma in the intermediate focal length state, and longitudinal chromatic aberration in the telephoto end state.

In a zoom lens system according to the first embodiment, it is preferable that the first lens group includes, in order from the object, a negative meniscus lens having a convex surface facing the object, a negative lens having a concave surface facing an image, and a positive lens having a convex surface facing the object, and the following conditional expression (7) is preferably satisfied:

$$0.7 \leq (-f1)/fw \leq 1.7 \tag{7}$$

where f1 denotes a focal length of the first lens group, and fw denotes a focal length of the zoom lens system in the wide-angle end state.

In order to suppress the diameter of the front lens disposed to the most object side with securing a sufficient angle of view, it is generally known that a negative lens is disposed to the object side of the first lens group. By disposing a plurality of negative lens elements in the first lens group, it becomes possible to preferably correct various aberrations with respect to an angle of view such as curvature of field and distortion. Moreover, by making each surface aplanatic toward an aperture stop, it becomes possible to prevent aberrations from generating. Furthermore, by disposing a positive lens in the first lens group, it becomes possible to simultaneously correct chromatic aberration and spherical aberration.

In a zoom lens system according to the first embodiment, when the image side of the second negative lens counted from the object side in the first lens group is a concave surface in order to mainly focus on correcting aberrations with respect to an angle of view in the wide-angle end state, spherical aberration is generated largely in the telephoto end state. Accordingly, in order to correct such spherical aberration, it is necessary to have a lens having a convex surface facing the object right after (to the image side of) the second negative lens counted from the object side in the first lens group. In consideration of correcting chromatic aberration, the lens becomes a positive lens.

Conditional expression (7) is for defining a focal length of the first lens group. When the ratio (−f1)/fw falls below the lower limit of conditional expression (7), it becomes difficult to correct aberrations with respect to an angle of view such as distortion, curvature of field and astigmatism in the wide-angle end state.

In order to secure the effect of the present embodiment, it is preferable to set the lower limit of conditional expression (7) to 1.0, and it is further preferable to set the lower limit of conditional expression (7) to 1.4.

On the other hand, when the ratio (−f1)/fw exceeds the upper limit of conditional expression (7), although the aforementioned various aberrations can be corrected, it becomes difficult to secure a back focal length. In order to secure the back focal length, the focal length of the third lens group has to be made small. As a result, it becomes difficult to correct spherical aberration in the telephoto end state and coma over entire focal length range.

In a zoom lens system according to the first embodiment, it is preferable that the first lens group has at least one aspherical surface.

With this configuration, curvature of field and astigmatism can be corrected well.

In a zoom lens system according to the first embodiment, at least one of the image side surface of the negative meniscus lens and the image side surface of the negative lens in the first lens group is an aspherical surface, and the following conditional expression (8) is preferably satisfied:

$$0.32 \leq Rasp/(-f1) \leq 1.0 \qquad (8)$$

where Rasp denotes a paraxial radius of curvature of the aspherical surface, f1 denotes a focal length of the first lens group.

Conditional expression (8) is for defining the shape of the aspherical surface in order to set a degree of aberration correction carried out by the aspherical surface in the first lens group.

When the ratio Rasp/(−f1) exceeds the upper limit of conditional expression (8), paraxial radius of curvature of the aspherical surface in the first lens group becomes small. Accordingly, it becomes difficult to correct aberrations with respect to the angle of view such as distortion in the wide-angle end state by means of the aspherical surface.

In order to secure the effect of the present embodiment, it is preferable to set the upper limit of conditional expression (8) to 0.8.

On the other hand, when the ratio Rasp/(−f1) falls below the lower limit of conditional expression (8), the paraxial radius of curvature of the aspherical surface in the first lens group becomes large. Accordingly, spherical aberration generated from the paraxial sphere itself in the telephoto end state has to be corrected by the aspherical surface, so that it is difficult.

In order to secure the effect of the present embodiment, it is preferable to set the lower limit of conditional expression (8) to 0.37.

In a zoom lens system according to the first embodiment, it is preferable that the second lens group consists of two positive lenses and one negative lens.

With disposing a plurality of positive lenses in the second lens group having positive refractive power, various aberrations including chromatic aberration can be corrected well. With disposing positive lenses to the object side and a negative lens to the image side, the second lens group is made to be a telephoto type, so that a fast f-number is secured in the telephoto end state.

In a zoom lens system according to the first embodiment, one of the two positive lenses and the negative lens in the second lens group are preferably cemented with each other.

With this configuration, it becomes possible to preferably correct various aberrations including chromatic aberration.

In a zoom lens system according to the first embodiment, it is preferable that the third lens group consists of a positive lens and a negative lens.

With this configuration, it becomes possible to preferably correct various aberrations including chromatic aberration. Moreover, with disposing the negative lens to the image side, distances between the third lens group and the respective adjacent lens groups can be secured with adjusting positions of principal points together with the second and fourth lens groups being telephoto type.

In a zoom lens system according to the first embodiment, an aperture stop is disposed in the vicinity of the third lens group, and the aperture stop preferably moves together with the third lens group in a body.

With disposing the aperture stop in the vicinity of the third lens group, where a bundle of rand rays becomes narrow, configuration of the lens barrel can be simple, so that it is desirable. Here, a rand ray is a ray that is separated farthest away from the optical axis among rays forming an on-axis image.

In a zoom lens system according to the first embodiment, it is preferable that the fourth lens group consists of two positive lenses and a negative lens.

With disposing positive lenses to the object side and the negative lens to the image side of the fourth lens group, the fourth lens group is made to be a telephoto type, so that a fast f-number can be secured in the telephoto end state.

In a zoom lens system according to the first embodiment, it is preferable that the second lens group and the fourth lens group move in a body upon zooming from the wide-angle end state to the telephoto end state.

With this configuration, construction of the lens barrel can be simple, so that it is desirable.

A zoom lens system according to the first embodiment preferably satisfies the following conditional expression (9):

$$1.0 \leq f2/fw \leq 2.3 \qquad (9)$$

where fw denotes a focal length of the zoom lens system in the wide-angle end state, and f2 denotes a focal length of the second lens group.

Conditional expression (9) is for defining the focal length of the second lens group having positive refractive power.

When the ratio f2/fw falls below the lower limit of conditional expression (9), it becomes difficult to correct spherical aberration in the telephoto end state.

In order to secure the effect of the present embodiment, it is preferable to set the lower limit of conditional expression (9) to 1.3.

On the other hand, when the ratio f2/fw exceeds the upper limit of conditional expression (9), it becomes difficult to secure the zoom ratio. In order to secure the zoom ratio, the focal length of the fourth lens group has to be small. As a result, it becomes difficult to correct distortion in the wide-angle end state and coma in an intermediate focal length state.

In order to secure the effect of the present embodiment, it is preferable to set the upper limit of conditional expression (9) to 2.0.

In a zoom lens system according to the first embodiment, the following conditional expression (10) is preferably satisfied:

$$0.8 \leq (-f3)/fw \leq 3.0 \qquad (10)$$

where fw denotes a focal length of the zoom lens system in the wide-angle end state, and f3 denotes a focal length of the third lens group.

Conditional expression (10) is for defining a focal length of the third lens group having negative refractive power.

When the ratio (−f3)/fw falls below the lower limit of conditional expression (10), it becomes difficult to correct coma and spherical aberration over entire zoom range.

In order to secure the effect of the present embodiment, it is preferable to set the lower limit of conditional expression (10) to 1.1. In order to further secure the effect of the present embodiment, it is more preferable to set the lower limit of conditional expression (10) to 1.2.

On the other hand, when the ratio (−f3)/fw exceeds the upper limit of conditional expression (10), it becomes difficult to secure a back focal length. In order to secure the back focal length, the focal length of the first lens group has to be small. As a result, it becomes difficult to correct various aberrations with respect to the angle of view such as distortion and curvature of field in the wide-angle end state.

In order to secure the effect of the present embodiment, it is preferable to set the upper limit of conditional expression (10) to 2.5.

In a zoom lens system according to the first embodiment, the following conditional expression (11) is preferably satisfied:

$$0.8 \leq f4/fw \leq 2.0 \qquad (11)$$

where fw denotes a focal length of the zoom lens system in the wide-angle end state, and f4 denotes a focal length of the fourth lens group.

Conditional expression (11) is for defining the focal length of the fourth lens group having positive refractive power.

When the ratio f4/fw falls below the lower limit of conditional expression (11), it becomes difficult to correct distortion in the wide-angle end state and coma in the intermediate focal length state.

In order to secure the effect of the present embodiment, it is preferable to set the lower limit of conditional expression (11) to 1.2. In order to further secure the effect of the present embodiment, it is more preferable to set the lower limit of conditional expression (11) to 1.5.

On the other hand, when the ratio f4/fw exceeds the upper limit of conditional expression (11), it becomes difficult to particularly correct spherical aberration in the telephoto end state.

An imaging apparatus according to the first embodiment is equipped with a zoom lens system described above.

With this construction, it becomes possible to realize an imaging apparatus having high image quality.

A method for forming an image of an object and varying a focal length of a zoom lens system that comprises, in order from the object, a first lens group having negative refractive power, a second lens group having positive refractive power, a third lens group having negative refractive power, and a fourth lens group having positive refractive power according to the first embodiment, the method comprising steps of: moving each lens group along an optical axis such that a distance between the first lens group and the second lens group decreases, a distance between the second lens group and the third lens group increases, and a distance between the third lens group and the fourth lens group decreases upon zooming from a wide-angle end state to a telephoto end state; providing the first lens group having a negative lens; and satisfying the following conditional expressions (1) and (2):

$$30 \leq vd1 \leq 71 \qquad (1)$$

when $30 \leq vd1 < 36$, $$-0.013 \times vd1 + 2.083 \leq nd1 \leq 1.7,$$

when $36 \leq vd1 < 41$, $$-0.013 \times vd1 + 2.083 \leq nd1 \leq -0.004 \times vd1 + 1.844,$$

when $41 \leq vd1 < 51$, $$-0.004 \times vd1 + 1.714 \leq nd1 \leq -0.004 \times vd1 + 1.844,$$

when $51 \leq vd1 < 61$, $$-0.0015 \times vd1 + 1.5865 \leq nd1 \leq -0.004 \times vd1 + 1.844,$$

when $61 \leq vd1 \leq 71$, $$-0.0015 \times vd1 + 1.5865 \leq nd1 \leq -0.009 \times vd1 + 2.149 \qquad (2)$$

where nd1 denotes refractive index of a material of the negative lens in the first lens group at d-line, which has a wavelength λ=587.6 nm, and vd1 denotes Abbe number of a material of the negative lens in the first lens group at d-line, which has a wavelength λ=587.6 nm.

With this construction, it becomes possible to realize a zoom lens system having high image quality.

A zoom lens system according to each Example of the first embodiment is explained below with reference to accompanying drawings.

EXAMPLE 1

FIG. 1 is a diagram showing a lens configuration of a zoom lens system according to Example 1 of a first embodiment together with a zooming trajectory of each lens group.

A zoom lens system according to Example 1 is composed of, in order from an object, a first lens group G1 having negative refractive power, a second lens group G2 having positive refractive power, an aperture stop S, a third lens group G3 having negative refractive power, a fourth lens group G4 having positive refractive power, and a flare stopper FS. When a state of lens group positions varies from a wide-angle end state (W) to a telephoto end state (T), the first lens group G1, the second lens group G2, the third lens group G3 and the fourth lens group G4 move along an optical axis such that a distance between the first lens group G1 and the second lens group G2 decreases, a distance between the second lens group G2 and the third lens group G3 increases, and a distance between the third lens group G3 and the fourth lens group G4 decreases.

The first lens group G1 is composed of, in order from the object, a negative meniscus lens L1 having a convex surface facing the object, a negative meniscus lens L2 having a convex surface facing the object, a positive meniscus lens L3 having a convex surface facing the object.

The second lens group G2 is composed of, in order from the object, a double convex positive lens L4, a cemented lens constructed by a double convex positive lens L5 cemented with a double concave negative lens L6.

The third lens group G3 is composed of a cemented lens constructed by, in order from the object, a positive meniscus lens L7 having a convex surface facing the image cemented with a double concave negative lens L8.

The fourth lens group G4 is composed of, in order from the object, a positive meniscus lens L9 having a convex surface facing the image, a cemented lens constructed by a double convex positive lens L10 cemented with a negative meniscus lens L11 having a convex surface facing the image.

An aperture stop S is disposed to the object side of the third lens group G3 in the vicinity thereof, and is moved together with the third lens group G3 in a body upon zooming from the wide-angle end state to the telephoto end state.

A flare stopper FS is disposed to the image side of the fourth lens group G4, and effectively removes coma flare in an intermediate height image.

Various values associated with a zoom lens system according to Example 1 of the first embodiment are listed in Table 1. In [Specifications], f denotes a focal length of the zoom lens system, FNO denotes an f-number, and 2ω denotes an angle of view.

In [Lens Data], the left most column shows the lens surface number counted in order from the object side, the second column "r" shows a radius of curvature of the lens surface, the third column "d" shows a distance to the next lens surface, the fourth column "nd" shows refractive index of the material at d-line (wavelength λ=587.6 nm), and the fifth column "vd" shows Abbe number of the material at d-line (wavelength λ=587.6 nm). The position of an aspherical surface is expressed by attaching "*" to the left side of the surface number and a paraxial radius of curvature is shown in the second column "r". In the second column "r", r=0.0000 denotes a plane surface. In the fifth column "nd", refractive index of the air nd=1.000000 is omitted.

In [Aspherical Data], "E-n" denotes "$10^{-n}$". In each Example, an aspherical surface is exhibited by the following expression:

$$X(y)=(y^2/r)/[1+[1-\kappa(y^2/r^2)]^{1/2}]+C4 \times y^4+C6 \times y^6+C8 \times y^8+C10 \times y^{10}+C12 \times y^{12}$$

where y denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere, κ denotes a conical coefficient, and Cn denotes aspherical coefficient of n-th order.

In [Lens Data] and [Variable Distances], B.F denotes a back focal length.

In [Values for Conditional Expressions], values for respective conditional expressions are shown.

When a plurality of relevant lenses are there, values for respective lenses are shown. In lens L2, since a thin resin layer is formed on the lens substrate, the substrate lens is shown as the relevant lens in this case.

In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples, so that duplicated explanations are omitted.

TABLE 1

[Specifications]

|  | W | T |
| --- | --- | --- |
| f = | 18.54 | 53.4 |
| FNO = | 3.6 | 5.9 |
| 2 ω= | 78.18 | 29.86° |

[Lens Data]

| | r | d | nd | vd |
| --- | --- | --- | --- | --- |
| 1 | 87.9379 | 1.0000 | 1.516330 | 64.14 |
| 2 | 16.8369 | 9.6060 | | |
| 3 | 126.9038 | 1.0000 | 1.516330 | 64.14 |
| 4 | 21.4987 | 0.1500 | 1.553890 | 38.09 |
| *5 | 17.6389 | 3.9380 | | |
| 6 | 32.8432 | 3.5080 | 1.761821 | 26.52 |
| 7 | 81.9946 | D7 | | |
| 8 | 53.2062 | 2.5000 | 1.516330 | 64.14 |
| 9 | −51.8953 | 0.6926 | | |
| 10 | 22.9065 | 3.5000 | 1.516330 | 64.14 |
| 11 | −33.8880 | 1.0000 | 1.761820 | 26.52 |
| 12 | 1827.6963 | D12 | | |
| 13 | 0.0000 | 1.0027 | Aperture Stop S | |

TABLE 1-continued

| | | | | |
| --- | --- | --- | --- | --- |
| 14 | −55.3061 | 2.0000 | 1.805180 | 25.43 |
| 15 | −19.0973 | 1.0000 | 1.772500 | 49.61 |
| 16 | 46.4291 | D16 | | |
| 17 | −158.1401 | 2.5505 | 1.516330 | 64.14 |
| 18 | −20.5717 | 0.4757 | | |
| 19 | 66.3104 | 4.6196 | 1.516330 | 64.14 |
| 20 | −15.9854 | 1.0000 | 1.806100 | 33.25 |
| 21 | −49.1416 | D21 | | |
| 22 | 0.0000 | B.F | Flare Stopper FS | |

[Aspherical Data]
Surface Number: 5

| | |
| --- | --- |
| κ = | −1.00000 |
| C4 = | −1.12900E−05 |
| C6 = | −2.73590E−08 |
| C8 = | −7.88710E−11 |
| C10 = | 8.89590E−14 |
| C12 = | 0.00000 |

[Variable Distances]

| | W | M | T |
| --- | --- | --- | --- |
| f | 18.50000 | 35.00000 | 53.40000 |
| D7 | 28.64500 | 7.97760 | 1.21180 |
| D12 | 2.84980 | 9.20440 | 13.66200 |
| D16 | 12.31840 | 5.97110 | 1.50000 |
| D21 | 0.00000 | 12.58520 | 27.58320 |
| B.F | 38.50001 | 38.49995 | 38.49998 |

[Values for Conditional Expressions]

(1): vd1 = 64.14 (L1), 64.14 (L2)
(2): nd1 = 1.516330 (L1), 1.516330 (L2)
(3): vd2 = 64.14 (L4), 64.14 (L5)
(4): nd2 = 1.516330 (L4), 1.516330 (L5)
(5): vd4 = 64.14 (L9), 64.14 (L10)
(6): nd4 = 1.516330 (L9), 1.516330 (L10)
(7): (−f1)/fw = 1.473
(8): Rasp/(−f1) = 0.646
(9): f2/fw = 1.556
(10): (−f3)/fw = 1.807
(11): f4/fw = 1.923

Figure 2B:
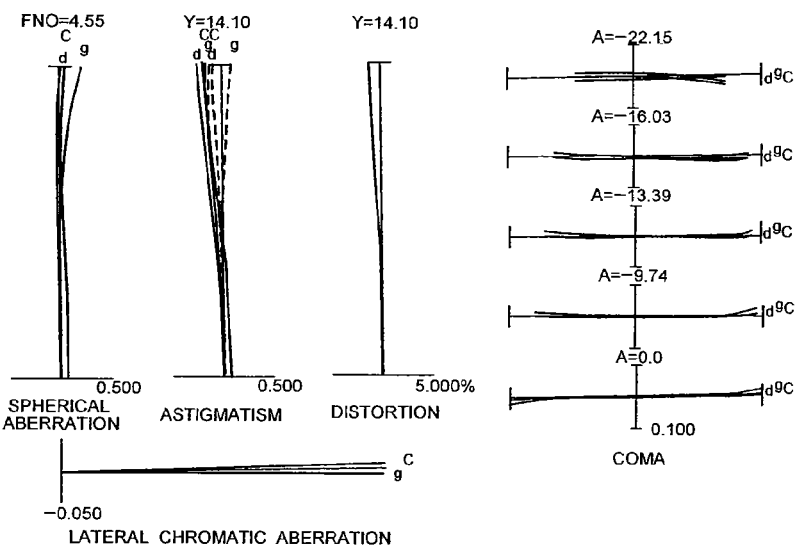
Figure 2C:
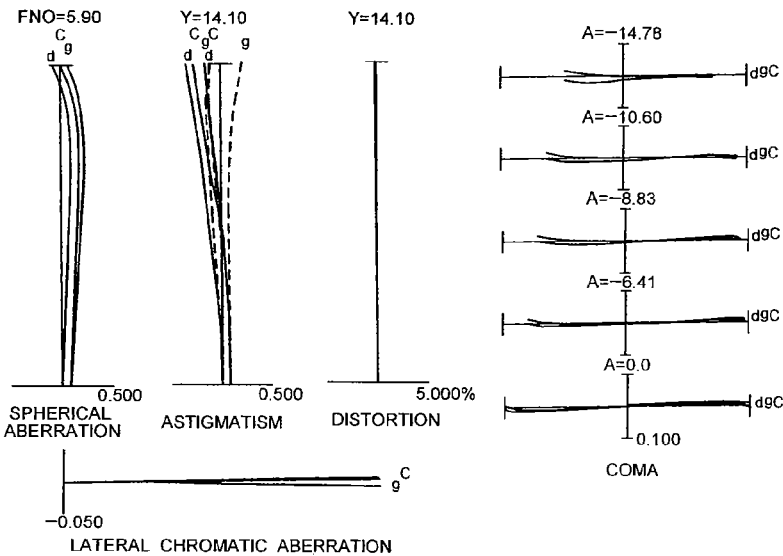

FIGS. 2A, 2B and 2C are graphs showing various aberrations of the zoom lens system according to Example 1 of the first embodiment in a wide-angle end state, in an intermediate focal length state, in a telephoto end state, respectively.

In respective graphs, FNO denotes an f-number, Y denotes an image height, A denotes a half angle of view (unit: degree).

In graphs showing astigmatism, the maximum value of an image height Y is shown. In respective graphs, d denotes aberration curve at d-line (wavelength λ=587.6 nm), and g denotes aberration curve at g-line (wavelength λ=435.8 nm). In the graphs showing spherical aberration, FNO denotes the f-number with respect to the maximum aperture. In the graph showing astigmatism, a solid line indicates a sagittal image plane, and a broken line indicates a meridional image plane. In graphs showing coma, coma with respect to a half angle of view is shown.

The above-described explanation regarding various aberration graphs is the same as the other examples.

As is apparent from the respective graphs, the zoom lens system according to Example 1 of the first embodiment shows superb optical performance as a result of good corrections to various aberrations in the wide-angle end state, in the intermediate focal length state, and in the telephoto end state.

EXAMPLE 2

FIG. 3 is a diagram showing a lens configuration of a zoom lens system according to Example 2 of the first embodiment together with a zooming trajectory of each lens group.

A zoom lens system according to Example 2 is composed of, in order from an object, a first lens group G1 having negative refractive power, a second lens group G2 having positive refractive power, an aperture stop S, a third lens group G3 having negative refractive power, a fourth lens group G4 having positive refractive power, and a flare stopper FS. When a state of lens group positions varies from a wide-angle end state (W) to a telephoto end state (T), the first lens group G1, the second lens group G2, the third lens group G3 and the fourth lens group G4 move along an optical axis such that a distance between the first lens group G1 and the second lens group G2 decreases, a distance between the second lens group G2 and the third lens group G3 increases, and a distance between the third lens group G3 and the fourth lens group G4 decreases.

The first lens group G1 is composed of, in order from the object, a negative meniscus lens L1 having a convex surface facing the object, a double concave negative lens L2, a positive meniscus lens L3 having a convex surface facing the object.

The second lens group G2 is composed of, in order from the object, a double convex positive lens L4, a cemented lens constructed by a double convex positive lens L5 cemented with a double concave negative lens L6.

The third lens group G3 is composed of a cemented lens constructed by, in order from the object, a positive meniscus lens L7 having a convex surface facing the image cemented with a double concave negative lens L8.

The fourth lens group G4 is composed of, in order from the object, a positive meniscus lens L9 having a convex surface facing the image, a cemented lens constructed by a double convex positive lens L10 cemented with a negative meniscus lens L11 having a convex surface facing the image.

An aperture stop S is disposed to the object side of the third lens group G3 in the vicinity thereof, and is moved together with the third lens group G3 in a body upon zooming from the wide-angle end state to the telephoto end state.

A flare stopper FS is disposed to the image side of the fourth lens group G4, and effectively removes coma flare in an intermediate height image.

Various values associated with a zoom lens system according to Example 2 of the first embodiment are listed in Table 2.

TABLE 2

[Specifications]

|   | W | T |
|---|---|---|
| f = | 18.54 | 53.4 |
| FNO = | 3.6 | 5.9 |
| 2ω = | 78.18 | 29.86° |

[Lens Data]

|   | r | d | nd | vd |
|---|---|---|---|---|
| 1 | 74.9810 | 1.0000 | 1.518230 | 58.96 |
| 2 | 18.9515 | 0.1500 | 1.553890 | 38.09 |
| *3 | 17.0398 | 8.0792 | | |

TABLE 2-continued

| | | | | |
|---|---|---|---|---|
| 4 | −93.0897 | 1.0000 | 1.516330 | 64.14 |
| 5 | 30.6538 | 5.3426 | | |
| 6 | 43.2507 | 2.5593 | 1.717362 | 29.51 |
| 7 | 133.4367 | D7 | | |
| 8 | 92.6644 | 2.5000 | 1.518230 | 58.96 |
| 9 | −36.6670 | 0.1000 | | |
| 10 | 19.6861 | 3.5000 | 1.518230 | 58.96 |
| 11 | −37.9326 | 1.0000 | 1.740770 | 27.79 |
| 12 | 129.7648 | D12 | | |
| 13 | 0.0000 | 1.9230 | Aperture Stop S | |
| 14 | −42.8152 | 3.0000 | 1.805180 | 25.43 |
| 15 | −13.8958 | 1.0000 | 1.772500 | 49.61 |
| 16 | 40.6606 | D16 | | |
| 17 | −101.5211 | 2.4781 | 1.516330 | 64.14 |
| 18 | −19.8792 | 0.1000 | | |
| 19 | 74.2885 | 4.4863 | 1.516330 | 64.14 |
| 20 | −15.6848 | 1.0000 | 1.805180 | 25.43 |
| 21 | −37.5298 | D21 | | |
| 22 | 0.0000 | B.F | Flare Stopper FS | |

[Aspherical Data]
Surface Number 3

| | |
|---|---|
| κ = | −1.00000 |
| C4 = | 1.00718E−05 |
| C6 = | 1.56467E−08 |
| C8 = | −4.55652E−11 |
| C10 = | 9.30745E−14 |
| C12 = | 0.00000 |

[Variable Distances]

|   | W | M | T |
|---|---|---|---|
| f | 18.50000 | 35.00000 | 53.40000 |
| D7 | 31.74720 | 8.60140 | 1.10000 |
| D12 | 3.09030 | 7.78510 | 11.38190 |
| D16 | 9.79790 | 5.11060 | 1.50000 |
| D21 | 0.00000 | 12.78450 | 27.24450 |
| B.F | 38.49979 | 38.49921 | 38.49668 |

[Values for Conditional Expressions]

(1): νd1 = 58.96 (L1), 64.14 (L2)
(2): nd1 = 1.518230 (L1), 1.516330 (L2)
(3): νd2 = 58.96 (L4), 58.96 (L5)
(4): nd2 = 1.518230 (L4), 1.518230 (L5)
(5): νd4 = 64.14 (L9), 64.14 (L10)
(6): nd4 = 1.516330 (L9), 1.516330 (L10)
(7): (−f1)/fw = 1.582
(8): Rasp/(−f1) = 0.581
(9): f2/fw = 1.518
(10): (−f3)/fw = 1.492
(11): f4/fw = 1.753

Figure 4A:
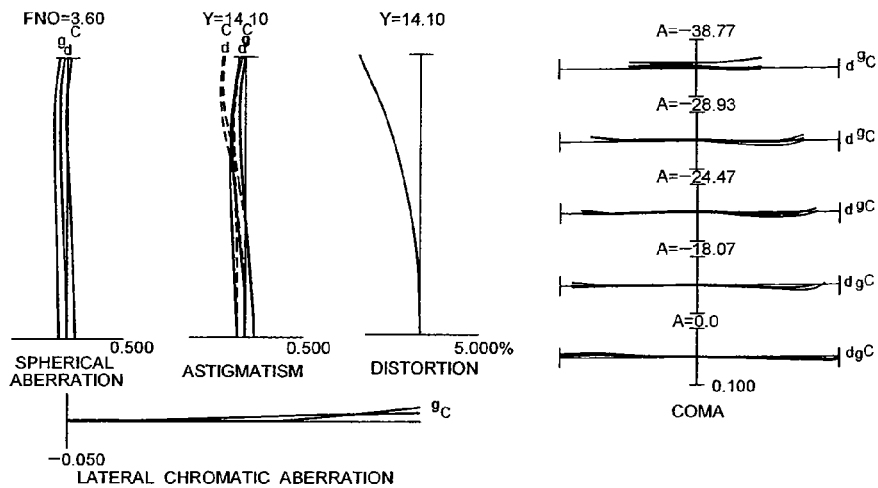
FIGS. 4A, 4B and 4C are graphs showing various aberrations of the zoom lens system according to Example 2 of the first embodiment in a wide-angle end state, in an intermediate focal length state, in a telephoto end state, respectively.
Figure 4B:
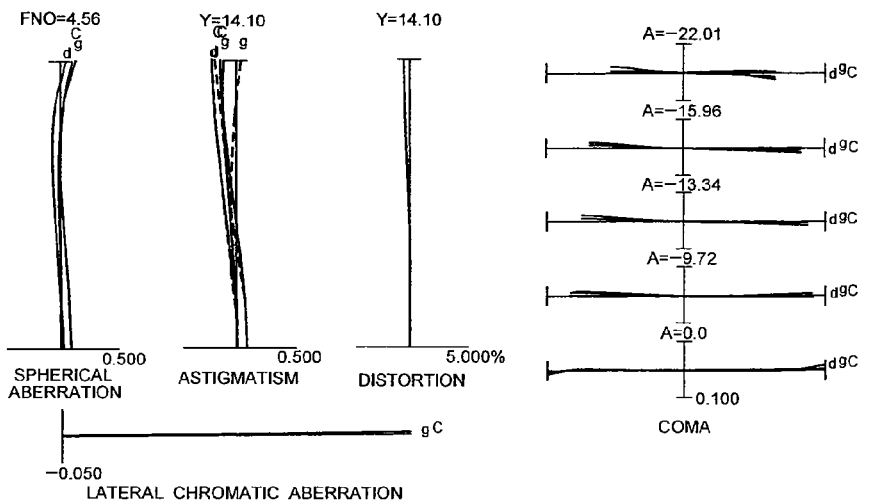
Figure 4C:
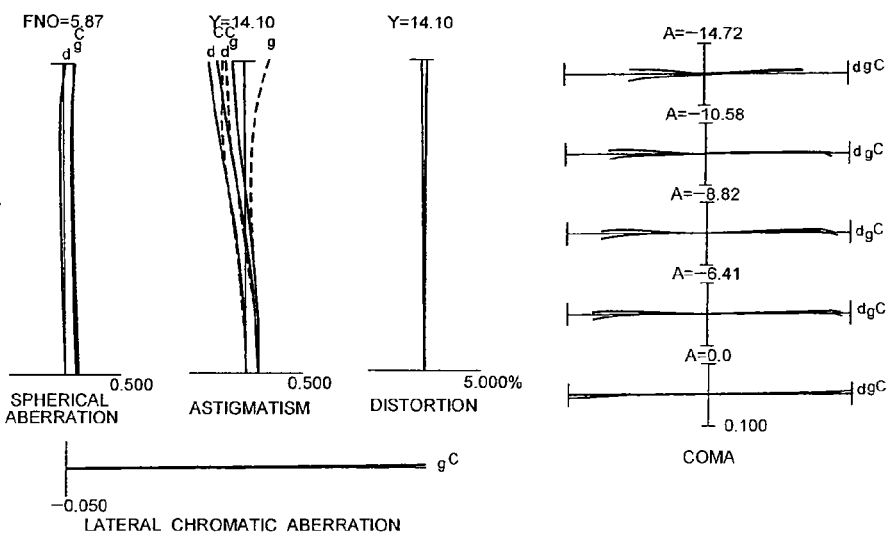

FIGS. 4A, 4B and 4C are graphs showing various aberrations of the zoom lens-system according to Example 2 of the first embodiment in a wide-angle end state, in an intermediate focal length state, in a telephoto end state, respectively.

As is apparent from the respective graphs, the zoom lens system according to Example 2 of the first embodiment shows superb optical performance as a result of good corrections to various aberrations in the wide-angle end state, in the intermediate focal length state, and in the telephoto end state.

EXAMPLE 3

FIG. 5 is a diagram showing a lens configuration of a zoom lens system according to Example 3 of the first embodiment together with a zooming trajectory of each lens group.

A zoom lens system according to Example 3 is composed of, in order from an object, a first lens group G1 having negative refractive power, a second lens group G2 having positive refractive power, an aperture stop S, a third lens group G3 having negative refractive power, a fourth lens group G4 having positive refractive power, and a flare stopper FS. When a state of lens group positions varies from a wide-angle end state (W) to a telephoto end state (T), the first lens group G1, the second lens group G2, the third lens group G3 and the fourth lens group G4 move along an optical axis such that a distance between the first lens group G1 and the second lens group G2 decreases, a distance between the second lens group G2 and the third lens group G3 increases, and a distance between the third lens group G3 and the fourth lens group G4 decreases.

The first lens group G1 is composed of, in order from the object, a negative meniscus lens L1 having a convex surface facing the object, a double concave negative lens L2, a positive meniscus lens L3 having a convex surface facing the object.

The second lens group G2 is composed of, in order from the object, a double convex positive lens L4, a cemented lens constructed by a double convex positive lens L5 cemented with a double concave negative lens L6.

The third lens group G3 is composed of a cemented lens constructed by, in order from the object, a positive meniscus lens L7 having a convex surface facing the image cemented with a double concave negative lens L8.

The fourth lens group G4 is composed of, in order from the object, a positive meniscus lens L9 having a convex surface facing the image, a cemented lens constructed by a double convex positive lens L10 cemented with a negative meniscus lens L11 having a convex surface facing the image.

An aperture stop S is disposed to the object side of the third lens group G3 in the vicinity thereof, and is moved together with the third lens group G3 in a body upon zooming from the wide-angle end state to the telephoto end state.

A flare stopper FS is disposed to the image side of the fourth lens group G4, and effectively removes coma flare in an intermediate height image.

Various values associated with a zoom lens system according to Example 3 of the first embodiment are listed in Table 3.

TABLE 3

[Specifications]

|  | W | T |
|---|---|---|
| f = | 18.54 | 53.4 |
| FNO = | 3.6 | 5.9 |
| 2ω = | 78.18 | 29.86° |

[Lens Data]

| | r | d | nd | vd |
|---|---|---|---|---|
| 1 | 60.7025 | 1.0000 | 1.672700 | 32.11 |
| 2 | 20.1309 | 0.1500 | 1.553890 | 38.09 |
| *3 | 18.0307 | 7.8820 | | |
| 4 | −67.9454 | 1.0000 | 1.516330 | 64.14 |
| 5 | 33.0065 | 5.1397 | | |
| 6 | 49.5584 | 3.2468 | 1.846660 | 23.78 |
| 7 | 256.7070 | D7 | | |
| 8 | 111.0735 | 2.5188 | 1.581440 | 40.75 |
| 9 | −40.8980 | 0.1000 | | |
| 10 | 19.5663 | 3.6188 | 1.516330 | 64.14 |
| 11 | −42.8673 | 1.0000 | 1.805180 | 25.43 |
| 12 | 144.3448 | D12 | | |
| 13 | 0.0000 | 3.0610 | Aperture Stop S | |

TABLE 3-continued

| 14 | −43.9310 | 3.0000 | 1.805180 | 25.43 |
|---|---|---|---|---|
| 15 | −13.9063 | 1.0000 | 1.772500 | 49.61 |
| 16 | 41.4061 | D16 | | |
| 17 | −124.9960 | 2.6553 | 1.516330 | 64.14 |
| 18 | −18.7086 | 0.1000 | | |
| 19 | 67.1213 | 4.5017 | 1.516330 | 64.14 |
| 20 | −15.4403 | 1.0000 | 1.805180 | 25.43 |
| 21 | −46.9391 | D21 | | |
| 22 | 0.0000 | B.F | Flare Stopper FS | |

[Aspherical Data]
Surface Number 3

| κ = | −1.00000 |
|---|---|
| C4 = | 6.47860E−06 |
| C6 = | 7.00070E−09 |
| C8 = | −5.09980E−11 |
| C10 = | 8.35270E−14 |
| C12 = | 0.00000 |

[Variable Distances]

| | W | M | T |
|---|---|---|---|
| f | 18.50000 | 35.00000 | 53.40000 |
| D7 | 34.42460 | 9.46090 | 1.10000 |
| D12 | 1.82350 | 6.06090 | 9.24630 |
| D16 | 9.22650 | 4.99530 | 1.79820 |
| D21 | 0.00000 | 13.00890 | 28.00000 |
| B.F | 38.49996 | 38.49984 | 38.49996 |

[Values for Conditional Expressions]

(1): vd1 = 32.11 (L1), 64.14 (L2)
(2): nd1 = 1.67270 (L1), 1.516330 (L2)
(3): vd2 = 40.75 (L4), 64.14 (L5)
(4): nd2 = 1.581440 (L4), 1.516330 (L5)
(5): vd4 = 64.14 (L9), 64.14 (L10)
(6): nd4 = 1.516330 (L9), 1.516330 (L10)
(7): (−f1)/fw = 1.635
(8): Rasp/(−f1) = 0.595
(9): f2/fw = 1.553
(10): (−f3)/fw = 1.528
(11): f4/fw = 1.807

Figure 6A:
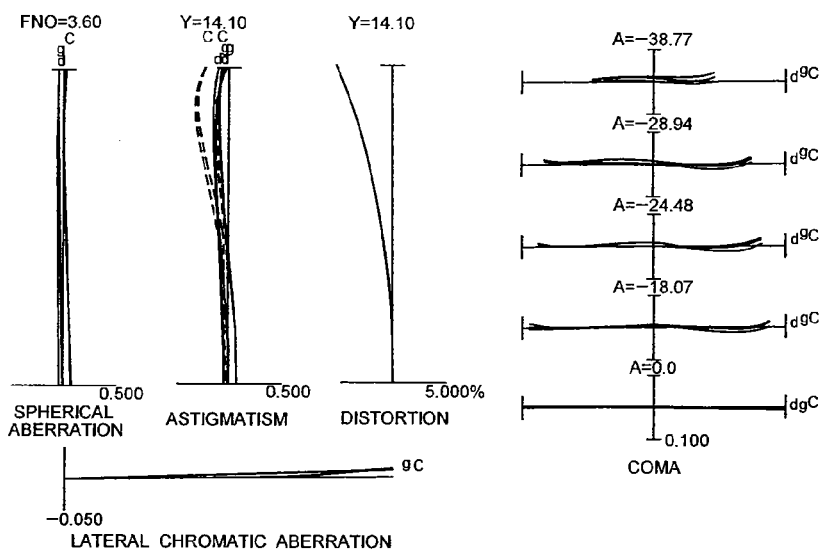
FIGS. 6A, 6B and 6C are graphs showing various aberrations of the zoom lens system according to Example 3 of the first embodiment in a wide-angle end state, in an intermediate focal length state, in a telephoto end state, respectively.
Figure 6B:
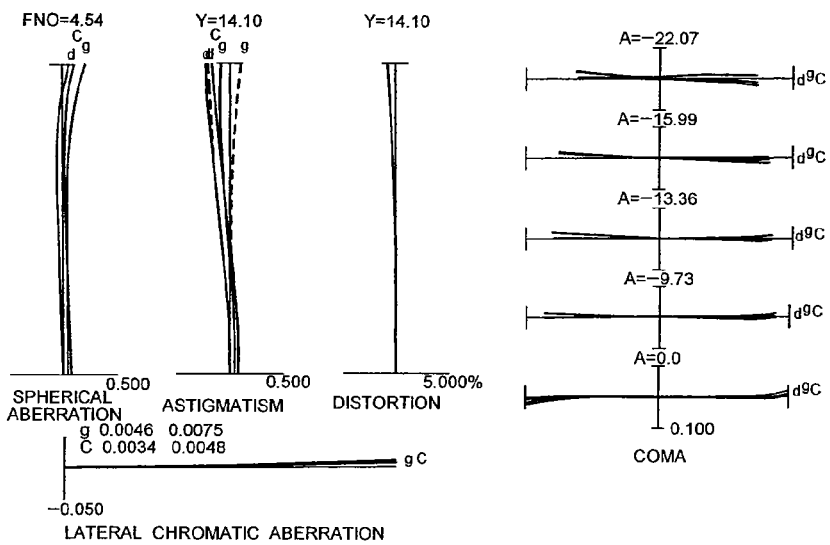
Figure 6C:
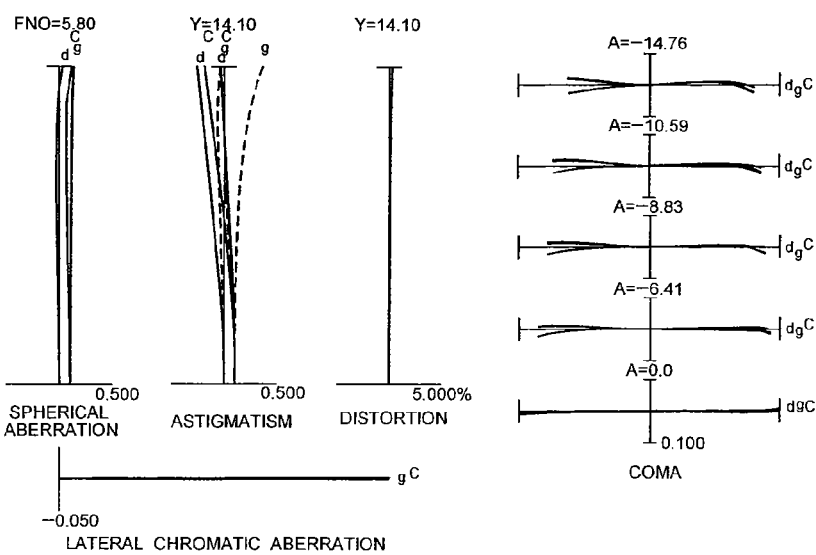

FIGS. 6A, 6B and 6C are graphs showing various aberrations of the zoom lens system according to Example 3 of the first embodiment in a wide-angle end state, in an intermediate focal length state, in a telephoto end state, respectively.

As is apparent from the respective graphs, the zoom lens system according to Example 3 of the first embodiment shows superb optical performance as a result of good corrections to various aberrations in the wide-angle end state, in the intermediate focal length state, and in the telephoto end state.

EXAMPLE 4

FIG. 7 is a diagram showing a lens configuration of a zoom lens system according to Example 4 of the first embodiment together with a zooming trajectory of each lens group.

A zoom lens system according to Example 4 is composed of, in order from an object, a first lens group G1 having negative refractive power, a second lens group G2 having positive refractive power, an aperture stop S, a third lens group G3 having negative refractive power, a fourth lens group G4 having positive refractive power, and a flare stopper FS. When a state of lens group positions varies from a wide-angle end state (W) to a telephoto end state (T), the first lens group G1, the second lens group G2, the third lens group G3 and the fourth lens group G4 move along an optical axis such that a distance between the first lens group G1 and the second lens group G2 decreases, a distance between the second lens group G2 and the third lens group G3 increases, and a distance between the third lens group G3 and the fourth lens group G4 decreases.

The first lens group G1 is composed of, in order from the object, a negative meniscus lens L1 having a convex surface facing the object, a double concave negative lens L2, a positive meniscus lens L3 having a convex surface facing the object.

The second lens group G2 is composed of, in order from the object, a double convex positive lens L4, a cemented lens constructed by a double convex positive lens L5 cemented with a double concave negative lens L6.

The third lens group G3 is composed of a cemented lens constructed by, in order from the object, a positive meniscus lens L7 having a convex surface facing the image cemented with a double concave negative lens L8.

The fourth lens group G4 is composed of, in order from the object, a positive meniscus lens L9 having a convex surface facing the image, a cemented lens constructed by a double convex positive lens L10 cemented with a negative meniscus lens L11 having a convex surface facing the image.

An aperture stop S is disposed to the object side of the third lens group G3 in the vicinity thereof, and is moved together with the third lens group G3 in a body upon zooming from the wide-angle end state to the telephoto end state.

A flare stopper FS is disposed to the image side of the fourth lens group G4, and effectively removes coma flare in an intermediate height image.

Various values associated with a zoom lens system according to Example 4 of the first embodiment are listed in Table 4.

TABLE 4

[Specifications]

|   | W | T |
|---|---|---|
| f = | 18.54 | 53.4 |
| FNO = | 3.6 | 5.9 |
| 2ω = | 78.18 | 29.86° |

[Lens Data]

|    | r | d | nd | vd |
|----|---|---|----|----|
| 1  | 95.7286 | 1.0000 | 1.517420 | 52.42 |
| 2  | 19.5918 | 0.1500 | 1.553890 | 38.09 |
| *3 | 17.4913 | 7.4525 |          |       |
| 4  | −132.5935 | 1.0000 | 1.518230 | 58.96 |
| 5  | 29.4829 | 5.7549 |          |       |
| 6  | 41.3914 | 2.5000 | 1.761820 | 26.52 |
| 7  | 106.6932 | D07 |          |       |
| 8  | 75.4871 | 2.5000 | 1.517420 | 52.42 |
| 9  | −40.2097 | 0.1000 |          |       |
| 10 | 19.4944 | 3.5000 | 1.518230 | 58.96 |
| 11 | −35.2115 | 1.0000 | 1.740770 | 27.79 |
| 12 | 110.7457 | D12 |          |       |
| 13 | 0.0000 | 2.4103 | Aperture Stop S | |
| 14 | −44.0740 | 3.0000 | 1.805180 | 25.43 |
| 15 | −14.3817 | 1.0000 | 1.772500 | 49.61 |
| 16 | 42.8437 | D16 |          |       |
| 17 | −142.5530 | 2.7062 | 1.517420 | 52.42 |
| 18 | −18.5433 | 0.1000 |          |       |
| 19 | 58.6387 | 4.5744 | 1.518230 | 58.96 |
| 20 | −15.5034 | 1.0000 | 1.805180 | 25.43 |
| 21 | −51.5403 | D21 |          |       |
| 22 | 0.0000 | B.F | Flare Stopper FS | |

TABLE 4-continued

[Aspherical Data]
Surface Number 3

| κ = | −1.00000 |
|-----|----------|
| C4 = | 8.22140E−06 |
| C6 = | 3.35360E−09 |
| C8 = | −2.56140E−11 |
| C10 = | 4.91920E−14 |
| C12 = | 0.00000 |

[Variable Distances]

|      | W | M | T |
|------|---|---|---|
| f    | 18.50000 | 35.00000 | 53.40000 |
| D7   | 32.30390 | 8.92870 | 1.10000 |
| D12  | 1.91770 | 6.52440 | 9.75010 |
| D16  | 9.46300 | 4.86680 | 1.62190 |
| D21  | 0.00000 | 12.82500 | 28.00000 |
| B.F  | 38.49944 | 38.49907 | 38.49945 |

[Values for Conditional Expressions]

(1): vd1 = 52.42 (L1), 58.96 (L2)
(2): nd1 = 1.517420 (L1), 1.518230 (L2)
(3): vd2 = 52.42 (L4), 58.96 (L5)
(4): nd2 = 1.517420 (L4), 1.518230 (L5)
(5): vd4 = 52.42 (L9), 58.96 (L10)
(6): nd4 = 1.517420 (L9), 1.518230 (L10)
(7): (−f1)/fw = 1.614
(8): Rasp/(−f1) 0.584
(9): f2/fw = 1.564
(10): (−f3)/fw = 1.556
(11): f4/fw =1.764

Figure 8A:
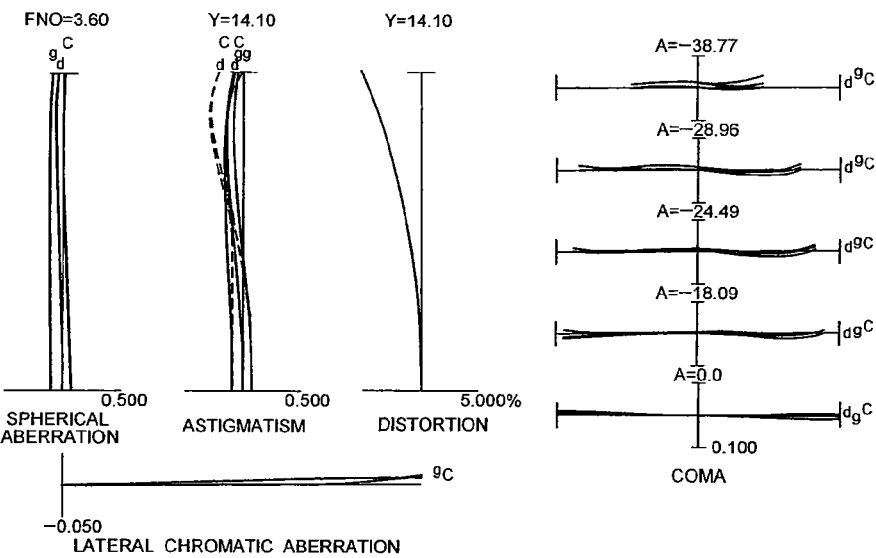
FIGS. 8A, 8B and 8C are graphs showing various aberrations of the zoom lens system according to Example 4 of the first embodiment in a wide-angle end state, in an intermediate focal length state, in a telephoto end state, respectively.
Figure 8B:
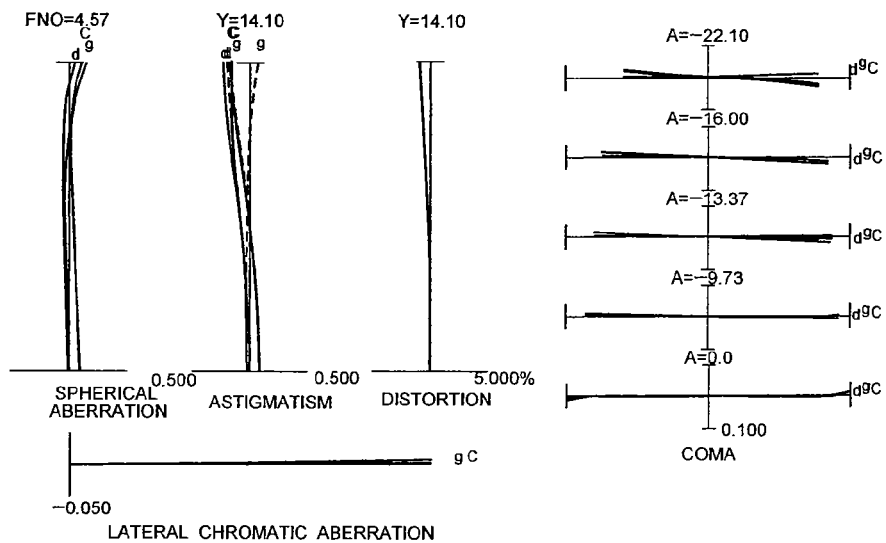
Figure 8C:
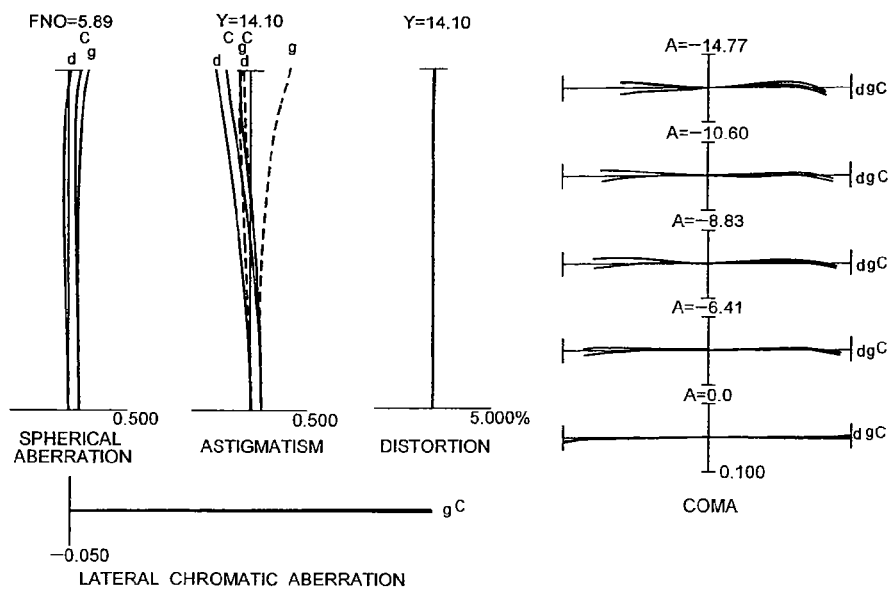

FIGS. 8A, 8B and 8C are graphs showing various aberrations of the zoom lens system according to Example 4 of the first embodiment in a wide-angle end state, in an intermediate focal length state, in a telephoto end state, respectively.

As is apparent from the respective graphs, the zoom lens system according to Example 4 of the first embodiment shows superb optical performance as a result of good corrections to various aberrations in the wide-angle end state, in the intermediate focal length state, and in the telephoto end state.

Second Embodiment

Instead of conventional glass polishing, lens manufacturing technology using a plastic material by means of injection molding has recently been developed. Since the manufacturing method makes it possible to easily make a lens surface an aspherical surface in comparison with conventional glass polishing, it becomes an effective means for correcting various aberrations. Although the plastic material has a high degree of freedom of a shape, it is difficult in the present circumstances to make the diameter large or the difference in thickness between the center and the periphery large because of its coloring and internal strain caused by environmental condition such as temperature, humidity, and ultraviolet light.

Accordingly, in a plastic lens, variation in temperature and humidity largely affects to the shape and refractive index thereof, so that various aberrations tend to deteriorate. Therefore, the plastic lens cannot be allotted large refractive power. When a plastic lens has large difference in the thickness between the center and the periphery of thereof, the lens tends to generate internal strain and a lack of uniformity in refractive index.

Accordingly, a plastic lens cannot have large difference in curvature between the front and rear surfaces thereof, in other words, a plastic lens cannot have large refractive power.

There are representative plastic materials available now such as polycarbonate having refractive index of about 1.6 and Abbe number of about 30 at d-line (wavelength λ=587.6 nm), polymethacrylate and cyclic olefin polymer (PMMA) having refractive index of about 1.5 and Abbe number of about 56 at d-line (wavelength λ=587.6 nm). Polycarbonate can be used for either a positive lens or a negative lens.

On the above-described assumption, a zoom lens system according to the second embodiment has a construction using light, low cost glass materials for positive lens in a positive lens group, and negative lens in a negative lens group, and a plastic aspherical lens in the fourth lens group in order to realize high optical performance despite of compactness and lightweight as well as a low cost.

A zoom lens system according to the second embodiment includes, in order from an object, a first lens group having negative refractive power, a second lens group having positive refractive power, a third lens group having negative refractive power, and a fourth lens group having positive refractive power.

Upon zooming from a wide-angle end state to a telephoto end state, each lens group moves along an optical axis such that a distance between the first lens group and the second lens group decreases, a distance between the second lens group and the third lens group increases, and a distance between the third lens group and the fourth lens group decreases. The fourth lens group includes a plastic aspherical lens. The first lens group includes a negative lens, and the negative lens in the first lens group satisfies the following conditional expressions (1) and (2):

$$30 \leq vd1 \leq 71 \quad (1)$$

when $30 \leq vd1 < 36$, $$-0.013 \times vd1 + 2.083 \leq nd1 \leq 1.7,$$

when $36 \leq vd1 < 41$, $$-0.013 \times vd1 + 2.083 \leq nd1 \leq -0.004 \times vd1 + 1.844,$$

when $41 \leq vd1 < 51$, $$-0.004 \times vd1 + 1.714 \leq nd1 \leq -0.004 \times vd1 + 1.844,$$

when $51 \leq vd1 < 61$, $$-0.0015 \times vd1 + 1.5865 \leq nd1 \leq -0.004 \times vd1 + 1.844,$$

when $61 \leq vd1 \leq 71$, $$-0.0015 \times vd1 + 1.5865 \leq nd1 \leq -0.009 \times vd1 + 2.149 \quad (2)$$

where nd1 denotes refractive index of a material of the negative lens in the first lens group at d-line, which has a wavelength λ=587.6 nm, and vd1 denotes Abbe number of a material of the negative lens in the first lens group at d-line, which has a wavelength λ=587.6 nm.

In a negative-leading type four-lens-group zoom lens system with a wide angle of view, in order to secure a wide angle of view in the wide-angle end state, the diameter of the first lens group becomes large, so that the first lens group has large proportions of total weight and cost. On the other hand, the third lens group, which does not much contribute to zooming and is mainly in charge of correction of aberrations and adjustment of the position of the principal point, has a small diameter, so that it has small proportions of total weight and cost. The second lens group and the fourth lens group having positive refractive power have an important function of zooming. In particular, the diameter of the fourth lens group is large in order to secure a wide angle of view in the wide-angle end state.

In consideration of an appropriate position for the plastic aspherical lens to be disposed, when the plastic aspherical lens is to be disposed in the first lens group having a large diameter, since difference in the lens thickness between the center and the periphery has to be small, difference in radius of curvature between the front surface and the rear surface has to be small. As a result, the plastic aspherical lens becomes a lens scarcely having refractive power, so that the lens merely obtains an effect to correct aberrations. Accordingly, the zoom lens system cannot be compact, but the total lens length becomes large.

Moreover, when the plastic aspherical lens is to be disposed in the second lens group or the third lens group, since a bundle of on-axis rays passes almost entire effective diameters of these lens groups, the effect of the aspherical lens cannot be obtained to a bundle of off-axis rays. Moreover, since the aforementioned internal strain or the like largely affects deterioration of optical performance, so that it is undesirable.

Accordingly, it is the most preferable that the plastic aspherical lens is disposed in the fourth lens group. In each example of the second embodiment, although the plastic aspherical lens is used as a single lens, the plastic aspherical lens can be used as a cemented lens in which the plastic lens is cemented with a glass lens. In order to prevent the plastic aspherical lens from getting scratched, it is preferable that the lens is disposed to the object side of the last lens that is the most image side lens.

Conditional expression (1) is for properly defining Abbe number of the negative lens in the first lens group having negative refractive power. However, conditional expression (1) has already been explained above, so that the duplicated explanations are omitted.

Conditional expression (2) is for properly defining refractive index of the negative lens in the first lens group having negative refractive power. However, conditional expression (2) has already been explained above, so that the duplicated explanations are omitted.

In a zoom lens system according to the second embodiment, it is preferable that each lens group has at least two lens elements.

With this configuration, various aberrations including chromatic aberration can be corrected well.

In a zoom lens system according to the second embodiment, the following conditional expression (12) is preferably satisfied:

$$1.5 \leq f4/fw \leq 2.9 \quad (12)$$

where f4 denotes a focal length of the fourth lens group, and fw denotes a focal length of the zoom lens system in the wide-angle end state.

Conditional expression (12) is for defining the focal length of the fourth lens group having positive refractive power.

When the ratio f4/fw falls below the lower limit of conditional expression (12), it becomes difficult to correct distortion in the wide-angle end state and coma in the intermediate focal length state.

In order to secure the effect of the present embodiment, it is preferable to set the lower limit of conditional expression (12) to 1.80.

On the other hand, when the ratio f4/fw exceeds the upper limit of conditional expression (12), it becomes difficult to correct particularly spherical aberration in the telephoto end state.

In order to secure the effect of the present embodiment, it is preferable to set the upper limit of conditional expression (12) to 2.7. In order to further secure the effect of the present embodiment, it is more preferable to set the upper limit of conditional expression (12) to 2.4.

In a zoom lens system according to the second embodiment, the second lens group preferably has a positive lens, and the positive lens in the second lens group preferably satisfies the following conditional expressions (3) and (4):

$$30 \leq vd2 \leq 71 \qquad (3)$$

when $30 \leq vd2 < 36$, $$-0.013 \times vd2 + 2.083 \leq nd2 \leq 1.7,$$

when $36 \leq vd2 < 41$, $$-0.013 \times vd2 + 2.083 \leq nd2 \leq -0.004 \times vd2 + 1.844,$$

when $41 \leq vd2 < 51$, $$-0.004 \times vd2 + 1.714 \leq nd2 \leq -0.004 \times vd2 + 1.844,$$

when $51 \leq vd2 < 61$, $$-0.0015 \times vd2 + 1.5865 \leq nd2 \leq -0.004 \times vd2 + 1.844,$$

when $61 \leq vd2 \leq 71$, $$-0.0015 \times vd2 + 1.5865 \leq nd2 \leq -0.009 \times vd2 + 2.149 \qquad (4)$$

where nd2 denotes refractive index of a material of the positive lens in the second lens group at d-line, which has a wavelength λ=587.6 nm, and vd2 denotes Abbe number of a material of the positive lens in the second lens group at d-line, which has a wavelength λ=587.6 nm.

Conditional expression (3) is for properly defining Abbe number of the positive lens in the second lens group having positive refractive power. However, conditional expression (3) has already been explained above, so that the duplicated explanations are omitted.

Conditional expression (4) is for properly defining refractive index of the positive lens in the second lens group having positive refractive power. However, conditional expression (4) has already been explained above, so that the duplicated explanations are omitted.

In a zoom lens system according to the second embodiment, the fourth lens group preferably has a plastic aspherical lens and a positive lens, and the positive lens in the fourth lens group preferably satisfies the following conditional expressions (5) and (6):

$$30 \leq vd4 \leq 71 \qquad (5)$$

when $30 \leq vd4 < 36$, $$-0.013 \times vd4 + 2.083 \leq nd4 \leq 1.7,$$

when $36 \leq vd4 < 41$, $$-0.013 \times vd4 + 2.083 \leq nd4 \leq -0.004 \times vd4 + 1.844,$$

when $41 \leq vd4 < 51$, $$-0.004 \times vd4 + 1.714 \leq nd4 \leq -0.004 \times vd4 + 1.844,$$

when $51 \leq vd4 < 61$, $$-0.0015 \times vd4 + 1.5865 \leq nd4 \leq -0.004 \times vd4 + 1.844,$$

when $61 \leq vd4 \leq 71$, $$-0.0015 \times vd4 + 1.5865 \leq nd4 \leq -0.009 \times vd4 + 2.149 \qquad (6)$$

where nd4 denotes refractive index of a material of the positive lens in the fourth lens group at d-line, which has a wavelength λ=587.6 nm, and vd4 denotes Abbe number of a material of the positive lens in the fourth lens group at d-line, which has a wavelength λ=587.6 nm.

Conditional expression (5) is for properly defining Abbe number of the positive lens in the fourth lens group having positive refractive power. However, conditional expression (5) has already been explained above, so that the duplicated explanations are omitted.

Conditional expression (6) is for properly defining refractive index of the positive lens in the fourth lens group having positive refractive power. However, conditional expression (6) has already been explained above, so that the duplicated explanations are omitted.

In a zoom lens system according to the second embodiment, the plastic aspherical lens in the fourth lens group preferably satisfies the following conditional expression (13):

$$|f4/fP| \leq 0.9 \qquad (13)$$

where f4 denotes a focal length of the fourth lens group, and fP denotes a focal length of the plastic aspherical lens in the fourth lens group.

Conditional expression (13) is for easily manufacturing the plastic aspherical lens in the fourth lens group and for securing preferable optical performance despite of variation in environmental condition such as temperature and humidity.

When the value |f4/fP| exceeds the upper limit of conditional expression (13), off-axis aberrations such as coma and curvature of field become worse, so that it is undesirable.

In order to secure the effect of the present embodiment, it is preferable to set the upper limit of conditional expression (13) to 0.7.

In a zoom lens system according to the second embodiment, it is preferable that the fourth lens group includes at least one positive lens and a negative lens.

With disposing positive lenses to the object side and the negative lens to the image side of the fourth lens group, the fourth lens group is made to be a telephoto type, so that a fast f-number can be secured in the telephoto end state.

In a zoom lens system according to the second embodiment, it is preferable that the first lens group includes, in order from the object, a negative meniscus lens having a convex surface facing the object, a negative lens having a concave surface facing an image, and a positive lens having a convex surface facing the object, and the following conditional expression (7) is preferably satisfied:

$$0.7 \leq (-f1)/fw \leq 1.7 \qquad (7)$$

where f1 denotes a focal length of the first lens group, and fw denotes a focal length of the zoom lens system in the wide-angle end state.

Conditional expression (7) is for defining a focal length of the first lens group. However, conditional expression (7) has already been explained above, so that the duplicated explanations are omitted.

In a zoom lens system according to the second embodiment, the following conditional expression (9) is preferably satisfied:

$$1.0 \leq f2/fw \leq 2.3 \qquad (9)$$

where f2 denotes a focal length of the second lens group, and fw denotes a focal length of the zoom lens system in the wide-angle end state.

Conditional expression (9) is for defining the focal length of the second lens group having positive refractive power.

When the ratio f2/fw falls below the lower limit of conditional expression (9), it becomes difficult to correct spherical aberration in the telephoto end state.

In order to secure the effect of the present embodiment, it is preferable to set the lower limit of conditional expression (9) to 1.2. In order to further secure the effect of the present embodiment, it is more preferable to set the lower limit of conditional expression (9) to 1.4.

On the other hand, when the ratio f2/fw exceeds the upper limit of conditional expression (9), it becomes difficult to secure the zoom ratio. In order to secure the zoom ratio, the focal length of the fourth lens group has to be made small. As a result, it becomes difficult to correct distortion in the wide-angle end state and coma in the intermediate focal length state.

In order to secure the effect of the present embodiment, it is preferable to set the upper limit of conditional expression (9) to 1.6.

In a zoom lens system according to the second embodiment, the following conditional expression (10) is preferably satisfied:

$$0.8 \leq (-f3)/fw \leq 3.0 \qquad (10)$$

where fw denotes a focal length of the zoom lens system in the wide-angle end state, and f3 denotes a focal length of the third lens group.

Conditional expression (10) is for defining a focal length of the third lens group having negative refractive power.

When the ratio (-f3)/fw falls below the lower limit of conditional expression (10), it becomes difficult to correct coma and spherical aberration over entire zoom range.

In order to secure the effect of the present embodiment, it is preferable to set the lower limit of conditional expression (10) to 1.2. In order to further secure the effect of the present embodiment, it is more preferable to set the lower limit of conditional expression (10) to 1.6.

On the other hand, when the ratio (-f3)/fw exceeds the upper limit of conditional expression (10), it becomes difficult to secure a back focal length. In order to secure the back focal length, the focal length of the first lens group has to be small. As a result, it becomes difficult to correct various aberrations with respect to the angle of view such as distortion and curvature of field in the wide-angle end state.

In order to secure the effect of the present embodiment, it is preferable to set the upper limit of conditional expression (10) to 2.6. In order to further secure the effect of the present embodiment, it is more preferable to set the upper limit of conditional expression (10) to 2.2.

In a zoom lens system according to the second embodiment, it is preferable that the first lens group includes at least one aspherical surface.

With this configuration, it becomes possible to preferably correct curvature of field and astigmatism.

In a zoom lens system according to the second embodiment, the image side surface of the negative meniscus lens in the first lens group is an aspherical surface, and the following conditional expression (8) is preferably satisfied:

$$0.32 \leq Rasp/(-f1) \leq 1.0 \qquad (8)$$

where Rasp denotes a paraxial radius of curvature of the aspherical surface, f1 denotes a focal length of the first lens group.

Conditional expression (8) is for defining the shape of the aspherical surface in order to set a degree of aberration correction carried out by the aspherical surface in the first lens group. However conditional expression (8) has already been explained before, so that duplicated explanations are omitted.

In a zoom lens system according to the second embodiment, it is preferable that the second lens group consists of two positive lenses and one negative lens.

With disposing a plurality of positive lenses in the second lens group having positive refractive power, various aberrations including chromatic aberration can be corrected well. With disposing positive lenses to the object side and a negative lens to the image side, the second lens group forms a telephoto type, so that a fast f-number is secured in the telephoto end state.

In a zoom lens system according to the second embodiment, one of the two positive lenses and the negative lens in the second lens group are preferably cemented with each other.

With this configuration, it becomes possible to preferably correct various aberrations including chromatic aberration.

In a zoom lens system according to the second embodiment, it is preferable that the third lens group consists of a positive lens and a negative lens.

With this configuration, it becomes possible to preferably correct various aberrations including chromatic aberration. Moreover, with disposing the negative lens to the image side, distances between the third lens group and the respective lens groups can be secured with adjusting positions of principal points in consideration of the second and fourth lens groups being telephoto type.

In a zoom lens system according to the second embodiment, an aperture stop is disposed in the vicinity of the third lens group, and the aperture stop preferably moves together with the third lens group.

With disposing the aperture stop in the vicinity of the third lens group, where a bundle of rand rays becomes narrow, configuration of the lens barrel can be simple, so that it is desirable. Here, a rand ray is a ray that is separated farthest away from the optical axis among rays forming an on-axis image.

In a zoom lens system according to the second embodiment, it is preferable that the second lens group and the fourth lens group move in a body upon zooming from the telephoto end state to the wide-angle end state.

With this configuration, construction of the lens barrel can be simple, so that it is desirable.

In a zoom lens system according to the second embodiment, it is preferable that the plastic aspherical lens in the fourth lens group is disposed to the object side of the most image side lens.

With this configuration, it becomes possible to prevent the plastic aspherical lens from getting scratched.

An imaging apparatus according to the second embodiment is equipped with the above-described zoom lens system.

With this construction, it becomes possible to realize an imaging apparatus having high image quality.

A method for forming an image of an object and varying a focal length of a zoom lens system that comprises, in order from the object, a first lens group having negative refractive power, a second lens group having positive refractive power, a third lens group having negative refractive power, and a fourth lens group having positive refractive power according to the second embodiment, the method comprising steps of: providing the fourth lens group that includes a plastic aspherical lens; moving each lens group along an optical axis such that a distance between the first lens group and the second lens group decreases, a distance between the second lens group and the third lens group increases, and a distance between the third lens group and the fourth lens group decreases upon zooming from a wide-angle end state to a telephoto end state; providing the first lens group having a negative lens; and satisfying the following conditional expressions (1) and (2):

$$30 \leq vd1 \leq 71 \quad (1)$$

when $30 \leq vd1 < 36$, $$-0.013 \times vd1 + 2.083 \leq nd1 \leq 1.7,$$

when $36 \leq vd1 < 41$, $$-0.013 \times vd1 + 2.083 \leq nd1 \leq -0.004 \times vd1 + 1.844,$$

when $41 \leq vd1 < 51$, $$-0.004 \times vd1 + 1.714 \leq nd1 \leq -0.004 \times vd1 + 1.844,$$

when $51 \leq vd1 < 61$, $$-0.0015 \times vd1 + 1.5865 \leq nd1 \leq -0.004 \times vd1 + 1.844,$$

when $61 \leq vd1 \leq 71$, $$-0.0015 \times vd1 + 1.5865 \leq nd1 \leq -0.009 \times vd1 + 2.149 \quad (2)$$

where nd1 denotes refractive index of a material of the negative lens in the first lens group at d-line, which has a wavelength λ=587.6 nm, and vd1 denotes Abbe number of a material of the negative lens in the first lens group at d-line, which has a wavelength λ=587.6 nm.

With this construction, it becomes possible to realize a zoom lens system having high image quality.

A zoom lens system according to each example of the second embodiment is explained below with reference to accompanying drawings.

EXAMPLE 5

FIG. 9 is a diagram showing a lens configuration of a zoom lens system according to Example 5 of a second embodiment together with a zooming trajectory of each lens group.

A zoom lens system according to Example 5 of the second embodiment is composed of, in order from an object, a first lens group G1 having negative refractive power, a second lens group G2 having positive refractive power, an aperture stop S, a third lens group G3 having negative refractive power, a fourth lens group G4 having positive refractive power, and a flare stopper FS. Upon zooming from a wide-angle end state (W) to a telephoto end state (T), respective lens groups G1, G2, G3, and G4 are moved along an optical axis such that a distance between the first lens group G1 and the second lens group G2 decreases, a distance between the second lens group G2 and the third lens group G3 increases, and a distance between the third lens group G3 and the fourth lens group G4 decreases.

The first lens group G1 is composed of, in order from the object, a negative meniscus lens L1 having a convex surface facing the object, a double concave negative lens L2, and a positive meniscus lens L3 having a convex surface facing the object.

The second lens group G2 is composed of, in order from the object, a double convex positive lens L4, and a cemented lens constructed by a double convex positive lens L5 cemented with a double concave negative lens L6.

The third lens group G3 is composed of a cemented lens constructed by, in order from the object, a positive meniscus lens L7 having a convex surface facing the image cemented with a double concave negative lens L8.

The fourth lens group G4 is composed of, in order from the object, a negative meniscus lens L9, which is a plastic aspherical lens, having a convex surface facing the image, and a double convex positive lens L10.

An aperture stop S is disposed to the object side in the vicinity of the third lens group G3, and moved together with the third lens group G3 in a body upon zooming from the wide-angle end state to the telephoto end state.

A flare stopper FS is disposed to the image side of the fourth lens group G4, and effectively removes coma flare in an intermediate height image.

Various values associated with a zoom lens system according to Example 5 of the second embodiment are listed in Table 5.

TABLE 5

[Specifications]

|  | W | T |
|---|---|---|
| f = | 18.54 | 53.4 |
| FNO = | 3.6 | 5.85 |
| 2ω = | 78.18 | 29.86° |

[Lens Data]

|  | r | d | nd | vd |
|---|---|---|---|---|
| 1 | 79.2009 | 1.0000 | 1.589130 | 61.18 |
| 2 | 19.8444 | 0.1000 | 1.553890 | 38.09 |
| *3 | 17.5584 | 8.1794 |  |  |
| 4 | −121.7843 | 1.0000 | 1.589130 | 61.18 |
| 5 | 30.2816 | 3.7035 |  |  |
| 6 | 41.1845 | 4.0000 | 1.846660 | 23.78 |
| 7 | 146.6886 | D7 |  |  |
| 8 | 29.6454 | 3.0000 | 1.517420 | 52.42 |
| 9 | −47.3732 | 4.2849 |  |  |
| 10 | 25.3774 | 3.5000 | 1.516330 | 64.14 |
| 11 | −32.5214 | 1.0000 | 1.846660 | 23.78 |
| 12 | 204.7269 | D12 |  |  |
| 13 | 0.0000 | 1.8782 | Aperture Stop S | |
| 14 | −34.8637 | 2.0000 | 1.761820 | 26.52 |
| 15 | −12.8952 | 1.0000 | 1.723420 | 37.95 |
| 16 | 63.9205 | D16 |  |  |
| 17 | −50.0000 | 0.5000 | 1.585180 | 30.24 |
| *18 | 144.3076 | 0.1000 |  |  |
| 19 | 67.6843 | 4.0000 | 1.516330 | 64.14 |
| 20 | −19.2326 | D20 |  |  |
| 21 | 0.0000 | B.F | Flare Stopper FS | |

[Aspherical Data]

Surface Number 3

| κ = | −1.00000 |
|---|---|
| C4 = | 1.02890E−05 |
| C6 = | 9.30490E−09 |
| C8 = | −1.26540E−11 |
| C10 = | 4.87520E−14 |
| C12 = | 0.00000 |

Surface Number 18

| κ = | 0.00000 |
|---|---|
| C4 = | 2.97790E−05 |
| C6 = | 1.34120E−07 |
| C8 = | −1.63730E−09 |
| C10 = | 7.50900E−12 |
| C12 = | 0.00000 |

[Variable Distances]

|  | W | M | T |
|---|---|---|---|
| f | 18.50 | 35.00 | 53.40 |
| D7 | 35.355 | 1.000 | 1.787 |

TABLE 5-continued

| D12 | 1.084 | 5.335 | 9.325 |
|---|---|---|---|
| D16 | 10.294 | 6.035 | 2.054 |
| D20 | 0.000 | 14.721 | 30.000 |
| B.F | 38.500 | 38.500 | 38.500 |

[Values for Conditional Expressions]

(1): $vd1$ = 61.18 (L1), 61.18 (L2)
(2): $nd1$ = 1.589130 (L1), 1.589130 (L2)
(3): $vd2$ = 52.42 (L4), 64.14 (L5)
(4): $nd2$ = 1.517420 (L4), 1.516330 (L5)
(5): $vd4$ = 64.14 (L10)
(6): $nd4$ = 1.516330 (L10)
(7): $(-f1)/fw$ = 1.56
(8): $Rasp/(-f1)$ = 0.60
(9): $f2/fw$ = 1.55
(10): $(-f3)/fw$ = 1.77
(12): $f4/fw$ = 2.00
(13): $|f4/fP|$ = 0.28

Figure 10A:
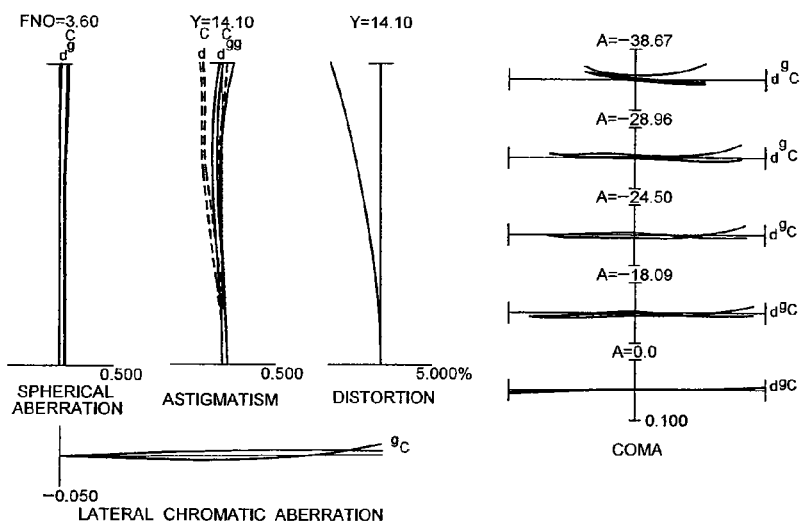
FIGS. 10A, 10B and 10C are graphs showing various aberrations of the zoom lens system according to Example 5 of the second embodiment in a wide-angle end state, in an intermediate focal length state, in a telephoto end state, respectively.
Figure 10B:
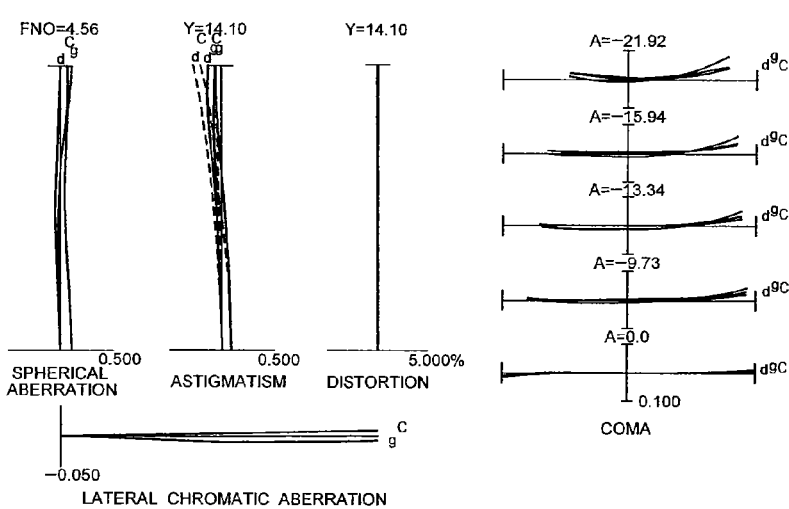
Figure 10C:
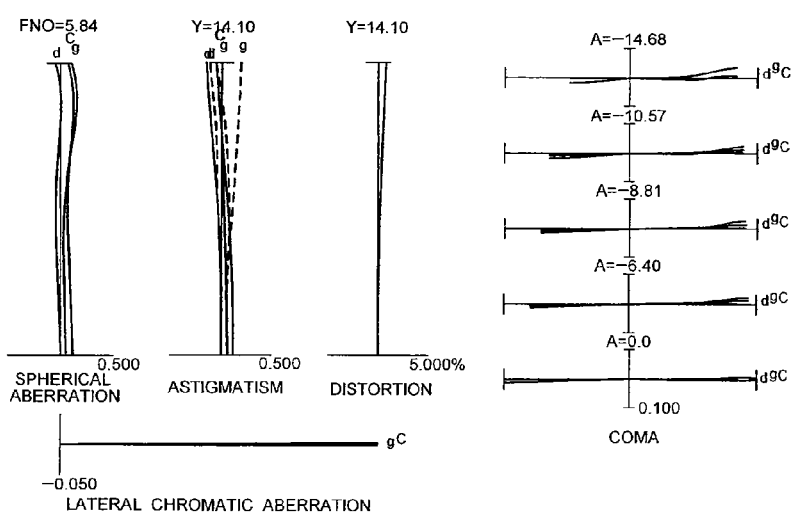

FIGS. 10A, 10B and 10C are graphs showing various aberrations of the zoom lens system according to Example 5 of the second embodiment in a wide-angle end state, in an intermediate focal length state, in a telephoto end state, respectively.

As is apparent from the respective graphs, the zoom lens system according to Example 5 of the second embodiment shows superb optical performance as a result of good corrections to various aberrations in the wide-angle end state, in the intermediate focal length state, and in the telephoto end state.

EXAMPLE 6

FIG. 11 is a diagram showing a lens configuration of a zoom lens system according to Example 6 of a second embodiment together with a zooming trajectory of each lens group.

A zoom lens system according to Example 6 of the second embodiment is composed of, in order from an object, a first lens group G1 having negative refractive power, a second lens group G2 having positive refractive power, an aperture stop S, a third lens group G3 having negative refractive power, a fourth lens group G4 having positive refractive power, and a flare stopper FS. Upon zooming from a wide-angle end state (W) to a telephoto end state (T), respective lens groups G1, G2, G3, and G4 are moved along an optical axis such that a distance between the first lens group G1 and the second lens group G2 decreases, a distance between the second lens group G2 and the third lens group G3 increases, and a distance between the third lens group G3 and the fourth lens group G4 decreases.

The first lens group G1 is composed of, in order from the object, a negative meniscus lens L1 having a convex surface facing the object, a double concave negative lens L2, and a positive meniscus lens L3 having a convex surface facing the object.

The second lens group G2 is composed of, in order from the object, a double convex positive lens L4, and a cemented lens constructed by a double convex positive lens L5 cemented with a double concave negative lens L6.

The third lens group G3 is composed of a cemented lens constructed by, in order from the object, a positive meniscus lens L7 having a convex surface facing the image cemented with a double concave negative lens L8.

The fourth lens group G4 is composed of, in order from the object, a positive meniscus lens L9, which is a plastic aspherical lens, having a convex surface facing the image, a double convex positive lens L10, and a plano-concave lens L11.

An aperture stop S is disposed to the object side of the third lens group G3 in the vicinity thereof, and moved together with the third lens group G3 in a body upon zooming from the wide-angle end state to the telephoto end state.

A flare stopper FS is disposed to the image side of the fourth lens group G4, and effectively removes coma flare in an intermediate height image.

Various values associated with a zoom lens system according to Example 6 of the second embodiment are listed in Table 6.

TABLE 6

[Specifications]

|  | W | T |
|---|---|---|
| f = | 18.54 | 53.4 |
| FNO = | 3.6 | 5.45 |
| 2ω = | 78.18 | 29.86° |

[Lens Data]

|  | r | d | nd | vd |
|---|---|---|---|---|
| 1 | 64.1663 | 1.0000 | 1.589130 | 61.18 |
| 2 | 19.8759 | 0.1000 | 1.553890 | 38.09 |
| *3 | 17.6687 | 8.7577 |  |  |
| 4 | −74.6681 | 1.0000 | 1.516330 | 64.14 |
| 5 | 29.9024 | 4.3884 |  |  |
| 6 | 41.8165 | 2.5740 | 1.805180 | 25.43 |
| 7 | 123.6822 | D7 |  |  |
| 8 | 45.8168 | 2.7826 | 1.487490 | 70.24 |
| 9 | −38.5977 | 4.1127 |  |  |
| 10 | 24.3027 | 3.5000 | 1.516330 | 64.14 |
| 11 | −38.5376 | 1.0000 | 1.846660 | 23.78 |
| 12 | −537.5618 | D12 |  |  |
| 13 | 0.0000 | 1.9099 | Aperture Stop S | |
| 14 | −38.1662 | 2.0000 | 1.846660 | 23.78 |
| 15 | −19.0782 | 1.0000 | 1.772500 | 49.61 |
| 16 | 60.1310 | D16 |  |  |
| 17 | −40.0000 | 1.2188 | 1.585180 | 30.24 |
| *18 | −27.7873 | 0.1000 |  |  |
| 19 | 99.0502 | 4.1140 | 1.589130 | 61.18 |
| 20 | −17.9625 | 0.1000 |  |  |
| 21 | −42.4892 | 1.0000 | 1.846660 | 23.78 |
| 22 | 0.0000 | D22 |  |  |
| 23 | 0.0000 | B.F | Flare Stopper FS | |

[Aspherical Data]

Surface Number 3

| κ = | −1.00000 |
|---|---|
| C4 = | 1.00191E−05 |
| C6 = | 1.95672E−08 |
| C8 = | −4.00558E−11 |
| C10 = | 1.18346E−13 |
| C12 = | 0.0000 |

Surface Number 18

| κ = | 0.00000 |
|---|---|
| C4 = | 3.95862E−05 |
| C6 = | 1.65623E−07 |
| C8 = | −1.92869E−10 |
| C10 = | 1.72254E−13 |
| C12 = | 0.0000 |

[Variable Distances]

|  | W | M | T |
|---|---|---|---|
| f | 18.500 | 35.000 | 53.400 |
| D7 | 34.961 | 9.516 | 1.100 |

TABLE 6-continued

| | | | |
|---|---|---|---|
| D12 | 0.974 | 6.197 | 11.116 |
| D16 | 12.362 | 7.139 | 2.219 |
| D22 | 0.000 | 12.225 | 24.709 |
| B.F | 38.500 | 38.500 | 38.500 |

[Values for Conditional Expressions]

(1): νd = 61.18 (L1), 64.14 (L2)
(2): nd1 = 1.589130 (L1), 1.516330 (L2)
(3): νd2 = 70.24 (L4), 64.14 (L5)
(4): nd2 = 1.487490 (L4), 1.516330 (L5)
(5): νd4 = 61.18 (L10)
(6): nd4 = 1.589130 (L10)
(7): (−f1)/fw = 1.55
(8): Rasp/(−f1) = 0.59
(9): f2/fw = 1.49
(10): (−f3)/fw = 1.71
(12): f4/fw = 2.13
(13): |f4/fP| = 0.26

Figure 12A:
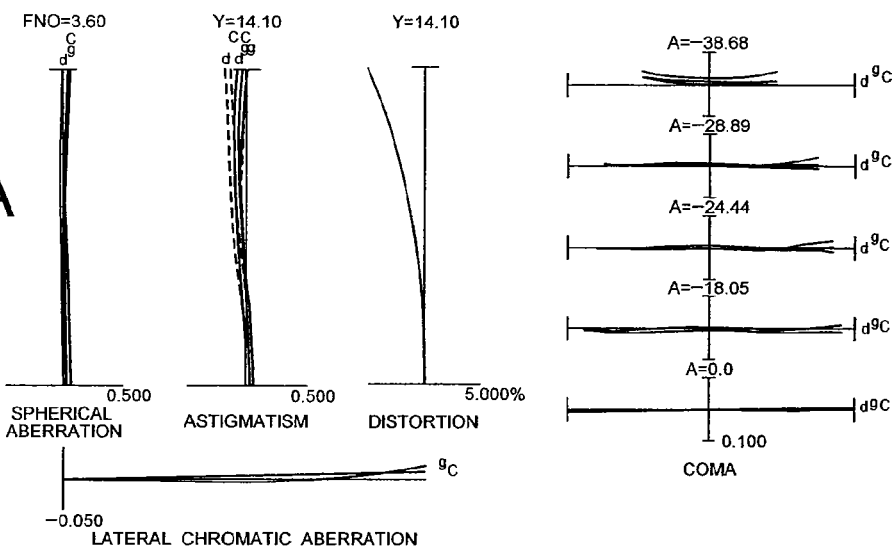
FIGS. 12A, 12B and 12C are graphs showing various aberrations of the zoom lens system according to Example 6 of the second embodiment in a wide-angle end state, in an intermediate focal length state, in a telephoto end state, respectively.
Figure 12B:
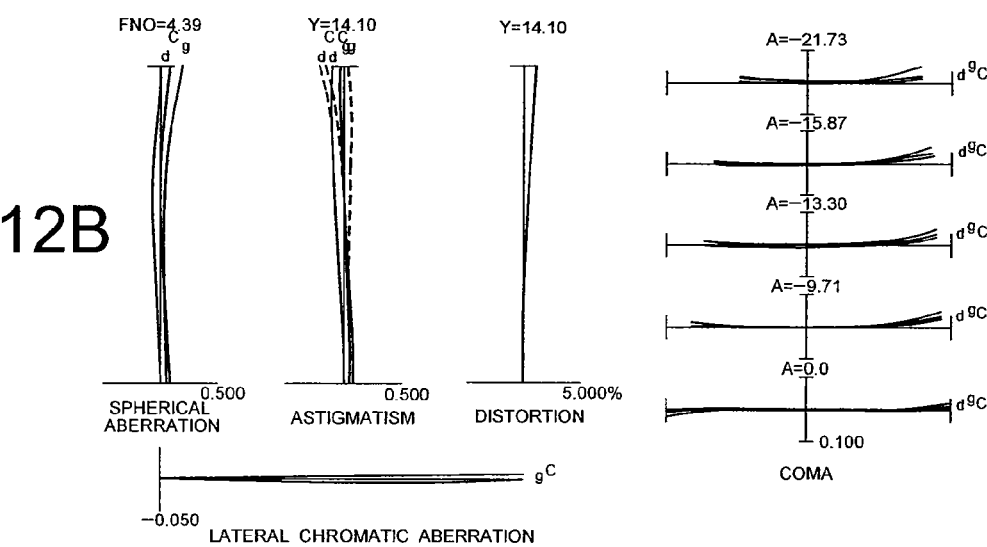
Figure 12C:
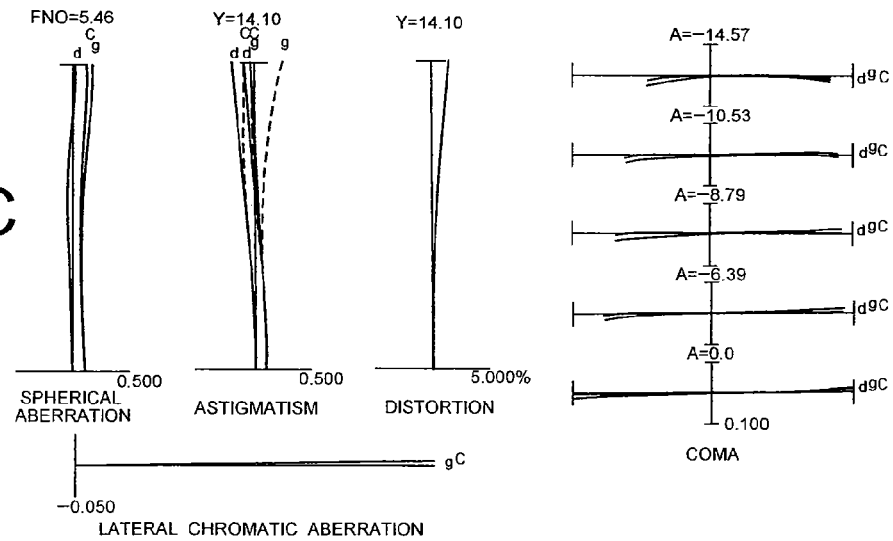

FIGS. 12A, 12B and 12C are graphs showing various aberrations of the zoom lens system according to Example 6 of the second embodiment in a wide-angle end state, in an intermediate focal length state, in a telephoto end state, respectively.

As is apparent from the respective graphs, the zoom lens system according to Example 6 of the second embodiment shows superb optical performance as a result of good corrections to various aberrations in the wide-angle end state, in the intermediate focal length state, and in the telephoto end state.

EXAMPLE 7

FIG. 13 is a diagram showing a lens configuration of a zoom lens system according to Example 7 of a second embodiment together with a zooming trajectory of each lens group.

A zoom lens system according to Example 7 of the second embodiment is composed of, in order from an object, a first lens group G1 having negative refractive power, a second lens group G2 having positive refractive power, an aperture stop S, a third lens group G3 having negative refractive power, a fourth lens group G4 having positive refractive power, and a flare stopper FS. Upon zooming from a wide-angle end state (W) to a telephoto end state (T), respective lens groups G1, G2, G3, and G4 are moved along an optical axis such that a distance between the first lens group G1 and the second lens group G2 decreases, a distance between the second lens group G2 and the third lens group G3 increases, and a distance between the third lens group G3 and the fourth lens group G4 decreases.

The first lens group G1 is composed of, in order from the object, a negative meniscus lens L1 having a convex surface facing the object, a double concave negative lens L2, and a positive meniscus lens L3 having a convex surface facing the object.

The second lens group G2 is composed of, in order from the object, a double convex positive lens L4, and a cemented lens constructed by a double convex positive lens L5 cemented with a double concave negative lens L6.

The third lens group G3 is composed of a cemented lens constructed by, in order from the object, a positive meniscus lens L7 having a convex surface facing the image cemented with a double concave negative lens L8.

The fourth lens group G4 is composed of, in order from the object, a cemented lens constructed by a double concave negative lens L9, which is a plastic aspherical lens, cemented with a double convex positive lens L10, and a double convex positive lens L11.

An aperture stop S is disposed to the object side in the vicinity of the third lens group G3, and moved together with the third lens group G3 in a body upon zooming from the wide-angle end state to the telephoto end state.

A flare stopper FS is disposed to the image side of the fourth lens group G4, and effectively removes coma flare in an intermediate height image.

Various values associated with a zoom lens system according to Example 7 of the second embodiment are listed in Table 7.

TABLE 7

[Specifications]

| | W | T |
|---|---|---|
| f = | 18.54 | 53.4 |
| FNO = | 3.6 | 5.76 |
| 2ω = | 78.18 | 29.86° |

[Lens Data]

| | r | d | nd | νd |
|---|---|---|---|---|
| 1 | 45.3636 | 1.0000 | 1.589130 | 61.18 |
| 2 | 18.0047 | 0.1000 | 1.553890 | 38.09 |
| *3 | 16.2706 | 9.6651 | | |
| 4 | −111.9321 | 1.0000 | 1.589130 | 61.18 |
| 5 | 30.9798 | 4.0188 | | |
| 6 | 37.2483 | 3.1980 | 1.846660 | 23.78 |
| 7 | 82.4283 | D7 | | |
| 8 | 29.2959 | 2.8333 | 1.581439 | 40.75 |
| 9 | −45.4968 | 1.2436 | | |
| 10 | 26.9363 | 3.5000 | 1.516330 | 64.14 |
| 11 | −30.2204 | 1.0000 | 1.846660 | 23.78 |
| 12 | 170.5988 | D12 | | |
| 13 | 0.0000 | 1.8561 | Aperture Stop S | |
| 14 | −35.3429 | 2.0000 | 1.784718 | 25.71 |
| 15 | −13.6521 | 1.0000 | 1.723420 | 37.95 |
| 16 | 54.7652 | D16 | | |
| 17 | −63.7885 | 0.5000 | 1.585180 | 30.24 |
| *18 | 74.9879 | 0.1000 | | |
| 19 | 80.0562 | 3.2643 | 1.516330 | 64.15 |
| 20 | −23.3244 | 0.1000 | | |
| 21 | 225.0632 | 2.3577 | 1.516330 | 64.15 |
| 22 | −43.0774 | D22 | | |
| 23 | 0.0000 | B.F | Flare Stopper FS | |

[Aspherical Data]

Surface Number 3

| | |
|---|---|
| κ = | −1.00000 |
| C4 = | 1.79370E−05 |
| C6 = | 1.99850E−08 |
| C8 = | 7.76380E−12 |
| C10 = | 1.32429E−13 |
| C12 = | 0.0000 |

Surface Number 18

| | |
|---|---|
| κ = | 0.00000 |
| C4 = | 1.32435E−05 |
| C6 = | 1.03858E−07 |
| C8 = | −1.69082E−09 |
| C10 = | 8.76925E−12 |
| C12 = | 0.0000 |

[Variable Distances]

| | W | M | T |
|---|---|---|---|
| f | 18.500 | 35.000 | 53.400 |
| D7 | 33.501 | 9.235 | 1.100 |
| D12 | 1.104 | 4.583 | 7.955 |

TABLE 7-continued

| D16 | 8.880 | 5.407 | 2.020 |
|---|---|---|---|
| D22 | 0.000 | 14.637 | 30.000 |
| B.F | 38.499 | 38.498 | 38.502 |

[Values for Conditional Expressions]

(1): vd1 = 61.18 (L1), 61.18 (L2)
(2): nd1 = 1.589130 (L1), 1.589130 (L2)
(3): vd2 = 40.75 (L4), 64.14 (L5)
(4): nd2 = 1.581439 (L4), 1.516330 (L5)
(5): vd4 = 64.15 (L10), 64.15 (L11)
(6): nd4 = 1.516330 (L10), 1.516330 (L11)
(7): (−f1)/fw = 1.55
(8): Rasp/(−f1) = 0.63
(9): f2/fw = 1.45
(10): (−f3)/fw = 1.72
(12): f4/fw = 2.03
(13): |f4/fP| = 0.64

Figure 14A:
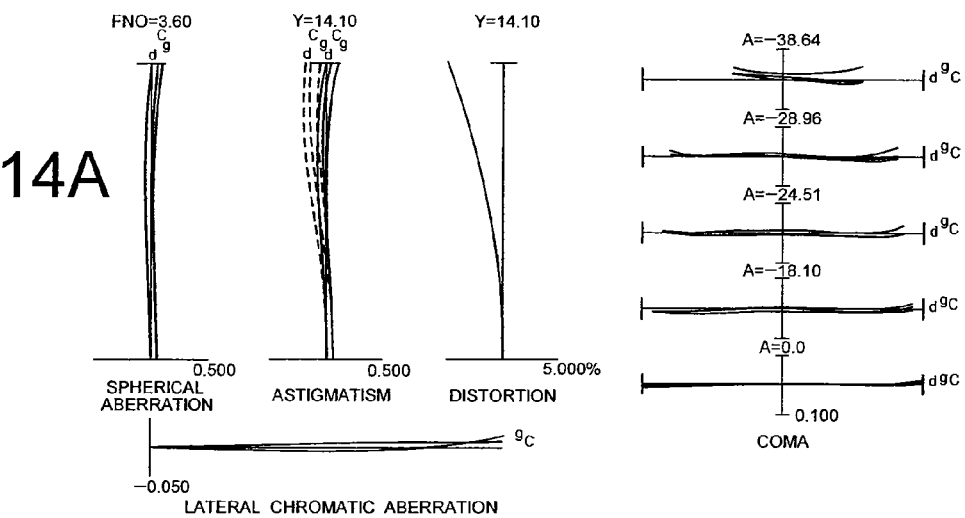
FIGS. 14A, 14B and 14C are graphs showing various aberrations of the zoom lens system according to Example 7 of the second embodiment in a wide-angle end state, in an intermediate focal length state, in a telephoto end state, respectively.
Figure 14B:
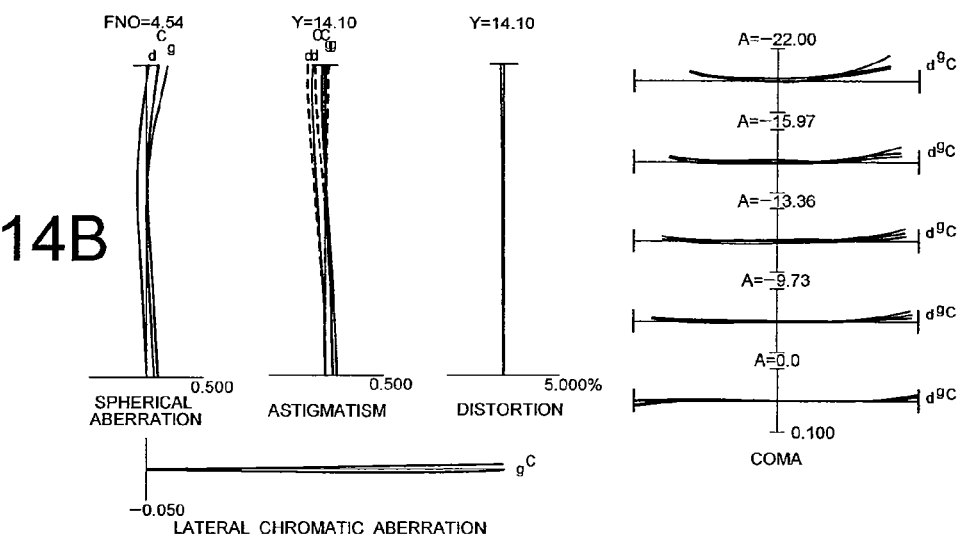
Figure 14C:
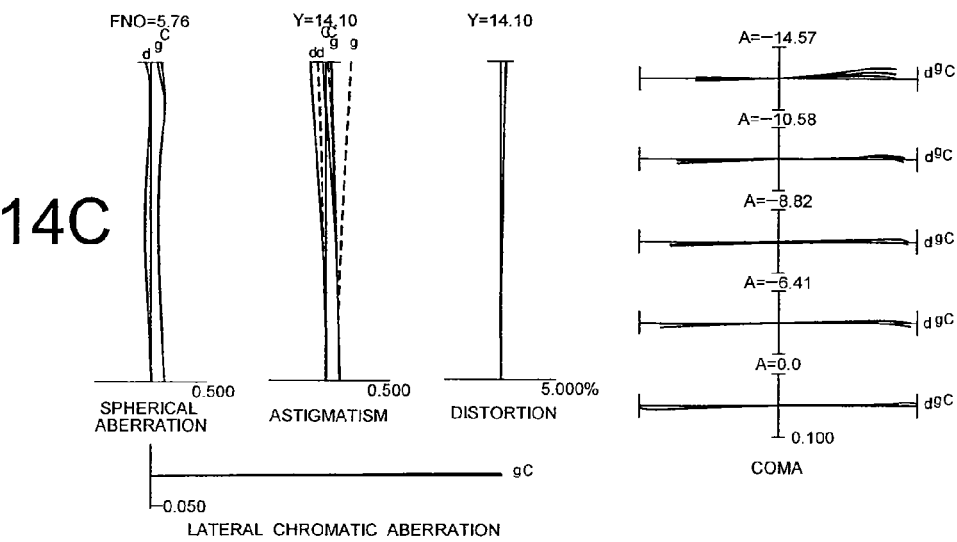

FIGS. 14A, 14B and 14C are graphs showing various aberrations of the zoom lens system according to Example 7 of the second embodiment in a wide-angle end state, in an intermediate focal length state, in a telephoto end state, respectively.

As is apparent from the respective graphs, the zoom lens system according to Example 7 of the second embodiment shows superb optical performance as a result of good corrections to various aberrations in the wide-angle end state, in the intermediate focal length state, and in the telephoto end state.

EXAMPLE 8

FIG. 15 is a diagram showing a lens configuration of a zoom lens system according to Example 8 of a second embodiment together with a zooming trajectory of each lens group.

A zoom lens system according to Example 8 of the second embodiment is composed of, in order from an object, a first lens group G1 having negative refractive power, a second lens group G2 having positive refractive power, an aperture stop S, a third lens group G3 having negative refractive power, a fourth lens group G4 having positive refractive power, and a flare stopper FS. Upon zooming from a wide-angle end state (W) to a telephoto end state (T), respective lens groups G1, G2, G3, and G4 are moved along an optical axis such that a distance between the first lens group G1 and the second lens group G2 decreases, a distance between the second lens group G2 and the third lens group G3 increases, and a distance between the third lens group G3 and the fourth lens group G4 decreases.

The first lens group G1 is composed of, in order from the object, a negative meniscus lens L1 having a convex surface facing the object, a double concave negative lens L2, and a positive meniscus lens L3 having a convex surface facing the object.

The second lens group G2 is composed of, in order from the object, a double convex positive lens L4, and a cemented lens constructed by a double convex positive lens L5 cemented with a double concave negative lens L6.

The third lens group G3 is composed of a cemented lens constructed by, in order from the object, a positive meniscus lens L7 having a convex surface facing the image cemented with a double concave negative lens L8.

The fourth lens group G4 is composed of, in order from the object, a positive meniscus lens L9, which is a plastic aspherical lens, having a convex surface facing the image, a double convex positive lens L10, and a plano-concave lens L11.

An aperture stop S is disposed to the object side of the third lens group G3 in the vicinity thereof, and moved together with the third lens group G3 in a body upon zooming from the wide-angle end state to the telephoto end state.

A flare stopper FS is disposed to the image side of the fourth lens group G4, and effectively removes coma flare in an intermediate height image.

Various values associated with a zoom lens system according to Example 8 of the second embodiment are listed in Table 8.

TABLE 8

[Specifications]

| | W | T |
|---|---|---|
| f = | 18.54 | 53.4 |
| FNO = | 3.6 | 5.68 |
| 2ω = | 78.18 | 29.86° |

[Lens Data]

| | r | d | nd | vd |
|---|---|---|---|---|
| 1 | 65.3290 | 1.0000 | 1.589130 | 61.18 |
| 2 | 19.6848 | 0.1000 | 1.553890 | 38.09 |
| *3 | 17.4453 | 8.8628 | | |
| 4 | −74.5250 | 1.0000 | 1.516330 | 64.14 |
| 5 | 29.1392 | 4.0560 | | |
| 6 | 41.8460 | 2.7483 | 1.805180 | 25.43 |
| 7 | 140.0310 | D7 | | |
| 8 | 42.0101 | 2.7332 | 1.487490 | 70.24 |
| 9 | −42.2685 | 4.7621 | | |
| 10 | 24.2832 | 3.5000 | 1.516330 | 64.14 |
| 11 | −46.8420 | 1.0000 | 1.846660 | 23.78 |
| 12 | 462.4247 | D12 | | |
| 13 | 0.0000 | 1.8772 | Aperture Stop S | |
| 14 | −40.1900 | 2.0000 | 1.846660 | 23.78 |
| 15 | −21.1336 | 1.0000 | 1.772500 | 49.61 |
| 16 | 70.4504 | D16 | | |
| 17 | −40.0000 | 0.9463 | 1.585180 | 30.24 |
| *18 | −35.1163 | 0.1000 | | |
| 19 | 76.8171 | 4.0986 | 1.589130 | 61.18 |
| 20 | −18.7592 | 0.1000 | | |
| 21 | −54.0847 | 1.0000 | 1.846660 | 23.78 |
| 22 | 0.0000 | D22 | | |
| 23 | 0.0000 | B.F | Flare Stopper FS | |

[Aspherical Data]

Surface Number 3

| κ = | −1.00000 |
|---|---|
| C4 = | 1.05417E−05 |
| C6 = | 1.23041E−08 |
| C8 = | −9.58113E−12 |
| C10 = | 3.55941E−14 |
| C12 = | 0.0000 |

Surface Number 18

| κ = | 0.00000 |
|---|---|
| C4 = | 3.75962E−05 |
| C6 = | 1.51983E−07 |
| C8 = | −4.00722E−10 |
| C10 = | 3.69316E−13 |
| C12 = | 0.0000 |

[Variable Distances]

| | W | M | T |
|---|---|---|---|
| f | 18.500 | 35.000 | 53.400 |
| D7 | 34.105 | 9.173 | 1.100 |

TABLE 8-continued

| D12 | 1.040 | 6.236 | 11.080 |
|---|---|---|---|
| D16 | 12.211 | 7.009 | 2.173 |
| D22 | 0.000 | 13.775 | 28.000 |
| B.F | 38.500 | 38.500 | 38.500 |

[Values for Conditional Expressions]

Figure 16A:
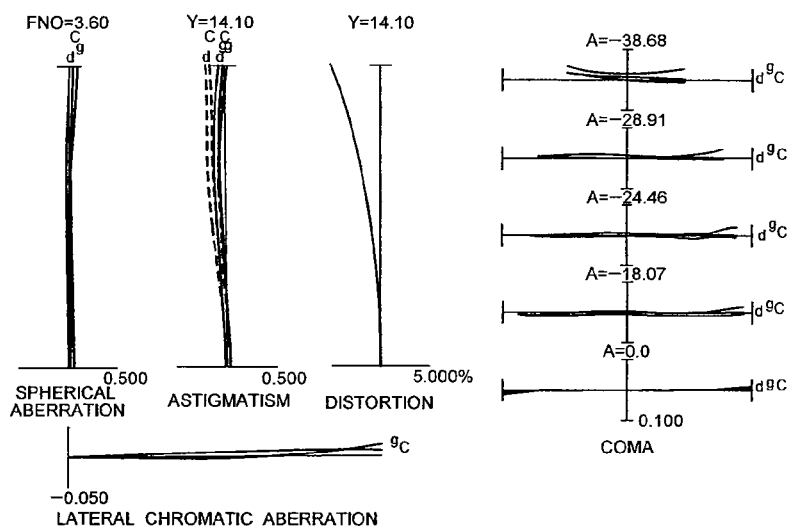
FIGS. 16A, 16B and 16C are graphs showing various aberrations of the zoom lens system according to Example 8 of the second embodiment in a wide-angle end state, in an intermediate focal length state, in a telephoto end state, respectively.
Figure 16B:
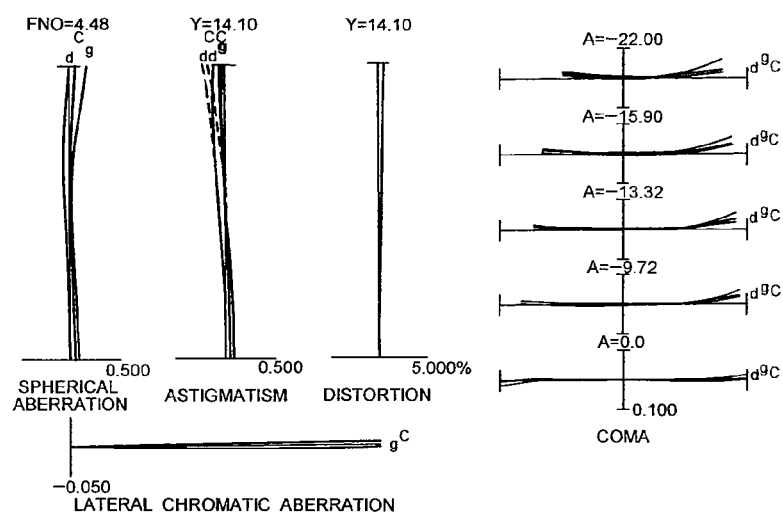
Figure 16C:
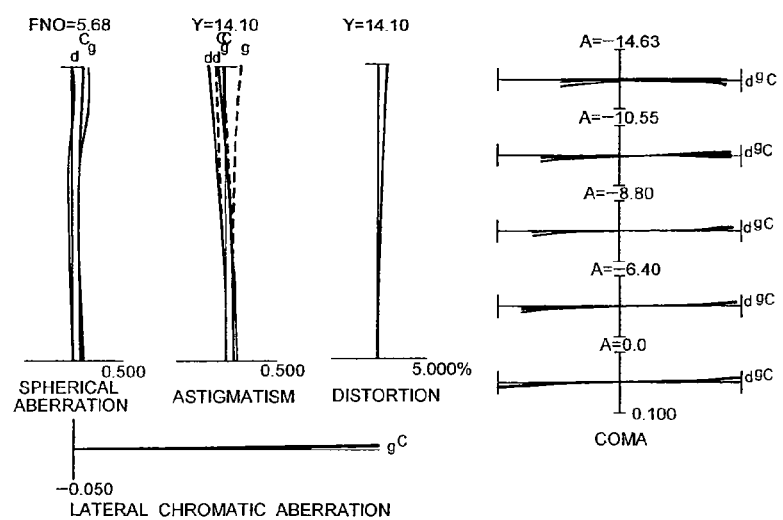

(1): $vd1 = 61.18$ (L1), 64.14 (L2)
(2): $nd1 = 1.589130$ (L1), 1.516330 (L2)
(3): $vd2 = 70.24$ (L4), 64.14 (L5)
(4): $nd2 = 1.487490$ (L4), 1.516330 (L5)
(5): $vd4 = 61.18$ (L10)
(6): $nd4 = 1.589130$ (L10)
(7): $(-f1)/fw = 1.53$
(8): $Rasp/(-f1) = 0.62$
(9): $f2/fw = 1.56$
(10): $(-f3)/fw = 1.87$
(12): $f4/fw = 2.12$
(13): $|f4/fP| = 0.09$ FIGS. 16A, 16B and 16C are graphs showing various aberrations of the zoom lens system according to Example 8 of the second embodiment in a wide-angle end state, in an intermediate focal length state, in a telephoto end state, respectively.

As is apparent from the respective graphs, the zoom lens system according to Example 8 of the second embodiment shows superb optical performance as a result of good corrections to various aberrations in the wide-angle end state, in the intermediate focal length state, and in the telephoto end state.

EXAMPLE 9

FIG. 17 is a diagram showing a lens configuration of a zoom lens system according to Example 9 of a second embodiment together with a zooming trajectory of each lens group.

A zoom lens system according to Example 9 of the second embodiment is composed of, in order from an object, a first lens group G1 having negative refractive power, a second lens group G2 having positive refractive power, an aperture stop S, a third lens group G3 having negative refractive power, a fourth lens group G4 having positive refractive power, and a flare stopper FS. Upon zooming from a wide-angle end state (W) to a telephoto end state (T), respective lens groups G1, G2, G3, and G4 are moved along an optical axis such that a distance between the first lens group G1 and the second lens group G2 decreases, a distance between the second lens group G2 and the third lens group G3 increases, and a distance between the third lens group G3 and the fourth lens group G4 decreases.

The first lens group G1 is composed of, in order from the object, a negative meniscus lens L1 having a convex surface facing the object, a double concave negative lens L2, and a positive meniscus lens L3 having a convex surface facing the object.

The second lens group G2 is composed of, in order from the object, a double convex positive lens L4, and a cemented lens constructed by a double convex positive lens L5 cemented with a double concave negative lens L6.

The third lens group G3 is composed of a cemented lens constructed by, in order from the object, a positive meniscus lens L7 having a convex surface facing the image cemented with a double concave negative lens L8.

The fourth lens group G4 is composed of, in order from the object, a positive meniscus lens L9, which is a plastic aspherical lens, having a convex surface facing the image, a double convex positive lens L10, and a plano-concave lens L11.

An aperture stop S is disposed to the object side of the third lens group G3 in the vicinity thereof, and moved together with the third lens group G3 in a body upon zooming from the wide-angle end state to the telephoto end state.

A flare stopper FS is disposed to the image side of the fourth lens group G4, and effectively removes coma flare in an intermediate height image.

Various values associated with a zoom lens system according to Example 9 of the second embodiment are listed in Table 9.

TABLE 9

[Specifications]

| | W | T |
|---|---|---|
| f = | 18.54 | 53.4 |
| FNO = | 3.6 | 5.42 |
| 2ω = | 78.18 | 29.86° |

[Lens Data]

| | r | d | nd | vd |
|---|---|---|---|---|
| 1 | 61.2844 | 1.0000 | 1.672700 | 32.10 |
| 2 | 20.5207 | 0.1000 | 1.553890 | 38.09 |
| *3 | 17.9384 | 9.0668 | | |
| 4 | −53.4082 | 1.0000 | 1.516330 | 64.15 |
| 5 | 29.2891 | 3.2796 | | |
| 6 | 40.2136 | 3.2760 | 1.846660 | 23.78 |
| 7 | 260.6866 | D7 | | |
| 8 | 36.9155 | 3.1184 | 1.581439 | 40.75 |
| 9 | −41.8216 | 0.1027 | | |
| 10 | 30.8834 | 4.0000 | 1.516330 | 64.14 |
| 11 | −27.5191 | 1.0000 | 1.805180 | 25.43 |
| 12 | 293.1614 | D12 | | |
| 13 | 0.0000 | 1.8112 | Aperture Stop S | |
| 14 | −49.1649 | 2.0000 | 1.805180 | 25.43 |
| 15 | −22.3120 | 1.0000 | 1.772500 | 49.61 |
| 16 | 69.0171 | D16 | | |
| 17 | −162.8962 | 2.1812 | 1.525380 | 56.31 |
| *18 | −26.8044 | 0.1000 | | |
| 19 | 323.0430 | 3.8457 | 1.516330 | 64.14 |
| 20 | −18.2256 | 0.1000 | | |
| 21 | −33.3681 | 1.0000 | 1.805180 | 25.43 |
| 22 | −555.4187 | D22 | | |
| 23 | 0.0000 | B.F | Flare Stopper FS | |

[Aspherical Data]

Surface Number 3

| κ = | −1.00000 |
|---|---|
| C4 = | 6.92835E−06 |
| C6 = | 1.00707E−08 |
| C8 = | −3.25392E−11 |
| C10 = | 1.47666E−14 |
| C12 = | 0.0000 |

Surface Number 18

| κ = | 0.00000 |
|---|---|
| C4 = | 3.71384E−05 |
| C6 = | 1.05201E−07 |
| C8 = | 4.31819E−11 |
| C10 = | 0.0000 |
| C12 = | 0.0000 |

[Variable Distances]

| | W | M | T |
|---|---|---|---|
| f | 18.500 | 35.000 | 53.400 |
| D7 | 37.703 | 11.760 | 2.971 |

TABLE 9-continued

| D12 | 1.071 | 7.105 | 12.123 |
|---|---|---|---|
| D16 | 12.934 | 6.912 | 1.874 |
| D22 | 0.000 | 11.741 | 25.093 |
| B.F | 38.500 | 38.500 | 38.500 |

[Values for Conditional Expressions]

(1): νd1 = 32.10 (L1), 64.15 (L2)
(2): nd1 = 1.672700 (L1), 1.516330 (L2)
(3): νd2 = 40.75 (L4), 64.14 (L5)
(4): nd2 = 1.581439 (L4), 1.516330 (L5)
(5): νd4 = 64.14 (L10)
(6): nd4 = 1.516330 (L10)
(7): (−f1)/fw = 1.60
(8): Rasp/(−f1) = 0.61
(9): f2/fw = 1.58
(10): (−f3)/fw = 2.04
(12): f4/fw = 2.29
(13): |f4/fP| = 0.70

Figure 18A:
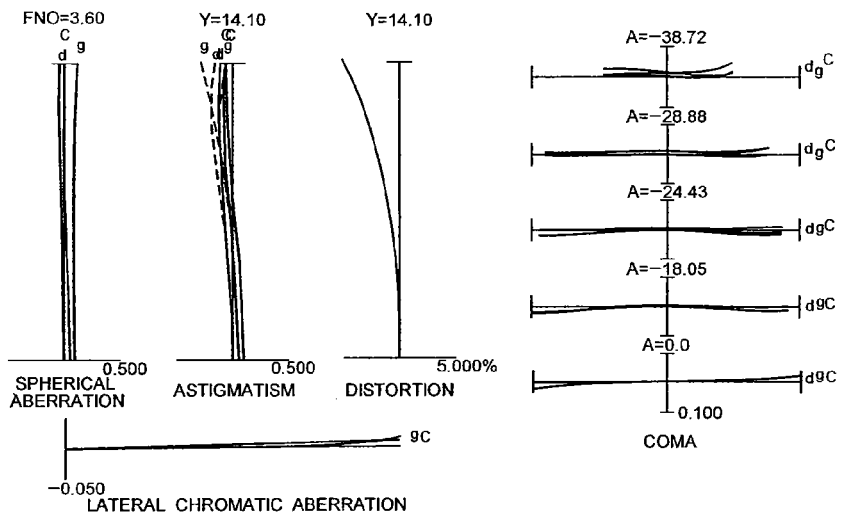
FIGS. 18A, 18B and 18C are graphs showing various aberrations of the zoom lens system according to Example 9 of the second embodiment in a wide-angle end state, in an intermediate focal length state, in a telephoto end state, respectively.
Figure 18B:
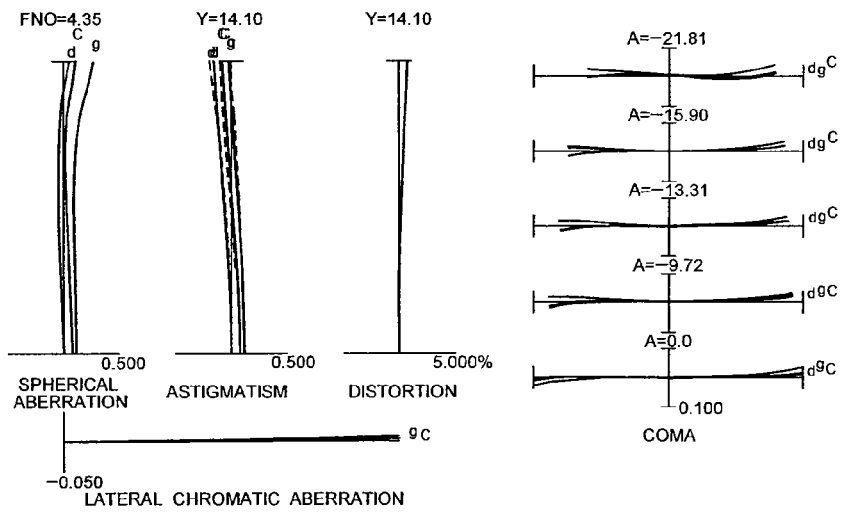
Figure 18C:
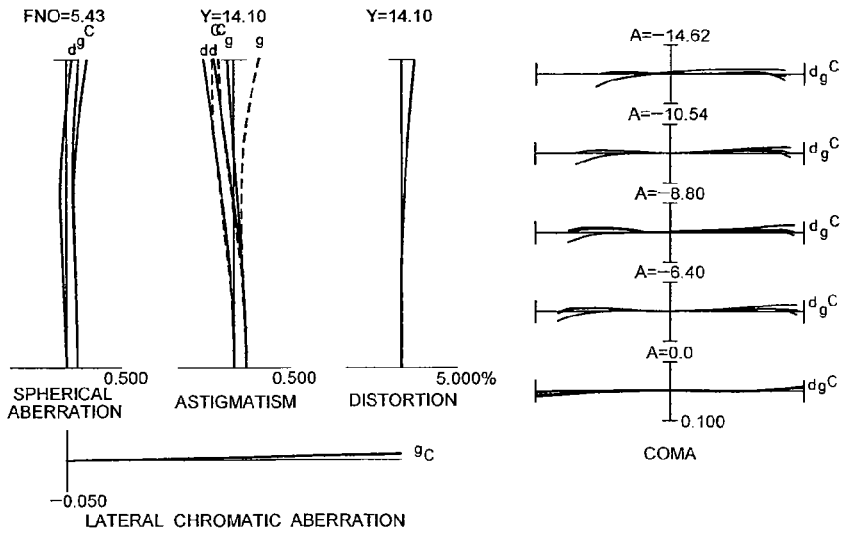

FIGS. 18A, 18B and 18C are graphs showing various aberrations of the zoom lens system according to Example 9 of the second embodiment in a wide-angle end state, in an intermediate focal length state, in a telephoto end state, respectively.

As is apparent from the respective graphs, the zoom lens system according to Example 9 of the second embodiment shows superb optical performance as a result of good corrections to various aberrations in the wide-angle end state, in the intermediate focal length state, and in the telephoto end state.

Each example as described above makes it possible to provide a zoom lens system with high optical performance suitable for a single-lens reflex digital camera.

Although a zoom lens system with a four-lens-group configuration is shown as each Example of the present application, the lens-group configuration according to the present application is not limited to this, other lens-group configurations such as a three-lens-group configuration or a five-lens-group configuration are possible.

In each Example in both embodiments, in order to carry out focusing from infinity to a close object, a portion of a lens group, a single lens group, or a plurality of lens groups may be moved along the optical axis. The focusing lens group(s) may be used for auto focus, and suitable for being driven by a motor such as an ultrasonic motor. In a zoom lens system according to each Example, it is preferable that the first lens group is used for the focusing lens group.

In a zoom lens system according to each Example, in order to correct an image blur caused by an camera shake, a portion of a lens group, or a single lens group may be moved as a vibration reduction lens group in a direction perpendicular to the optical axis. In a zoom lens system according to each Example of the present application, it is preferable that the third lens group is used for the vibration reduction lens group.

In each lens group composing a zoom lens system according to the present application, not only the first lens group, but any lens group such as the second, third, and fourth lens groups may include an aspherical surface. The aspherical surface may be fabricated by a fine grinding process, a glass molding process that a glass material is formed into an aspherical shape by a mold, or a compound type process that a resin material is formed into an aspherical shape on a glass surface.

In a zoom lens system according to each Example, an antireflection coating having high transmittance over a broad wavelength range may be applied to each lens surface to reduce flare or ghost images, so that high optical performance with a high contrast can be attained.

Moreover, the negative lens in the third lens group may satisfy conditional expressions similar to conditional expressions (1) and (2) of the negative lens in the first lens group.

The above-described each example of the present application only shows a specific example, so that the present application is not limited to this.

Then, a camera equipped with a zoom lens system according to the present application is explained with reference to FIG. 19.

FIG. 19 is a schematic diagram showing a single-lens reflex digital camera as an imaging apparatus using a zoom lens system according to Examples 1.

As shown in FIG. 19, the camera 1 is a single-lens reflex digital camera equipped with a zoom lens system according to Example 1.

In the camera 1, light emitted from a subject (not shown) is converged by an image-taking lens 2, and focused on a focusing screen 4 through a quick return mirror 3. The subject image focused on the focusing screen 4 is reflected a plurality of times by a pentagonal roof prism 5, and led to an eyepiece 6. Therefore, a photographer can observe the subject image as an erected image through the eyepiece 6.

When the photographer presses a shutter release button (not shown), the quick return mirror 3 is removed from an optical path, and the light from the subject (not shown) reaches an imaging device 7. The light from the subject is captured by the imaging device 7 and stored in a memory (not shown) as a subject image. In this manner, the photographer can take a picture of the subject by the camera 1.

The zoom lens system according to Example 1 of the first embodiment attached to the camera 1 as an image-taking lens 2 makes it possible to realize high optical performance by means of the specific lens configuration and a method for varying a focal length. Accordingly, the camera 1 makes it possible to realize high optical performance.

The present application is not limited to this, and it is needless to say that the similar effect can be obtained by a camera equipped with a zoom lens according to any one of Examples 2 through 9 of the present application.

As described above, the present application makes it possible to provide a zoom lens system with high optical performance suitable for a single-lens reflex digital camera, an imaging apparatus, and a method for varying a focal length.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
   a first lens group having negative refractive power;
   a second lens group having positive refractive power;
   a third lens group having negative refractive power; and
   a fourth lens group having positive refractive power;
   wherein upon zooming from a wide-angle end state to a telephoto end state, each lens group moves along an optical axis such that a distance between the first lens group and the second lens group decreases, a distance between the second lens group and the third lens group increases, and the distance between the third lens group and the fourth lens group decreases; and the first lens group includes a negative lens, at least one lens in the negative lens includes an aspherical surface, and the negative lens satisfies the following conditional expressions:

$$30 \leq vd1 \leq 71$$

when $30 \leq vd1 < 36$, $$-0.013 \times vd1 + 2.083 \leq nd1 \leq 1.7,$$

when $36 \leq vd1 < 41$, $$-0.013 \times vd1 + 2.083 \leq nd1 \leq -0.004 \times vd1 + 1.844,$$

when $41 \leq vd1 < 51$, $$-0.004 \times vd1 + 1.714 \leq nd1 \leq -0.004 \times vd1 + 1.844,$$

when $51 \leq vd1 < 61$, $$-0.0015 \times vd1 + 1.5865 \leq nd1 \leq -0.004 \times vd1 + 1.844,$$

when $61 \leq vd1 \leq 71$, $$-0.0015 \times vd1 + 1.5865 \leq nd1 \leq -0.009 \times vd1 + 2.149$$

where nd1 denotes refractive index of a material of the negative lens in the first lens group at d-line, which has a wavelength $\lambda = 587.6$ nm, and vd1 denotes Abbe number of a material of the negative lens in the first lens group at d-line, which has a wavelength $\lambda = 587.6$ nm.

2. The zoom lens system according to claim 1, wherein the second lens group includes a positive lens, and the positive lens in the second lens group satisfies the following conditional expressions:

$$30 \leq vd2 \leq 71$$

when $30 \leq vd2 < 36$, $$-0.013 \times vd2 + 2.083 \leq nd2 \leq 1.7,$$

when $36 \leq vd2 < 41$, $$-0.013 \times vd2 + 2.083 \leq nd2 \leq -0.004 \times vd2 + 1.844,$$

when $41 \leq vd2 < 51$, $$-0.004 \times vd2 + 1.714 \leq nd2 \leq -0.004 \times vd2 + 1.844,$$

when $51 \leq vd2 < 61$, $$-0.0015 \times vd2 + 1.5865 \leq nd2 \leq -0.004 \times vd2 + 1.844,$$

when $61 \leq vd2 \leq 71$, $$-0.0015 \times vd2 + 1.5865 \leq nd2 \leq -0.009 \times vd2 + 2.149$$

where nd2 denotes refractive index of a material of the positive lens in the second lens group at d-line, which has a wavelength $\lambda = 587.6$ nm, and vd2 denotes Abbe number of a material of the positive lens in the second lens group at d-line, which has a wavelength $\lambda = 587.6$ nm.

3. The zoom lens system according to claim 2, wherein the fourth lens group includes a positive lens, and the positive lens in the fourth lens group satisfies the following conditional expressions:

$$30 \leq vd4 \leq 71$$

when $30 \leq vd4 < 36$, $$-0.013 \times vd4 + 2.083 \leq nd4 \leq 1.7,$$

when $36 \leq vd4 < 41$, $$-0.013 \times vd4 + 2.083 \leq nd4 \leq -0.004 \times vd4 + 1.844,$$

when $41 \leq vd4 < 51$, $$-0.004 \times vd4 + 1.714 \leq nd4 \leq -0.004 \times vd4 + 1.844,$$

when $51 \leq vd4 < 61$, $$-0.0015 \times vd4 + 1.5865 \leq nd4 \leq -0.004 \times vd4 + 1.844,$$

when $61 \leq vd4 \leq 71$, $$-0.0015 \times vd4 + 1.5865 \leq nd4 \leq -0.009 \times vd4 + 2.149$$

where nd4 denotes refractive index of a material of the positive lens in the fourth lens group at d-line, which has a wavelength $\lambda = 587.6$ nm, and vd4 denotes Abbe number of a material of the positive lens in the fourth lens group at d-line, which has a wavelength $\lambda = 587.6$ nm.

4. The zoom lens system according to claim 1, wherein the fourth lens group includes a positive lens, and the positive lens in the fourth lens group satisfies the following conditional expressions:

$$30 \leq vd4 \leq 71$$

when $30 \leq vd4 < 36$, $$-0.013 \times vd4 + 2.083 \leq nd4 \leq 1.7,$$

when $36 \leq vd4 < 41$, $$-0.013 \times vd4 + 2.083 \leq nd4 \leq -0.004 \times vd4 + 1.844,$$

when $41 \leq vd4 < 51$, $$-0.004 \times vd4 + 1.714 \leq nd4 \leq -0.004 \times vd4 + 1.844,$$

when $51 \leq vd4 < 61$, $$-0.0015 \times vd4 + 1.5865 \leq nd4 \leq -0.004 \times vd4 + 1.844,$$

when $61 \leq vd4 \leq 71$, $$-0.0015 \times vd4 + 1.5865 \leq nd4 \leq -0.009 \times vd4 + 2.149$$

where nd4 denotes refractive index of a material of the positive lens in the fourth lens group at d-line, which has a wavelength $\lambda = 587.6$ nm, and vd4 denotes Abbe number of a material of the positive lens in the fourth lens group at d-line, which has a wavelength $\lambda = 587.6$ nm.

5. The zoom lens system according to claim 1, wherein the first lens group includes, in order from the object, a negative meniscus lens having convex surface facing the object, a negative lens having a concave surface facing an image, and a positive lens having a convex surface facing the object.

6. The zoom lens system according to claim 1, wherein the following conditional expression is satisfied:

$$0.7 \leq (-f1)/fw \leq 1.7$$

where f1 denotes a focal length of the first lens group, and fw denotes a focal length of the zoom lens system in the wide-angle end state.

7. The zoom lens system according to claim 1, wherein at least one of an image side surface of the negative meniscus lens or the image side surface of the negative lens in the first lens group is an aspherical surface, and the following conditional expression is satisfied:

$$0.32 \leq Rasp/(-f1) \leq 1.0$$

where Rasp denotes a paraxial radius of curvature of the aspherical surface, and f1 denotes a focal length of the first lens group.

8. The zoom lens system according to claim 1, wherein the second lens group consists of two positive lenses and a negative lens.

9. The zoom lens system according to claim 1, wherein the third lens group consists of a positive lens and a negative lens.

10. The zoom lens system according to claim 1, wherein an aperture stop is disposed in the vicinity of the third lens group, and moved together with the third lens group in a body.

11. The zoom lens system according to claim 1, wherein the fourth lens group consists of two positive lenses and a negative lens.

12. The zoom lens system according to claim 1, wherein the second lens group is moved together with the fourth lens group in a body upon zooming from the telephoto end state to the wide-angle end state.

13. The zoom lens system according to claim 1, wherein the following conditional expression is satisfied:

$$1.0 \leq f2/fw \leq 2.3$$

where fw denotes a focal length of the zoom lens system in the wide-angle end state, and f2 denotes a focal length of the second lens group.

14. The zoom lens system according to claim 1, wherein the following conditional expression is satisfied:

$$0.8 \leq (-f3)/fw \leq 3.0$$

where fw denotes a focal length of the zoom lens system in the wide-angle end state, and f3 denotes a focal length of the third lens group.

15. The zoom lens system according to claim 1, wherein the following conditional expression is satisfied:

$$0.8 \leq f4/fw \leq 2.0$$

where fw denotes a focal length of the zoom lens system in the wide-angle end state, and f4 denotes a focal length of the fourth lens group.

16. The zoom lens system according to claim 1, wherein the fourth lens group includes a plastic aspherical lens.

17. The zoom lens system according to claim 16, wherein the following conditional expression is satisfied:

$$1.5 \leq f4/fw \leq 2.9$$

where fw denotes a focal length of the zoom lens system in the wide-angle end state, and f4 denotes a focal length of the fourth lens group.

18. The zoom lens system according to claim 16, wherein the plastic aspherical lens in the fourth lens group satisfies the following conditional expression:

$$|f4/fP| \leq 0.9$$

where f4 denotes a focal length of the fourth lens group, and fP denotes a focal length of the plastic aspherical lens in the fourth lens group.

19. An imaging apparatus equipped with a zoom lens system, said zoom lens system comprising, in order from an object:

a first lens group having negative refractive power;
a second lens group having positive refractive power;
a third lens group having negative refractive power; and
a fourth lens group having positive refractive power;
wherein upon zooming from a wide-angle end state to a telephoto end state, each lens group moves along an optical axis such that a distance between the first lens group and the second lens group decreases, a distance between the second lens group and the third lens group increases, and the distance between the third lens group and the fourth lens group decreases; and
the first lens group includes a negative lens, at least one lens in the negative lens includes an aspherical surface, and the negative lens satisfies the following conditional expressions:

$$30 \leq vd1 \leq 71$$

when $30 \leq vd1 < 36$, $$-0.013 \times vd1 + 2.083 \leq nd1 \leq 1.7,$$

when $36 \leq vd1 < 41$, $$-0.013 \times vd1 + 2.083 \leq nd1 \leq -0.004 \times vd1 + 1.844,$$

when $41 \leq vd1 < 51$, $$-0.004 \times vd1 + 1.714 \leq nd1 \leq -0.004 \times vd1 + 1.844,$$

when $51 \leq vd1 < 61$, $$-0.0015 \times vd1 + 1.5865 \leq nd1 \leq -0.004 \times vd1 + 1.844,$$

when $61 \leq vd1 \leq 71$, $$-0.0015 \times vd1 + 1.5865 \leq nd1 \leq -0.009 \times vd1 + 2.149$$

where nd1 denotes refractive index of a material of the negative lens in the first lens group at d-line, which has a wavelength λ=587.6 nm, and vd1 denotes Abbe number of a material of the negative lens in the first lens group at d-line, which has a wavelength λ=587.6 nm.

20. A zoom lens system comprising, in order from an object:

a first lens group having negative refractive power;
a second lens group having positive refractive power;
a third lens group having negative refractive power; and
a fourth lens group having positive refractive power;
wherein upon zooming from a wide-angle end state to a telephoto end state, each lens group moves along an optical axis such that a distance between the first lens group and the second lens group decreases, a distance between the second lens group and the third lens group increases, and a distance between the third lens group and the fourth lens group decreases; and
the first lens group includes a negative lens, and the negative lens satisfies the following conditional expressions:

$$30 \leq vd1 \leq 71$$

when $30 \leq vd1 < 36$, $$-0.013 \times vd1 + 2.083 \leq nd1 \leq 1.7,$$

when $36 \leq vd1 < 41$, $$-0.013 \times vd1 + 2.083 \leq nd1 \leq -0.004 \times vd1 + 1.844,$$

when $41 \leq vd1 < 51$, $$-0.004 \times vd1 + 1.714 \leq nd1 \leq -0.004 \times vd1 + 1.844,$$

when $51 \leq vd1 < 61$, $$-0.0015 \times vd1 + 1.5865 \leq nd1 \leq -0.004 \times vd1 + 1.844,$$

when $61 \leq vd1 \leq 71$, $$-0.0015 \times vd1 + 1.5865 \leq nd1 \leq -0.009 \times vd1 + 2.149$$

where nd1 denotes refractive index of a material of the negative lens in the first lens group at d-line, which has a wavelength λ=587.6 nm, and vd1 denotes Abbe number of a material of the negative lens in the first lens group at d-line, which has a wavelength λ=587.6 nm; and wherein the second lens group includes a positive lens, and the positive lens in the second lens group satisfies the following conditional expressions:

$$30 \leq vd2 \leq 71$$

when $30 \leq vd2 < 36$, $$-0.013 \times vd2 + 2.083 \leq nd2 \leq 1.7,$$

when $36 \leq vd2 < 41$, $$-0.013 \times vd2 + 2.083 \leq nd2 \leq -0.004 \times vd2 + 1.844,$$

when $41 \leq vd2 < 51$, $-0.004 \times vd2 + 1.714 \leq nd2 \leq -0.004 \times vd2 + 1.844$, when $51 \leq vd2 < 61$, $-0.0015 \times vd2 + 1.5865 \leq nd2 \leq -0.004 \times vd2 + 1.844$, when $61 \leq vd2 \leq 71$, $-0.0015 \times vd2 + 1.5865 \leq nd2 \leq -0.009 \times vd2 + 2.149$ where nd2 denotes refractive index of a material of the positive lens in the second lens group at d-line, which has a wavelength $\lambda = 587.6$ nm, and vd2 denotes Abbe number of a material of the positive lens in the second lens group at d-line, which has a wavelength $\lambda = 587.6$ nm.

21. The zoom lens system according to claim 20, wherein the fourth lens group includes a positive lens, and the positive lens in the fourth lens group satisfies the following conditional expressions:

$30 \leq vd4 \leq 71$ when $30 \leq vd4 < 36$, $-0.013 \times vd4 + 2.083 \leq nd4 \leq 1.7$, when $36 \leq vd4 < 41$, $-0.013 \times vd4 + 2.083 \leq nd4 \leq -0.004 \times vd4 + 1.844$, when $41 \leq vd4 < 51$, $-0.004 \times vd4 + 1.714 \leq nd4 \leq -0.004 \times vd4 + 1.844$, when $51 \leq vd4 < 61$, $-0.0015 \times vd4 + 1.5865 \leq nd4 \leq -0.004 \times vd4 + 1.844$, when $61 \leq vd4 \leq 71$, $-0.0015 \times vd4 + 1.5865 \leq nd4 \leq -0.009 \times vd4 + 2.149$ where nd4 denotes refractive index of a material of the positive lens in the fourth lens group at d-line, which has a wavelength $\lambda = 587.6$ nm, and vd4 denotes Abbe number of a material of the positive lens in the fourth lens group at d-line, which has a wavelength $\lambda = 587.6$ nm.

22. The zoom lens system according to claim 20, wherein the following conditional expression is satisfied:

$0.7 \leq (-f1)/fw \leq 1.7$ where f1 denotes a focal length of the first lens group, and fw denotes a focal length of the zoom lens system in the wide-angle end state.

23. The zoom lens system according to claim 20, wherein the following conditional expression is satisfied:

$1.0 \leq f2/fw \leq 2.3$ where fw denotes a focal length of the zoom lens system in the wide-angle end state, and f2 denotes a focal length of the second lens group.

24. The zoom lens system according to claim 20, wherein the following conditional expression is satisfied:

$0.8 \leq f4/fw \leq 2.0$ where fw denotes a focal length of the zoom lens system in the wide-angle end state, and f4 denotes a focal length of the fourth lens group.

25. A zoom lens system comprising, in order from an object:
a first lens group having negative refractive power;
a second lens group having positive refractive power;
a third lens group having negative refractive power; and
a fourth lens group having positive refractive power;
wherein upon zooming from a wide-angle end state to a telephoto end state, each lens group moves along an optical axis such that a distance between the first lens group and the second lens group decreases, a distance between the second lens group and the third lens group increases, and a distance between the third lens group and the fourth lens group decreases; and
the first lens group includes a negative lens, and the negative lens satisfies the following conditional expressions:

$30 \leq vd1 \leq 71$ when $30 \leq vd1 < 36$, $-0.013 \times vd1 + 2.083 \leq nd1 \leq 1.7$, when $36 \leq vd1 < 41$, $-0.013 \times vd1 + 2.083 \leq nd1 \leq -0.004 \times vd1 + 1.844$, when $41 \leq vd1 < 51$, $-0.004 \times vd1 + 1.714 \leq nd1 \leq -0.004 \times vd1 + 1.844$, when $51 \leq vd1 < 61$, $-0.0015 \times vd1 + 1.5865 \leq nd1 \leq -0.004 \times vd1 + 1.844$, when $61 \leq vd1 \leq 71$, $-0.0015 \times vd1 + 1.5865 \leq nd1 \leq -0.009 \times vd1 + 2.149$ where nd1 denotes refractive index of a material of the negative lens in the first lens group at d-line, which has a wavelength $\lambda = 587.6$ nm, and vd1 denotes Abbe number of a material of the negative lens in the first lens group at d-line, which has a wavelength $\lambda = 587.6$ nm; and wherein the fourth lens group includes a positive lens, and the positive lens in the fourth lens group satisfies the following conditional expressions:

$30 \leq vd4 \leq 71$ when $30 \leq vd4 < 36$, $-0.013 \times vd4 + 2.083 \leq nd4 \leq 1.7$, when $36 \leq vd4 < 41$, $-0.013 \times vd4 + 2.083 \leq nd4 \leq -0.004 \times vd4 + 1.844$, when $41 \leq vd4 < 51$, $-0.004 \times vd4 + 1.714 \leq nd4 \leq -0.004 \times vd4 + 1.844$, when $51 \leq vd4 < 61$, $-0.0015 \times vd4 + 1.5865 \leq nd4 \leq -0.004 \times vd4 + 1.844$, when $61 \leq vd4 \leq 71$, $-0.0015 \times vd4 + 1.5865 \leq nd4 \leq -0.009 \times vd4 + 2.149$ where nd4 denotes refractive index of a material of the positive lens in the fourth lens group at d-line, which has a wavelength $\lambda = 587.6$ nm, and vd4 denotes Abbe number of a material of the positive lens in the fourth lens group at d-line, which has a wavelength $\lambda = 587.6$ nm.

26. The zoom lens system according to claim 25, wherein the following conditional expression is satisfied:

$0.7 \leq (-f1)/fw \leq 1.7$ where fw denotes a focal length of the zoom lens system in the wide-angle end state, and f1 denotes a focal length of the first lens group.

27. The zoom lens system according to claim 25, wherein the following conditional expression is satisfied:

$1.0 \leq f2/fw \leq 2.3$ where fw denotes a focal length of the zoom lens system in the wide-angle end state, and f2 denotes a focal length of the second lens group.

28. The zoom lens system according to claim 25, wherein the following conditional expression is satisfied:

$$0.8 \leq f4/fw \leq 2.0$$

where fw denotes a focal length of the zoom lens system in the wide-angle end state, and f4 denotes a focal length of the fourth lens group.

29. A method for forming an image of an object and varying a focal length of a zoom lens system that comprises, in order from the object, a first lens group having negative refractive power, a second lens group having positive refractive power, a third lens group having negative refractive power, and a fourth lens group having positive refractive power, the method comprising steps of:
moving each lens group along an optical axis such that a distance between the first lens group and the second lens group decreases, a distance between the second lens group and the third lens group increases, and a distance between the third lens group and the fourth lens group decreases upon zooming from a wide-angle end state to a telephoto end state;
providing the first lens group including a negative lens;
providing an aspherical surface on at least one lens in the negative lens in the first lens group; and
satisfying the following conditional expressions:

$$30 \leq vd1 \leq 71$$

when $30 \leq vd1 < 36$, $$-0.013 \times vd1 + 2.083 \leq nd1 \leq 1.7,$$

when $36 \leq vd1 < 41$, $$-0.013 \times vd1 + 2.083 \leq nd1 \leq -0.004 \times vd1 + 1.844,$$

when $41 \leq vd1 < 51$, $$-0.004 \times vd1 + 1.714 \leq nd1 \leq -0.004 \times vd1 + 1.844,$$

when $51 \leq vd1 < 61$, $$-0.0015 \times vd1 + 1.5865 \leq nd1 \leq -0.004 \times vd1 + 1.844,$$

when $61 \leq vd1 \leq 71$, $$-0.0015 \times vd1 + 1.5865 \leq nd1 \leq -0.009 \times vd1 + 2.149$$

where nd1 denotes refractive index of a material of the negative lens in the first lens group at d-line, which has a wavelength λ=587.6 nm, and vd1 denotes Abbe number of a material of the negative lens in the first lens group at d-line, which has a wavelength λ=587.6 nm.

30. The method according to claim 29, further comprising steps of:
providing the second lens group including a positive lens, and
satisfying the following conditional expressions:

$$30 \leq vd2 \leq 71$$

when $30 \leq vd2 < 36$, $$-0.013 \times vd2 + 2.083 \leq nd2 \leq 1.7,$$

when $36 \leq vd2 < 41$, $$-0.013 \times vd2 + 2.083 \leq nd2 \leq -0.004 \times vd2 + 1.844,$$

when $41 \leq vd2 < 51$, $$-0.004 \times vd2 + 1.714 \leq nd2 \leq -0.004 \times vd2 + 1.844,$$

when $51 \leq vd2 < 61$, $$-0.0015 \times vd2 + 1.5865 \leq nd2 \leq -0.004 \times vd2 + 1.844,$$

when $61 \leq vd2 \leq 71$, $$-0.0015 \times vd2 + 1.5865 \leq nd2 \leq -0.009 \times vd2 + 2.149$$

where nd2 denotes refractive index of a material of the positive lens in the second lens group at d-line, which has a wavelength λ=587.6 nm, and vd2 denotes Abbe number of a material of the positive lens in the second lens group at d-line, which has a wavelength λ=587.6 nm.

31. The method according to claim 29, further comprising steps of:
providing the fourth lens group including a positive lens; and
satisfying the following conditional expressions:

$$30 \leq vd4 \leq 71$$

when $30 \leq vd4 < 36$, $$-0.013 \times vd4 + 2.083 \leq nd4 \leq 1.7,$$

when $36 \leq vd4 < 41$, $$-0.013 \times vd4 + 2.083 \leq nd4 \leq -0.004 \times vd4 + 1.844,$$

when $41 \leq vd4 < 51$, $$-0.004 \times vd4 + 1.714 \leq nd4 \leq -0.004 \times vd4 + 1.844,$$

when $51 \leq vd4 < 61$, $$-0.0015 \times vd4 + 1.5865 \leq nd4 \leq -0.004 \times vd4 + 1.844,$$

when $61 \leq vd4 \leq 71$, $$-0.0015 \times vd4 + 1.5865 \leq nd4 \leq -0.009 \times vd4 + 2.149$$

where nd4 denotes refractive index of a material of the positive lens in the fourth lens group at d-line, which has a wavelength λ=587.6 nm, and vd4 denotes Abbe number of a material of the positive lens in the fourth lens group at d-line, which has a wavelength λ=587.6 nm.

32. A method for forming an image of an object and varying a focal length of a zoom lens system that comprises, in order from the object, a first lens group having negative refractive power, a second lens group having positive refractive power, a third lens group having negative refractive power, and a fourth lens group having positive refractive power, the method comprising steps of:
moving each lens group along an optical axis such that a distance between the first lens group and the second lens group decreases, a distance between the second lens group and the third lens group increases, and a distance between the third lens group and the fourth lens group decreases upon zooming from a wide-angle end state to a telephoto end state;
providing the first lens group including a negative lens;
satisfying the following conditional expressions:

$$30 \leq vd1 \leq 71$$

when $30 \leq vd1 < 36$, $$-0.013 \times vd1 + 2.083 \leq nd1 \leq 1.7,$$

when $36 \leq vd1 < 41$, $$-0.013 \times vd1 + 2.083 \leq nd1 \leq -0.004 \times vd1 + 1.844,$$

when $41 \leq vd1 < 51$, $$-0.004 \times vd1 + 1.714 \leq nd1 \leq -0.004 \times vd1 + 1.844,$$

when $51 \leq vd1 < 61$, $$-0.0015 \times vd1 + 1.5865 \leq nd1 \leq -0.004 \times vd1 + 1.844,$$

when $61 \leq vd1 \leq 71$, $$-0.0015 \times vd1 + 1.5865 \leq nd1 \leq -0.009 \times vd1 + 2.149$$

where nd1 denotes refractive index of a material of the negative lens in the first lens group at d-line, which has a wavelength λ=587.6 nm, and vd1 denotes Abbe number of a material of the negative lens in the first lens group at d-line, which has a wavelength λ=587.6 nm;

providing the second lens group including a positive lens; and satisfying the following conditional expressions:

$$30 \leq vd2 \leq 71$$

when $30 \leq vd2 < 36$, $$-0.013 \times vd2 + 2.083 \leq nd2 \leq 1.7,$$

when $36 \leq vd2 < 41$, $$-0.013 \times vd2 + 2.083 \leq nd2 \leq -0.004 \times vd2 + 1.844,$$

when $41 \leq vd2 < 51$, $$-0.004 \times vd2 + 1.714 \leq nd2 \leq -0.004 \times vd2 + 1.844,$$

when $51 \leq vd2 < 61$, $$-0.0015 \times vd2 + 1.5865 \leq nd2 \leq -0.004 \times vd2 + 1.844,$$

when $61 \leq vd2 \leq 71$, $$-0.0015 \times vd2 + 1.5865 \leq nd2 \leq -0.009 \times vd2 + 2.149$$

where nd2 denotes refractive index of a material of the positive lens in the second lens group at d-line, which has a wavelength λ=587.6 nm, and vd2 denotes Abbe number of a material of the positive lens in the second lens group at d-line, which has a wavelength λ=587.6 nm.

33. The method according to claim 32, further comprising steps of:

providing the fourth lens group including a positive lens; and satisfying the following conditional expressions:

$$30 \leq vd4 \leq 71$$

when $30 \leq vd4 < 36$, $$-0.013 \times vd4 + 2.083 \leq nd4 \leq 1.7,$$

when $36 \leq vd4 < 41$, $$-0.013 \times vd4 + 2.083 \leq nd4 \leq -0.004 \times vd4 + 1.844,$$

when $41 \leq vd4 < 51$, $$-0.004 \times vd4 + 1.714 \leq nd4 \leq -0.004 \times vd4 + 1.844,$$

when $51 \leq vd4 < 61$, $$-0.0015 \times vd4 + 1.5865 \leq nd4 \leq -0.004 \times vd4 + 1.844,$$

when $61 \leq vd4 \leq 71$, $$-0.0015 \times vd4 + 1.5865 \leq nd4 \leq -0.009 \times vd4 + 2.149$$

where nd4 denotes refractive index of a material of the positive lens in the fourth lens group at d-line, which has a wavelength λ=587.6 nm, and vd4 denotes Abbe number of a material of the positive lens in the fourth lens group at d-line, which has a wavelength λ=587.6 nm.

34. A method for forming an image of an object and varying a focal length of a zoom lens system that comprises, in order from the object, a first lens group having negative refractive power, a second lens group having positive refractive power, a third lens group having negative refractive power, and a fourth lens group having positive refractive power, the method comprising steps of:

moving each lens group along an optical axis such that a distance between the first lens group and the second lens group decreases, a distance between the second lens group and the third lens group increases, and a distance between the third lens group and the fourth lens group decreases upon zooming from a wide-angle end state to a telephoto end state;

providing the first lens group including a negative lens; satisfying the following conditional expressions:

$$30 \leq vd1 \leq 71$$

when $30 \leq vd1 < 36$, $$-0.013 \times vd1 + 2.083 \leq nd1 \leq 1.7,$$

when $36 \leq vd1 < 41$, $$-0.013 \times vd1 + 2.083 \leq nd1 \leq -0.004 \times vd1 + 1.844,$$

when $41 \leq vd1 < 51$, $$-0.004 \times vd1 + 1.714 \leq nd1 \leq -0.004 \times vd1 + 1.844,$$

when $51 \leq vd1 < 61$, $$-0.0015 \times vd1 + 1.5865 \leq nd1 \leq -0.004 \times vd1 + 1.844,$$

when $61 \leq vd1 \leq 71$, $$-0.0015 \times vd1 + 1.5865 \leq nd1 \leq -0.009 \times vd1 + 2.149$$

where nd1 denotes refractive index of a material of the negative lens in the first lens group at d-line, which has a wavelength λ=587.6 nm, and vd1 denotes Abbe number of a material of the negative lens in the first lens group at d-line, which has a wavelength λ=587.6 nm;

providing the fourth lens group including a positive lens; and satisfying the following conditional expressions:

$$30 \leq vd4 \leq 71$$

when $30 \leq vd4 < 36$, $$-0.013 \times vd4 + 2.083 \leq nd4 \leq 1.7,$$

when $36 \leq vd4 < 41$, $$-0.013 \times vd4 + 2.083 \leq nd4 \leq -0.004 \times vd4 + 1.844,$$

when $41 \leq vd4 < 51$, $$-0.004 \times vd4 + 1.714 \leq nd4 \leq -0.004 \times vd4 + 1.844,$$

when $51 \leq vd4 < 61$, $$-0.0015 \times vd4 + 1.5865 \leq nd4 \leq -0.004 \times vd4 + 1.844,$$

when $61 \leq vd4 \leq 71$, $$-0.0015 \times vd4 + 1.5865 \leq nd4 \leq -0.009 \times vd4 + 2.149$$

where nd4 denotes refractive index of a material of the positive lens in the fourth lens group at d-line, which has a wavelength λ=587.6 nm, and vd4 denotes Abbe number of a material of the positive lens in the fourth lens group at d-line, which has a wavelength λ=587.6 nm.

* * * * *

UNITED STATES PATENT AND TRADEMARK OFFICE
CERTIFICATE OF CORRECTION

PATENT NO.       : 7,333,273 B2
APPLICATION NO.  : 11/686106
DATED            : February 19, 2008
INVENTOR(S)      : Takayuki Sensui It is certified that error appears in the above-identified patent and that said Letters Patent is hereby corrected as shown below:

On the title page, item (30), the Foreign Application Priority Data should read as follows:

(30)        Foreign Application Priority Data

Mar. 24, 2006  (JP)  .................. 2006/081932
        Mar. 24, 2006  (JP)  .................. 2006/081933
        Feb. 8, 2007    (JP)  .................. 2007/029615

Signed and Sealed this

Fourteenth Day of April, 2009

JOHN DOLL
*Acting Director of the United States Patent and Trademark Office*